US012245006B2

(12) United States Patent
Bian

(10) Patent No.: US 12,245,006 B2
(45) Date of Patent: Mar. 4, 2025

(54) AUDIO PROCESSING METHOD AND ELECTRONIC DEVICE

(71) Applicant: HUAWEI TECHNOLOGIES CO., LTD., Guangdong (CN)

(72) Inventor: Chao Bian, Nanjing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 59 days.

(21) Appl. No.: 18/042,753

(22) PCT Filed: Jul. 26, 2021

(86) PCT No.: PCT/CN2021/108458
§ 371 (c)(1),
(2) Date: Feb. 23, 2023

(87) PCT Pub. No.: WO2022/042168
PCT Pub. Date: Mar. 3, 2022

(65) Prior Publication Data
US 2023/0328429 A1    Oct. 12, 2023

(30) Foreign Application Priority Data
Aug. 26, 2020 (CN) .......................... 202010868463.5

(51) Int. Cl.
H04N 23/611 (2023.01)
H04N 5/76 (2006.01)
(Continued)

(52) U.S. Cl.
CPC ............... *H04R 3/005* (2013.01); *H04N 5/76* (2013.01); *H04N 23/611* (2023.01);
(Continued)

(58) Field of Classification Search
None
See application file for complete search history.

(56) References Cited

U.S. PATENT DOCUMENTS

2014/0099075 A1* 4/2014 Li ......................... H04N 7/155
386/241

FOREIGN PATENT DOCUMENTS

CN          104699445 A     6/2015
CN          107402739 A    11/2017
(Continued)

Primary Examiner — James M Hannett
(74) Attorney, Agent, or Firm — WOMBLE BOND DICKINSON (US) LLP

(57) ABSTRACT

This application provides an audio processing method and an electronic device. A position of a face or a mouth of a person who makes a sound in a video picture is determined, and a range in which sound pickup needs to be enhanced is determined based on the position of the face or the mouth of the person who makes a sound, to implement directional voice enhancement. The method includes: in a process of collecting a video picture and first audio, recognizing a target image of a sound-making object in the video picture; determining, based on the target image, a first sound pickup range corresponding to the sound-making object; and determining second audio based on the first audio and the first sound pickup range. In the second audio, audio volume in the first sound pickup range is greater than audio volume outside the first sound pickup range.

19 Claims, 46 Drawing Sheets

(51) Int. Cl.
*H04N 23/62* (2023.01)
*H04N 23/63* (2023.01)
*H04R 1/02* (2006.01)
*H04R 1/40* (2006.01)
*H04R 3/00* (2006.01)

(52) U.S. Cl.
CPC ........... *H04N 23/62* (2023.01); *H04N 23/632* (2023.01); *H04R 1/028* (2013.01); *H04R 1/406* (2013.01); *H04R 2430/01* (2013.01); *H04R 2499/11* (2013.01)

(56) References Cited

FOREIGN PATENT DOCUMENTS

| | | |
|---|---|---|
| CN | 110366065 A | 10/2019 |
| WO | 2020078237 A1 | 4/2020 |

\* cited by examiner

AUDIO PROCESSING METHOD AND ELECTRONIC DEVICE

CROSS-REFERENCE TO RELATED APPLICATIONS

This application is a national stage of International Application No. PCT/CN2021/108458, filed on Jul. 26, 2021, which claims priority to Chinese Patent Application No. 202010868463.5, filed on Aug. 26, 2020. Both of the aforementioned applications are hereby incorporated by reference in their entireties.

TECHNICAL FIELD

This application relates to the field of electronic technologies, and in particular, to an audio processing method and an electronic device.

BACKGROUND

Electronic devices such as mobile phones or tablet computers are widely used in the video shooting field, such as short video shooting and webcasting. In a video shooting process, a sound receiving effect is usually not ideal due to a reason such as moving of a shot person or external noise, resulting in a decline in voice quality.

To improve the sound receiving effect, an external sound receiving device usually needs to be added on the basis of sound receiving by using an electronic device. This leads to higher shooting difficulty for a user and higher costs. In addition, a voice enhancement method is further proposed, and in the video shooting process, an audio algorithm is used to process an audio file collected by the electronic device, to remove noise. However, because a shooting environment is relatively complex, a requirement on a processing capability of the audio algorithm is relatively strict. In addition, a complex audio processing process also increases a requirement on hardware performance of the electronic device.

SUMMARY

According to an audio processing method and an electronic device that are provided in this application, a position of a face or a mouth of a person who makes a sound in a video picture is determined, and a range in which sound pickup needs to be enhanced is determined based on the position of the face or the mouth of the person who makes a sound, to implement directional voice enhancement, thereby not only simplifying an audio processing algorithm but also improving audio quality.

To achieve the foregoing objective, the following technical solutions are used in this application.

According to a first aspect, this application provides an audio processing method. The method is applied to an electronic device, and the method may include: detecting a first operation of opening a camera application; displaying a shooting preview interface in response to the first operation; detecting a second operation of starting video recording; collecting a video picture and first audio and displaying a shooting interface in response to the second operation, where the shooting interface includes a preview interface of the video picture; recognizing a target image in the video picture, where the target image is a first face image and/or a first mouth image, the first face image is a face image of a sound-making object in the video image, and the first mouth image is a mouth image of the sound-making object in the video image; then determining, based on the target image, a first sound pickup range corresponding to the sound-making object; and obtaining, based on the first sound pickup range and the first audio, second audio corresponding to the video picture, where in the second audio, audio volume in the first sound pickup range is greater than audio volume outside the first sound pickup range.

The method in this embodiment of this application may be applied to a scenario in which a user indication is received to directly start a camera application, or may be applied to a scenario in which a user starts another third-party application (for example, a short video application, a live broadcast application, or a video call application) to invoke and start a camera. The first operation or the second operation includes, for example, a touch operation, a keystroke operation, a mid-air gesture operation, or a voice operation.

In an embodiment, after the displaying a shooting preview interface in response to the first operation, the method further includes: detecting a sixth operation of enabling a voice enhancement mode; and enabling the voice enhancement mode in response to the sixth operation.

In some embodiments, after switching to a video recording function is detected, the user is first asked whether to enable the voice enhancement mode. After the user determines to enable the voice enhancement mode, the voice enhancement mode is enabled. Alternatively, the voice enhancement mode is automatically enabled after switching to the video recording function is detected. In some other embodiments, after switching to the video recording function is detected, a video recording preview interface is first displayed; then, after an operation of giving a shooting indication by the user is detected, the voice enhancement mode is enabled based on a user indication, or the voice enhancement mode is automatically enabled.

After the voice enhancement mode is enabled, the electronic device needs to process the collected first audio, recognize audio of the sound-making object, and enhance the audio, to obtain a better voice recording effect. The first audio is, for example, a collected initial audio signal, and the second audio is audio obtained after voice enhancement processing is performed.

In an embodiment, the first face image or the first mouth image is recognized by using a face image recognition algorithm. For example, in a process of recording the video picture, whether a face image is included in the collected video picture is determined by using the face image recognition algorithm. If a face image is included, the face image included in the collected video picture is recognized, and whether the face image is making a sound is determined based on a change status of facial feature data such as five sense organs data and facial contour data of the face image in a preset time period. A criterion for determining that the face image is making a sound includes determining that the face image is currently making a sound. Alternatively, if it is determined that the face image makes a sound again in a preset time period after it is determined that the face image makes a sound for the first time, it is determined that the face image is making a sound. It may be understood that a vocal organ of a person is a mouth of the person. When data of a sound-making mouth may be obtained, data of the first mouth image may be preferentially determined, and the first sound pickup range may be subsequently determined based on the data of the first mouth image. It should be noted that, if a person in the video picture is making a sound but cannot be recognized, an image corresponding to the person who is making a sound is not the target image. That is, the target image is an image corresponding to a recognized sound-making face and/or sound-making mouth.

In this way, the first sound pickup range in which sound pickup needs to be enhanced is determined by recognizing the sound-making target image in the video picture. Then, the second audio is obtained based on the collected initial audio signal and the first sound pickup range. Therefore, in the second audio, the audio volume in the first sound pickup range is greater than the audio volume outside the first sound pickup range. That is, volume of the person who makes a sound is increased, thereby improving an audio recording effect.

In a possible implementation, the determining, based on the target image, a first sound pickup range corresponding to the sound-making object includes: obtaining a first feature value based on the target image, where the first feature value includes one or more of a front-facing/rear-facing attribute parameter, an area ratio, or position information, the front-facing/rear-facing attribute parameter is used to indicate whether the video picture is a video picture shot by a front-facing camera or a video picture shot by a rear-facing camera, the area ratio is used to indicate a ratio of an area of the target image to an area of the video picture, and the position information is used to indicate a position of the target image in the video picture; and then determining, based on the first feature value, the first sound pickup range corresponding to the sound-making object.

The first feature value is used to describe a relative position relationship between a face of a real person corresponding to the first face image and the electronic device, or the first feature value is used to describe a relative position relationship between a mouth of a real person corresponding to the first mouth image and the electronic device. Therefore, the electronic device may determine the first sound pickup range based on the first feature value. For example, if the real person corresponding to the first face image is located directly in front of the electronic device, that is, the first face image is located in a central position of the shot video picture, the first sound pickup range is a sound pickup range directly in front of the electronic device. Subsequently, after obtaining the initial audio signal including audio signals in various directions, the electronic device may obtain, based on the initial audio signal and the first sound pickup range, audio corresponding to the first face image.

In some embodiments, the first feature value may change in a recording process of the video picture. Therefore, the first sound pickup range also changes accordingly. Therefore, for audio in a recorded video, the audio recorded by the electronic device includes at least audio of first duration and audio of second duration. The audio of first duration is audio corresponding to the first sound pickup range, and the audio of second duration is audio corresponding to a changed sound pickup range. That is, the electronic device may dynamically determine a sound pickup range based on a change of a sound-making face or a sound-making mouth in the video picture, and then record audio based on the sound pickup range. After an operation of giving a recording stop indication by the user is finally detected, audio of the formed video picture may include a plurality of pieces of audio of different duration or same duration recorded based on a time sequence and the changing sound pickup range.

In this way, based on a change of the sound pickup range, the electronic device may always focus on improving audio recording quality of a part in which voice enhancement needs to be performed, thereby ensuring the audio recording effect. In addition, when the user plays a video file, playing experience matching a dynamic change such as a sound range change of video content may be presented to the user.

In a possible implementation, the determining, based on the first feature value, the first sound pickup range corresponding to the sound-making object includes: when the video picture is a front-facing video picture, determining that the first sound pickup range is a sound pickup range on a front-facing camera side; and when the video picture is a rear-facing video picture, determining that the first sound pickup range is a sound pickup range on a rear-facing camera side.

For example, it is assumed that the sound pickup range of the electronic device includes a 180-degree front-facing sound pickup range and a 180-degree rear-facing sound pickup range. In this case, when it is determined that the video picture is a front-facing video picture, the 180-degree front-facing sound pickup range is used as the first sound pickup range. When it is determined that the video picture is a rear-facing video picture, the 180-degree rear-facing sound pickup range is used as the first sound pickup range. Further, in the recording process of the video picture, in response to an operation of switching between the front-facing camera and the rear-facing camera by the user, the first sound pickup range is also switched between front-facing and rear-facing, to ensure that the first sound pickup range is a sound pickup range corresponding to the sound-making object in the video picture.

In a possible implementation, the determining, based on the first feature value, the first sound pickup range corresponding to the sound-making object includes: determining the first sound pickup range based on the area ratio and a sound pickup range of the first audio.

The sound pickup range of the first audio is, for example, a sound pickup range of panoramic audio. In a video recording process, the electronic device collects initial audio signals in various directions by using a microphone, that is, obtains initial audio signals in the sound pickup range of the panoramic audio.

Specifically, in a process in which the user shoots the video picture by using a mobile phone, a person concerned by the user is usually placed at a central position of the video picture, that is, the first face image or the first mouth image is located at a central position of a viewfinder frame. Different areas of the first face image or the first mouth image correspond to different sound pickup ranges, and a size such as a radius, a diameter, or an area of the first sound pickup range may be described by using the area ratio.

For example, it is assumed that X is used to represent an area of the first face image or an area of the first mouth image; Y is used to represent the area of the video picture displayed in the viewfinder frame; and N represents a sound pickup range corresponding to a framing range. In this case, the area ratio is X/Y, and the first sound pickup range is N*X/Y. That is, a ratio of the first sound pickup range to a panoramic sound pickup range is directly proportional to the area ratio.

In a possible implementation, the determining, based on the first feature value, the first sound pickup range corresponding to the sound-making object includes: determining, based on the position information, a position of the first sound pickup range in the sound pickup range of the first audio.

In some scenarios, the sound-making object is not located at the central position of the video picture. In this case, a position of an image (that is, the target image) corresponding to the sound-making object in the video picture may be obtained based on the position information. It may be understood that there is a correspondence between the position of the target image in the video picture and a position of the first sound pickup range in the panoramic sound pickup range.

In a possible implementation, the position information includes a first offset of a central point of the target image relative to a first reference point, and the first reference point is a central point of the video picture or a focus of focusing. The determining, based on the position information, a position of the first sound pickup range in the sound pickup range of the first audio includes: determining, based on the first offset, a second offset of a central point of the first sound pickup range relative to a central point of the sound pickup range of the first audio, where the second offset is directly proportional to the first offset; and then determining, based on the second offset, the position of the first sound pickup range in the sound pickup range of the first audio.

The offset includes, for example, an offset direction, an offset angle, and/or an offset distance. The offset direction means that relative to the first reference point, a central point of the first face image or the first mouth image has a leftward offset, a rightward offset, an upward offset, a downward offset, an upper leftward offset, an upper rightward offset, a lower leftward offset, a lower rightward offset, or the like. The offset angle is an angle at which there is an upper leftward offset, an upper rightward offset, a lower leftward offset, or a lower rightward offset. The offset distance is a distance of a leftward offset, a rightward offset, an upward offset, or a downward offset, a distance of an offset at an offset angle, or the like.

For example, a coordinate system is built by using the first reference point as an origin, a direction parallel to a bottom edge of the mobile phone (or a bottom edge of a current viewfinder frame) as an x axis, and a direction perpendicular to the x axis as y, and the current coordinate system is parallel to a display of the mobile phone. The offset direction, the offset angle, and the offset distance of the central point of the first face image or the first mouth image relative to the first reference point are defined by using the built coordinate system. For example, if the position information of the target image is the lower left of the central point of the viewfinder frame, the first sound pickup range is in the panoramic sound pickup range, and the central point of the first sound pickup range is on the lower left of a central point of the panoramic sound pickup range.

In a possible implementation, the central point of the video picture is a central point of a viewfinder frame, or the central point of the video picture is a central point of a display.

In some scenarios, the central point of the viewfinder frame is used as the first reference point, that is, the central point of the viewfinder frame is used to represent the central point of the video picture. It may be understood that, based on a display form of the video picture, the first reference point may alternatively be represented in another form. For example, a central point of a whole screen of the display of the mobile phone is used to represent the central point of the video picture, that is, as the first reference point.

In a possible implementation, the obtaining, based on the first sound pickup range and the first audio, second audio corresponding to the video picture includes: enhancing an audio signal that is in the first sound pickup range and that is in the first audio, and/or weakening an audio signal that is outside the first sound pickup range and that is in the first audio, to obtain the second audio.

For example, the first audio includes audio signals in various directions. After the first sound pickup range corresponding to the sound-making object is determined, the audio signal in the first sound pickup range is enhanced, to improve audio quality in the recorded video. In an embodiment, the audio signal outside the sound pickup range is further weakened, to reduce interference of external noise, and highlight a sound made by the sound-making object in the audio.

In a possible implementation, the electronic device includes one or more microphones, and the one or more microphones are configured to collect the first audio. The obtaining, based on the first sound pickup range and the first audio, second audio corresponding to the video picture includes: when a sound pickup range of a first microphone in the one or more microphones includes a part or all of the first sound pickup range, performing at least one of the following operations to obtain the second audio: enhancing an audio signal that is in the first sound pickup range and that is in the sound pickup range of the first microphone; weakening an audio signal that is outside the first sound pickup range and that is in the sound pickup range of the first microphone; and weakening an audio signal of a microphone other than the first microphone in the one or more microphones.

For example, a microphone 1 and a microphone 2 are configured on the mobile phone. If the first sound pickup range is in a sound pickup range of the microphone 1, after obtaining an initial audio signal by using the microphone 1 and the microphone 2, the mobile phone may enhance an audio signal that is in the initial audio signal, that is in the first sound pickup range, and that is collected by the microphone 1; weaken an audio signal that is in the initial audio signal, that is outside the first sound pickup range, and that is collected by the microphone 1; and weaken an audio signal collected by the microphone 2, to obtain audio corresponding to the first face image or the first mouth image. For another example, a microphone 1 and a microphone 2 are configured on the mobile phone. The first sound pickup range includes a sound pickup range 1 in a sound pickup range of the microphone 1 and a sound pickup range 2 in a sound pickup range of the microphone 2. That is, the first sound pickup range is a union set of the sound pickup range 1 and the sound pickup range 2. In this case, after obtaining an initial audio signal by using the microphone 1 and the microphone 2, the mobile phone may enhance an audio signal that is in the sound pickup range 1 of the microphone 1 and that is in the initial audio signal and an audio signal that is in the sound pickup range 2 of the microphone 2 and that is in the initial audio signal, and weaken a remaining audio signal in the initial audio signal, to obtain audio corresponding to the first face image or the first mouth image. It may be understood that the sound pickup range 1 and the sound pickup range 2 may completely or partially overlap.

In a possible implementation, the electronic device includes at least two microphones, and the at least two microphones are configured to collect the first audio. The obtaining, based on the first sound pickup range and the first audio, second audio corresponding to the video picture includes: when a sound pickup range of a second microphone in the at least two microphones does not include the first sound pickup range, disabling the second microphone, where audio collected by a microphone other than the second microphone in the at least two microphones is the second audio.

For example, a microphone 1 and a microphone 2 are configured on the mobile phone. The first sound pickup range is in a sound pickup range of the microphone 1, and is outside a sound pickup range of the microphone 2. In this case, the mobile phone disables the microphone 2, processes an audio signal collected by the microphone 1, and uses the processed audio signal as the audio corresponding to the video picture. That is, audio corresponding to the first face image or the first mouth image is audio collected by the microphone 1.

In a possible implementation, when the second microphone is disabled, the method further includes: enhancing an audio signal that is in the first sound pickup range and that is in a sound pickup range of a microphone other than the second microphone in the at least two microphones, and/or weakening an audio signal that is outside the first sound pickup range and that is in the sound pickup range of the microphone other than the second microphone in the at least two microphones.

For example, a microphone 1 and a microphone 2 are configured on the mobile phone. The first sound pickup range is in a sound pickup range of the microphone 1, and is outside a sound pickup range of the microphone 2. In this case, the mobile phone disables the microphone 2, enhances an audio signal that is in the first sound pickup range and that is in an audio signal collected by the microphone 1, and weakens an audio signal that is outside the first sound pickup range and that is in the audio signal collected by the microphone 1, to obtain audio corresponding to the first face image or the first mouth image.

In a possible implementation, there are one or more first face images, and there are one or more first mouth images.

There may be one or more persons who are making sounds in the video picture. Therefore, there are one or more first face images, and there are one or more first mouth images. It may be understood that, if some persons are making sounds in the currently shot video picture, but the mobile phone fails to recognize that the persons are making sounds, face images or mouth images of the unrecognized persons who are making sounds are not classified as the first face image or the first mouth image.

In some embodiments, if there are a plurality of first face images or first mouth images, in a process of determining the first feature value, the first feature value needs to be determined based on the plurality of first face images or the plurality of first mouth images. For example, in a process of determining the area ratio, a ratio of an area of the plurality of first face images to the area of the video picture is used as the area ratio of the target image. For another example, in a process of determining the position information, an offset of a central point of a placeholder frame in which the plurality of first face images are located relative to the central point of the video picture is used as the position information of the target image. The placeholder frame in which the plurality of first face images are located is used to represent a minimum selection frame that includes the plurality of face images.

In a possible implementation, after the collecting a video picture and first audio and displaying a shooting interface in response to the second operation, the method further includes: detecting a third operation of stopping shooting; in response to the third operation, stopping recording, and generating a recorded video, where the recorded video includes the video picture and the second audio; detecting a fourth operation of playing the recorded video; and in response to the fourth operation, displaying a video playing interface, and playing the video picture and the second audio.

In some embodiments, in a process of recording the video picture, the electronic device determines the first sound pickup range based on a sound-making face image or a sound-making mouth image, and then records audio based on the first sound pickup range. Subsequently, the recorded audio needs to be stored. The user may play a video picture and audio of a stored video.

It should be noted that, if a scenario of recording the video picture is a real-time communication scenario such as a live broadcast or a video call, for a method for recording audio in the process of recording the video picture, refer to the foregoing method. However, after an operation of giving a shooting stop indication by the user is detected, that is, after an operation of stopping communication is detected, communication is directly stopped, with no need to generate a recorded video. It may be understood that, in some real-time communication scenarios, the user may alternatively choose to store a recorded video. In response to an operation of the user, the electronic device determines whether to store the recorded video in the real-time communication scenario.

In a possible implementation, the recorded video further includes third audio, and the third audio is audio determined based on a second sound pickup range. The second sound pickup range is a sound pickup range determined based on the first sound pickup range and different from the first sound pickup range. The video playing interface includes a first control and a second control, the first control corresponds to the second audio, and the second control corresponds to the third audio.

In some embodiments, because there may be an error between the first sound pickup range determined by the electronic device based on the first feature value and a display range of the first face image or the first mouth image, the electronic device may determine one or more reference first sound pickup ranges near the first sound pickup range. The electronic device obtains one piece of audio based on the first sound pickup range, and obtains at least one piece of audio based on the reference first sound pickup range. The electronic device may further use the panoramic audio as one piece of audio. In this case, the electronic device may obtain, based on the first sound pickup range, a plurality of pieces of audio corresponding to the first face image or the first mouth image. One piece of audio may be understood as one audio file.

In an embodiment, the video recording function may include a single-channel video recording function and a multi-channel video recording function. The single-channel video recording function means that the electronic device displays one viewfinder frame in a shooting process, to record one video picture. The multi-channel video recording function means that the electronic device displays at least two viewfinder frames in a shooting process, and each viewfinder frame is used for one video picture. In a process of using the multi-channel video recording function, for each video picture and a corresponding audio collection manner, refer to the implementation of the single-channel video recording function.

In this way, the electronic device may switch to play audio corresponding to different sound pickup ranges, to provide a plurality of audio playing options for the user, thereby implementing audio adjustability, and improving audio playing experience of the user.

In a possible implementation, the method further includes: playing the video picture and the second audio in response to the fourth operation, where the fourth operation includes an operation of operating a player control or an operation of operating the first control; detecting a fifth operation of operating the second control; and playing the video picture and the third audio in response to the fifth operation.

In another possible implementation, during video playback, the electronic device may display the video playing interface without playing audio first. After detecting an indication operation of the user, the electronic device plays audio indicated by the user.

In a possible implementation, the method further includes: deleting the second audio or the third audio in response to an operation of deleting the second audio or the third audio.

In this way, in a video playback process, audio that the user does not want to store can be deleted based on a user requirement, thereby improving use experience of the user.

According to a second aspect, this application provides an electronic device. The electronic device includes a processor, a memory, a microphone, a camera, and a display. The memory, the microphone, the camera, and the display are coupled to the processor. The memory is configured to store computer program code, and the computer program code includes computer instructions. When the processor reads the computer instructions from the memory, the electronic device is enabled to perform the following operations: detecting a first operation of opening a camera application; displaying a shooting preview interface in response to the first operation; detecting a second operation of starting video recording; collecting a video picture and first audio and displaying a shooting interface in response to the second operation, where the shooting interface includes a preview interface of the video picture; recognizing a target image in the video picture, where the target image is a first face image and/or a first mouth image, the first face image is a face image of a sound-making object in the video image, and the first mouth image is a mouth image of the sound-making object in the video image; determining, based on the target image, a first sound pickup range corresponding to the sound-making object; and obtaining, based on the first sound pickup range and the first audio, second audio corresponding to the video picture, where in the second audio, audio volume in the first sound pickup range is greater than audio volume outside the first sound pickup range.

In a possible implementation, the determining, based on the target image, a first sound pickup range corresponding to the sound-making object includes: obtaining a first feature value based on the target image, where the first feature value includes one or more of a front-facing/rear-facing attribute parameter, an area ratio, or position information, the front-facing/rear-facing attribute parameter is used to indicate whether the video picture is a video picture shot by a front-facing camera or a video picture shot by a rear-facing camera, the area ratio is used to indicate a ratio of an area of the target image to an area of the video picture, and the position information is used to indicate a position of the target image in the video picture; and determining, based on the first feature value, the first sound pickup range corresponding to the sound-making object.

In a possible implementation, the determining, based on the first feature value, the first sound pickup range corresponding to the sound-making object includes: when the video picture is a front-facing video picture, determining that the first sound pickup range is a sound pickup range on a front-facing camera side; and when the video picture is a rear-facing video picture, determining that the first sound pickup range is a sound pickup range on a rear-facing camera side.

In a possible implementation, the determining, based on the first feature value, the first sound pickup range corresponding to the sound-making object includes: determining the first sound pickup range based on the area ratio and a sound pickup range of the first audio.

In a possible implementation, the determining, based on the first feature value, the first sound pickup range corresponding to the sound-making object includes: determining, based on the position information, a position of the first sound pickup range in the sound pickup range of the first audio.

In a possible implementation, the position information includes a first offset of a central point of the target image relative to a first reference point, and the first reference point is a central point of the video picture or a focus of focusing. The determining, based on the position information, a position of the first sound pickup range in the sound pickup range of the first audio includes: determining, based on the first offset, a second offset of a central point of the first sound pickup range relative to a central point of the sound pickup range of the first audio, where the second offset is directly proportional to the first offset; and determining, based on the second offset, the position of the first sound pickup range in the sound pickup range of the first audio.

In a possible implementation, the central point of the video picture is a central point of a viewfinder frame, or the central point of the video picture is a central point of the display.

In a possible implementation, the obtaining, based on the first sound pickup range and the first audio, second audio corresponding to the video picture includes: enhancing an audio signal that is in the first sound pickup range and that is in the first audio, and/or weakening an audio signal that is outside the first sound pickup range and that is in the first audio, to obtain the second audio.

In a possible implementation, the electronic device includes one or more microphones, and the one or more microphones are configured to collect the first audio. The obtaining, based on the first sound pickup range and the first audio, second audio corresponding to the video picture includes: when a sound pickup range of a first microphone in the one or more microphones includes a part or all of the first sound pickup range, performing at least one of the following operations to obtain the second audio: enhancing an audio signal that is in the first sound pickup range and that is in the sound pickup range of the first microphone; weakening an audio signal that is outside the first sound pickup range and that is in the sound pickup range of the first microphone; and weakening an audio signal of a microphone other than the first microphone in the one or more microphones.

In a possible implementation, the electronic device includes at least two microphones, and the at least two microphones are configured to collect the first audio. The obtaining, based on the first sound pickup range and the first audio, second audio corresponding to the video picture includes: when a sound pickup range of a second microphone in the at least two microphones does not include the first sound pickup range, disabling the second microphone, where audio collected by a microphone other than the second microphone in the at least two microphones is the second audio.

In a possible implementation, when the second microphone is disabled, and when the processor reads the computer instructions from the memory, the electronic device is further enabled to perform the following operations: enhancing an audio signal that is in the first sound pickup range and that is in a sound pickup range of a microphone other than the second microphone in the at least two microphones, and/or weakening an audio signal that is outside the first sound pickup range and that is in the sound pickup range of the microphone other than the second microphone in the at least two microphones.

In a possible implementation, there are one or more first face images, and there are one or more first mouth images.

In a possible implementation, when the processor reads the computer instructions from the memory, the electronic device is further enabled to perform the following operations: detecting a third operation of stopping shooting; in response to the third operation, stopping recording, and generating a recorded video, where the recorded video includes the video picture and the second audio; detecting a fourth operation of playing the recorded video; and in response to the fourth operation, displaying a video playing interface, and playing the video picture and the second audio.

In a possible implementation, the recorded video further includes third audio, and the third audio is audio determined based on a second sound pickup range. The second sound pickup range is a sound pickup range determined based on the first sound pickup range and different from the first sound pickup range. The video playing interface includes a first control and a second control, the first control corresponds to the second audio, and the second control corresponds to the third audio.

In a possible implementation, when the processor reads the computer instructions from the memory, the electronic device is further enabled to perform the following operations: playing the video picture and the second audio in response to the fourth operation, where the fourth operation includes an operation of operating a player control or an operation of operating the first control; detecting a fifth operation of operating the second control; and playing the video picture and the third audio in response to the fifth operation.

In a possible implementation, when the processor reads the computer instructions from the memory, the electronic device is further enabled to perform the following operation: deleting the second audio or the third audio in response to an operation of deleting the second audio or the third audio.

In a possible implementation, when the processor reads the computer instructions from the memory, the electronic device is further enabled to perform the following operations: detecting a sixth operation of enabling a voice enhancement mode; and enabling the voice enhancement mode in response to the sixth operation.

In addition, for a technical effect of the electronic device according to the second aspect, refer to the technical effect of the audio processing method according to the first aspect. Details are not described herein.

According to a third aspect, this application provides an electronic device. The electronic device has a function of implementing the audio processing method according to any one of the first aspect or the possible implementations of the first aspect. The function may be implemented by hardware, or may be implemented by hardware executing corresponding software. The hardware or the software includes one or more modules corresponding to the function.

According to a fourth aspect, this application provides a computer-readable storage medium, including computer instructions. When the computer instructions are run on an electronic device, the electronic device is enabled to perform the audio processing method according to any one of the first aspect or the possible implementations of the first aspect.

According to a fifth aspect, this application provides a computer program product. When the computer program product is run on an electronic device, the electronic device is enabled to perform the audio processing method according to any one of the first aspect or the possible implementations of the first aspect.

According to a sixth aspect, a circuit system is provided. The circuit system includes a processing circuit, and the processing circuit is configured to perform the audio processing method according to any one of the first aspect or the possible implementations of the first aspect.

According to a seventh aspect, an embodiment of this application provides a chip system, including at least one processor and at least one interface circuit. The at least one interface circuit is configured to perform a transceiver function and send instructions to the at least one processor. When the at least one processor executes the instructions, the at least one processor performs the audio processing method according to any one of the first aspect or the possible implementations of the first aspect.

DESCRIPTION OF EMBODIMENTS

With reference to accompanying drawings, the following describes in detail an audio processing method and an electronic device that are provided in embodiments of this application.

The audio processing method provided in the embodiments of this application may be applied to an electronic device. For example, the electronic device may be specifically a mobile phone, a tablet computer, a wearable device, a vehicle-mounted device, an augmented reality (AR)/virtual reality (VR) device, a notebook computer, an ultra-mobile personal computer (UMPC), a netbook, a personal digital assistant (PDA), an artificial intelligence device, a specialized camera (for example, a single-lens reflex camera or a card camera), or the like. A type of the electronic device is not limited in the embodiments of this application.

Figure 1:
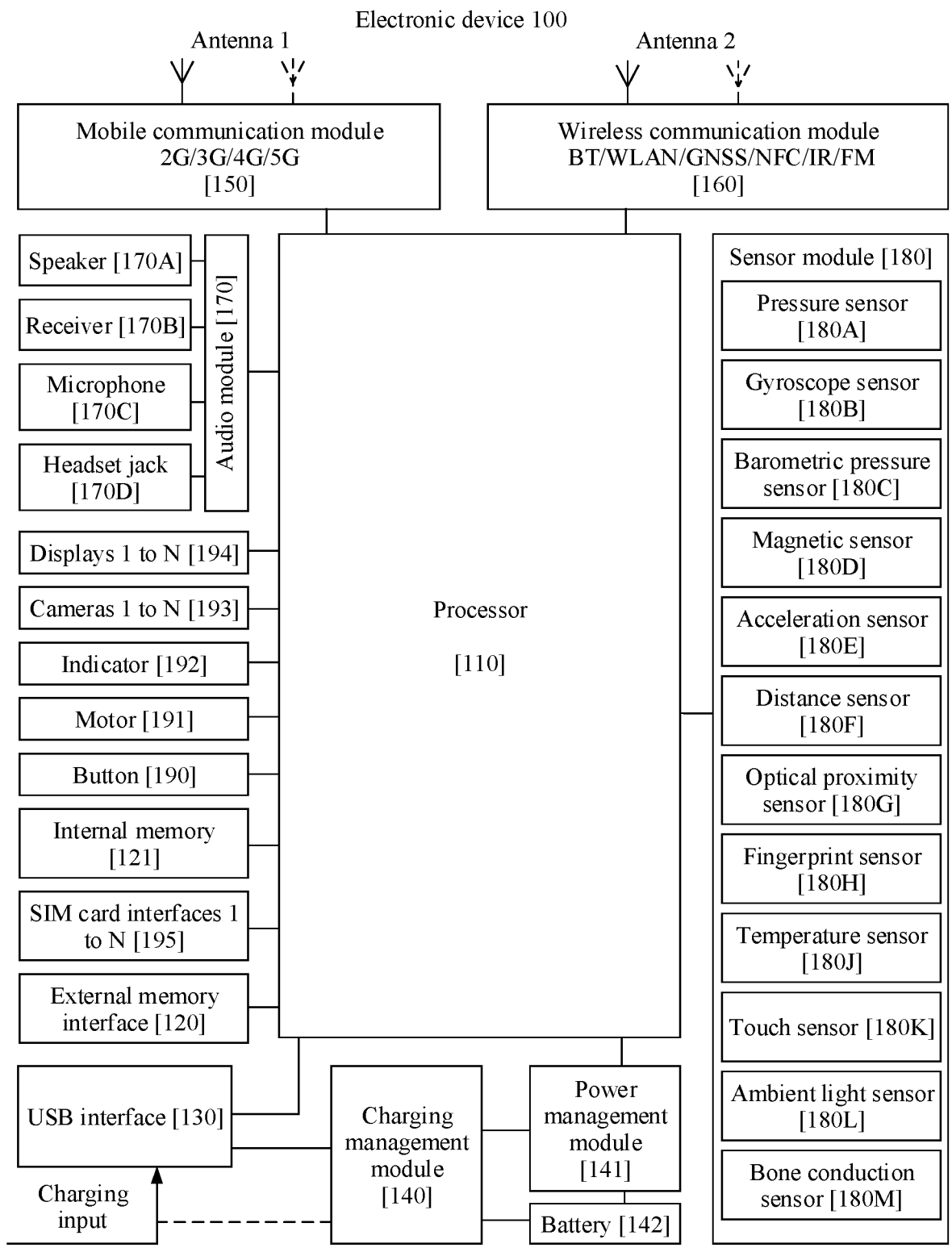
FIG. 1 is a schematic diagram of an electronic device according to an embodiment of this application.

For example, FIG. 1 shows a schematic diagram of a structure of an electronic device 100. The electronic device 100 may include a processor 110, an external memory interface 120, an internal memory 121, a universal serial bus (USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (SIM) card interface 195, and the like.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, and/or a neural-network processing unit (NPU). Different processing units may be independent devices, or may be integrated into one or more processors.

The controller may be a nerve center and a command center of the electronic device 100. The controller may generate an operation control signal based on an instruction operation code and a time sequence signal, to complete control of instruction fetching and instruction execution.

A memory may be further disposed in the processor 110, and is configured to store instructions and data. In some embodiments, the memory in the processor 110 is a cache. The memory may store instructions or data that has been used or is cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments of this application, the processor 110 performs image recognition on a plurality of frames of images in a collected video picture, to obtain face image data and/or mouth image data included in the frames of images. Information such as a position and a ratio of a sound-making face and/or a sound-making mouth in the frames of images (that is, in the video picture) is determined by comparing changes of the face image data and/or the mouth image data in the frames of images, such as a change of a distance between upper and lower lips and a change of a facial contour. Further, a to-be-enhanced sound pickup range is determined based on the information such as the position and the ratio of the sound-making face and/or the sound-making mouth in the video picture. That is, a position region of a sound of a person who makes a sound in panoramic audio is determined. An audio signal in the sound pickup range is enhanced, to improve audio quality in a recorded video. In an embodiment, an audio signal outside the sound pickup range is further weakened, to reduce interference of external noise.

The charging management module 140 is configured to receive charging input from a charger.

The power management module 141 is configured to connect the battery 142, the charging management module 140, and the processor 110. The power management module 141 receives input from the battery 142 and/or the charging management module 140, and supplies power to the processor 110, the display 194, the camera 193, and the like.

A wireless communication function of the electronic device 100 may be implemented by using the antenna 1, the antenna 2, the mobile communication module 150, the wireless communication module 160, the modem processor, the baseband processor, and the like.

The mobile communication module 150 may provide a wireless communication solution that is applied to the electronic device 100 and that includes 2G/3G/4G/5G or the like. The wireless communication module 160 may provide a wireless communication solution that is applied to the electronic device 100 and that includes a wireless local area network (WLAN) (for example, a Wireless Fidelity (Wi-Fi) network), Bluetooth (BT), or the like.

The electronic device 100 may implement a display function through the GPU, the display 194, the application processor, and the like. The GPU is a microprocessor for image processing, and is connected to the display 194 and the application processor. The GPU is configured to: perform mathematical and geometric calculation, and render an image. The processor 110 may include one or more GPUs that execute program instructions to generate or change display information.

The display 194 is configured to display an image, a video, or the like. The display 194 includes a display panel. In some embodiments, the electronic device 100 may include one or N displays 194, where N is a positive integer greater than 1.

In some embodiments, the display 194 may display a shooting preview interface, a video recording preview interface, and a shooting interface in a video recording mode, and may further display a video playing interface or the like during video playback.

The electronic device 100 can implement a photographing function by using the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193. For example, in this embodiment of this application, the ISP may control, based on a shooting parameter, a photosensitive element to perform exposure and shooting.

The camera 193 is configured to capture a static image or a video. An optical image of an object is generated through the lens, and is projected onto the photosensitive element. The photosensitive element may be a charge coupled device (CCD) or a complementary metal-oxide-semiconductor (CMOS) photoelectric transistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format, for example, RGB or YUV.

In some embodiments, the electronic device 100 may include one or N cameras 193, where N is a positive integer greater than 1. The camera 193 may be located in an edge region of the electronic device, and may be an under-display camera, or may be an elevating camera. The camera 193 may include a rear-facing camera, and may further include a front-facing camera. A position and form of the camera 193 are not limited in this embodiment of this application.

Figure 2A:
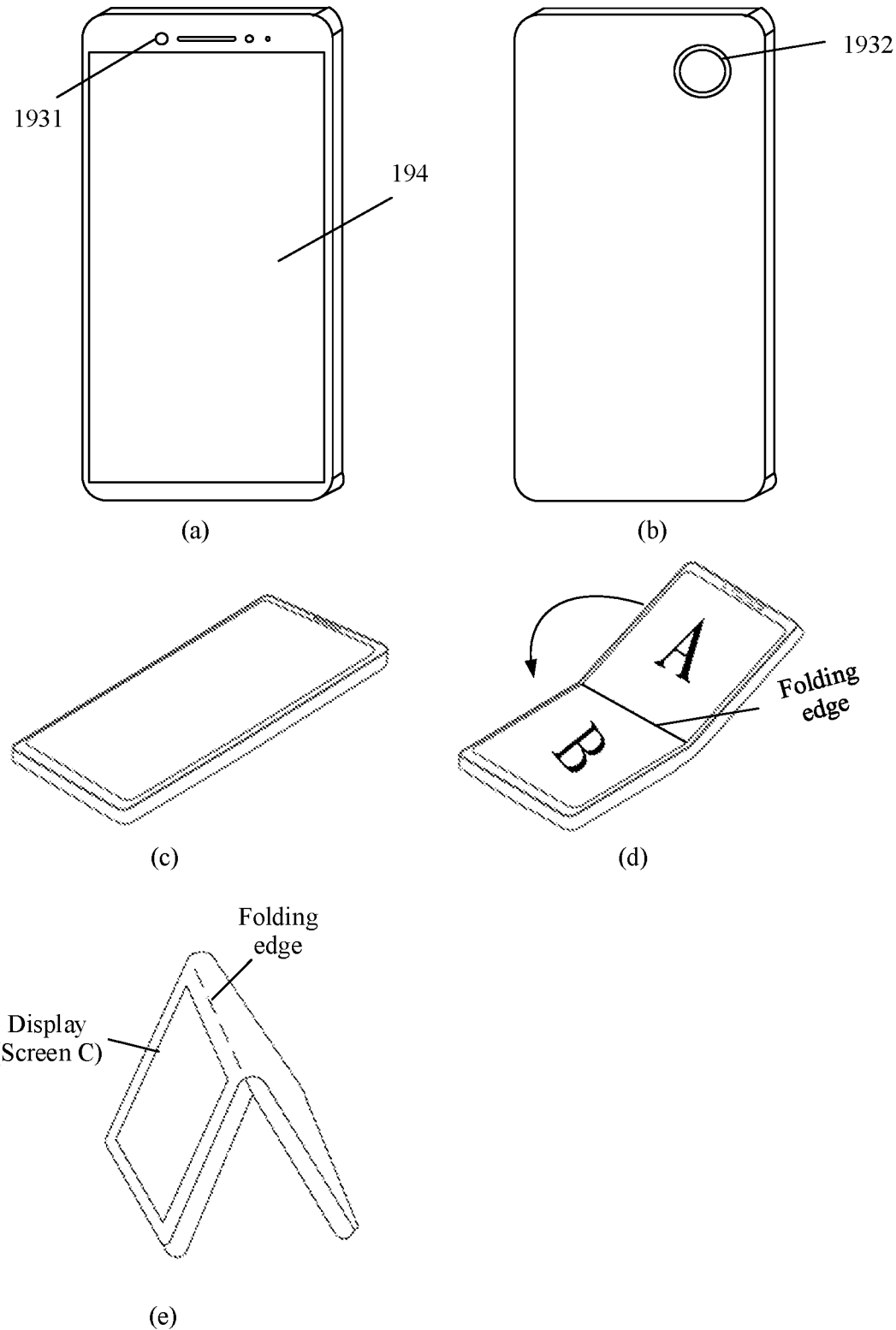
FIG. 2A is a layout diagram of a camera according to an embodiment of this application.

For example, for a layout of a camera on the electronic device 100, refer to FIG. 2A. A front side of the electronic device 100 is a plane on which the display 194 is located. As shown in (a) in FIG. 2A, a camera 1931 is located on the front side of the electronic device 100, and the camera is a front-facing camera. As shown in (b) in FIG. 2A, a camera 1932 is located on the back of the electronic device 100, and the camera is a rear-facing camera.

In an embodiment, the solutions in the embodiments of this application may be applied to the electronic device 100 with a foldable screen (that is, the display 194 can be folded) having a plurality of displays. The electronic device 100 with a foldable screen is shown in (c) in FIG. 2A. In response to an operation of a user, as shown in (d) in FIG. 2A, the display is inward folded (or outward folded) along a folding edge, so that the display forms at least two screens (for example, a screen A and a screen B). As shown in (e) in FIG. 2A, there is a display (for example, a screen C) on an outer side of the folded display. If a camera is disposed on the electronic device 100 on a surface on which the screen C is located, in an unfolded scenario of the electronic device 100 shown in (c) in FIG. 2A, the camera on the screen C is on the back of the electronic device 100, and may be considered as a rear-facing camera. In a folded scenario of the electronic device 100 shown in (e) in FIG. 2A, the camera on the screen C becomes to be on the front side of the electronic device 100, and may be considered as a front-facing camera. That is, the front-facing camera and the rear-facing camera in this application do not limit nature of the camera, and are merely a description of a position relationship.

Therefore, the electronic device 100 may determine, based on a position of a used camera on the electronic device 100, whether the camera is a front-facing camera or a rear-facing camera, and then determine a direction of collecting a sound. For example, if the electronic device 100 currently collects an image by using a rear-facing camera located on the back of the electronic device 100, the electronic device 100 needs to focus on collecting a sound on the back of the electronic device 100. For another example, if the electronic device 100 currently collects an image by using a front-facing camera located on the front side of the electronic device 100, the electronic device 100 needs to focus on collecting a sound on the front side of the electronic device 100. In this way, it is ensured that the collected sound can match the collected image.

The digital signal processor is configured to process a digital signal, and may process another digital signal in addition to the digital image signal. For example, when the electronic device 100 selects a frequency, the digital signal processor is configured to perform Fourier transform on frequency energy.

The video codec is configured to: compress or decompress a digital video. The electronic device 100 may support one or more types of video codecs. Therefore, the electronic device 100 may play or record videos in a plurality of coding formats, for example, moving picture experts group (moving picture experts group, MPEG)-1, MPEG-2, MPEG-3, and MPEG-4.

The NPU is a neural-network (NN) computing processor. The NPU quickly processes input information with reference to a structure of a biological neural network, for example, a transfer mode between human brain neurons, and may further continuously perform self-learning. Applications such as intelligent cognition of the electronic device 100, for example, image recognition, facial recognition, speech recognition, and text understanding, may be implemented through the NPU.

In some embodiments, the NPU recognizes, by using an image recognition technology, whether an image collected by the camera 193 includes a face image and/or a mouth image. Further, the NPU may further determine, based on data of the face image and/or the mouth image, a sound-making face or a sound-making mouth in the face image and/or the mouth image, to determine a sound pickup range in which directional voice recording needs to be performed.

The external memory interface 120 may be used to connect to an external storage card, for example, a micro SD card, to extend a storage capability of the electronic device 100. The external storage card communicates with the processor 110 through the external memory interface 120, to implement a data storage function. For example, files such as music and a video are stored in the external storage card.

The internal memory 121 may be configured to store computer-executable program code. The executable program code includes instructions. The processor 110 runs instructions stored in the internal memory 121 and/or instructions stored in the memory disposed in the processor, to perform various function applications and data processing of the electronic device 100.

The electronic device 100 may implement an audio function, for example, music playing and recording, through the audio module 170, the speaker 170A, the receiver 170B, the microphone 170C, the headset jack 170D, the application processor, and the like.

The audio module 170 is configured to convert digital audio data into analog audio electrical signal output, and is further configured to convert analog audio electrical signal input into digital audio data. The audio module 170 may include an analog-to-digital converter and a digital-to-analog converter. For example, the audio module 170 is configured to convert an analog audio electrical signal output by the microphone 170C into digital audio data. The audio module 170 may be further configured to encode and decode audio data. In some embodiments, the audio module 170 may be disposed in the processor 110, or some functional modules of the audio module 170 are disposed in the processor 110.

The speaker 170A, also referred to as a "loudspeaker", is configured to convert an audio electrical signal into a sound signal. The electronic device 100 may listen to music or answer a hands-free call by using the speaker 170A.

The receiver 170B, also referred to as an "earpiece", is configured to convert an electrical audio signal into a sound signal. When a call is answered or audio information is listened to by using the electronic device 100, the receiver 170B may be put close to a human ear to listen to a voice.

The microphone 170C, also referred to as a "mike" or a "mic", is configured to convert a sound signal into an electrical signal. When making a call or sending speech information, a user may place the mouth of the user near the microphone 170C to make a sound, to input a sound signal to the microphone 170C. The microphone 170C may be a built-in component of the electronic device 100, or may be an external accessory of the electronic device 100.

In some embodiments, the electronic device 100 may include one or more microphones 170C. Each microphone or a plurality of microphones may cooperate to implement functions of collecting sound signals in various directions and converting the collected sound signals into analog audio electrical signals, and may further implement noise reduction, sound source recognition, or a directional voice recording function.

Figure 2B:
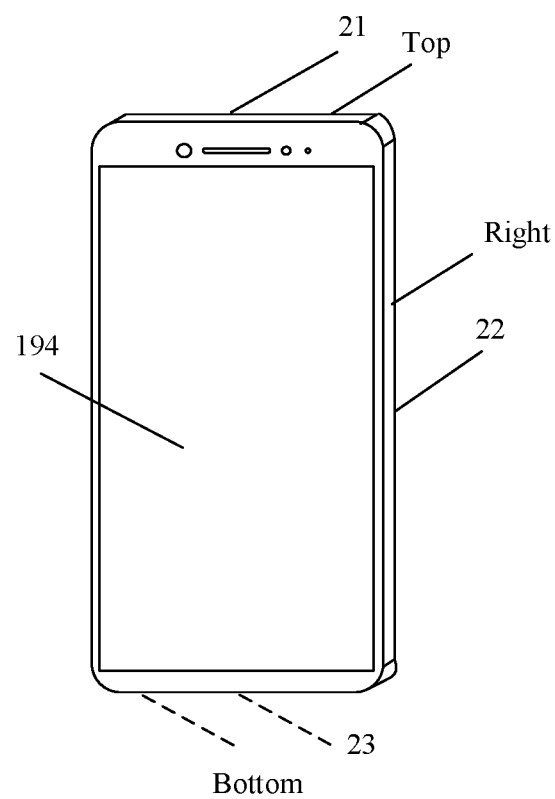
FIG. 2B(a) to FIG. 2B(d) are layout diagrams of a microphone according to an embodiment of this application.
Figure 2B:
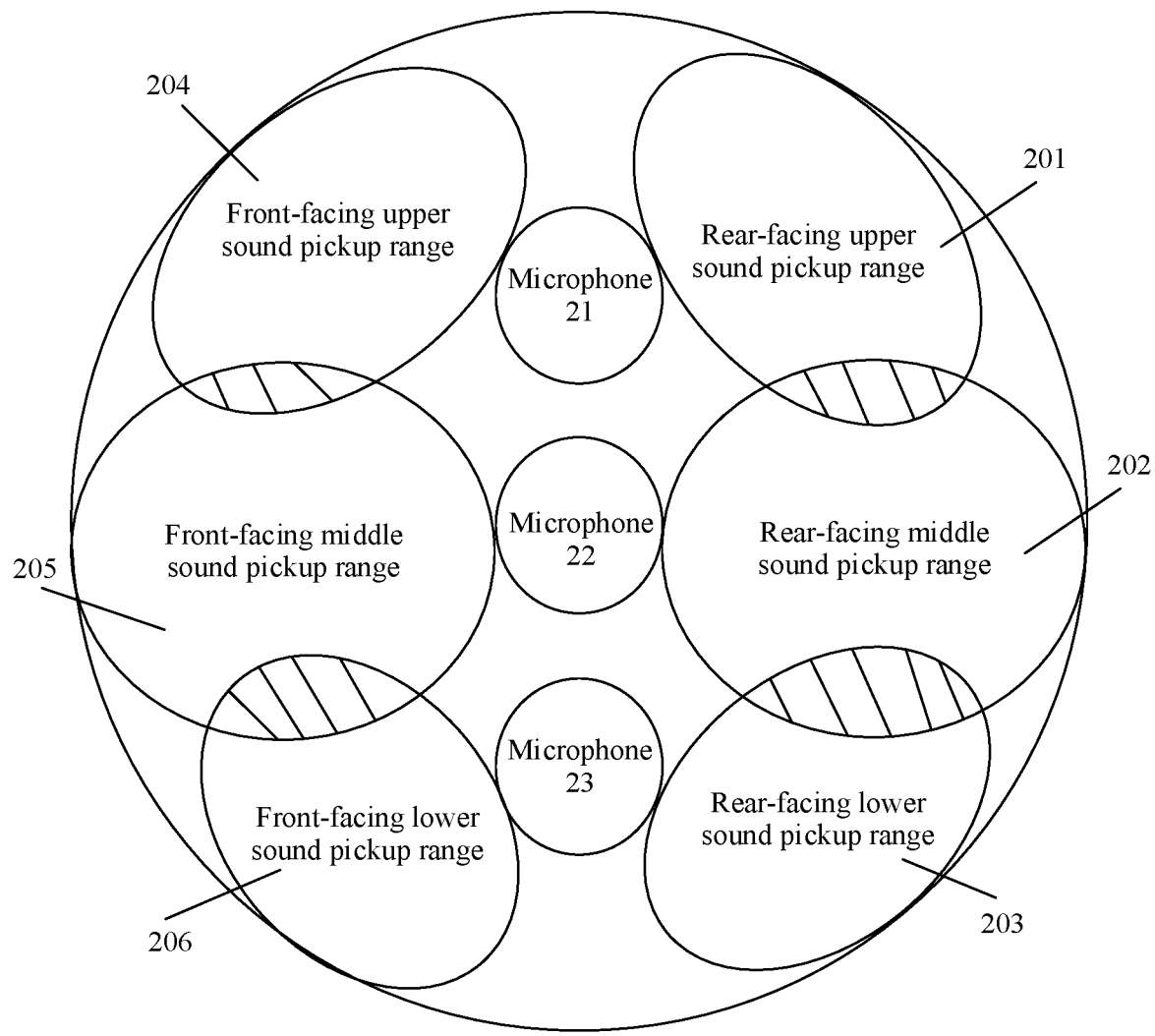
Figure 2B:
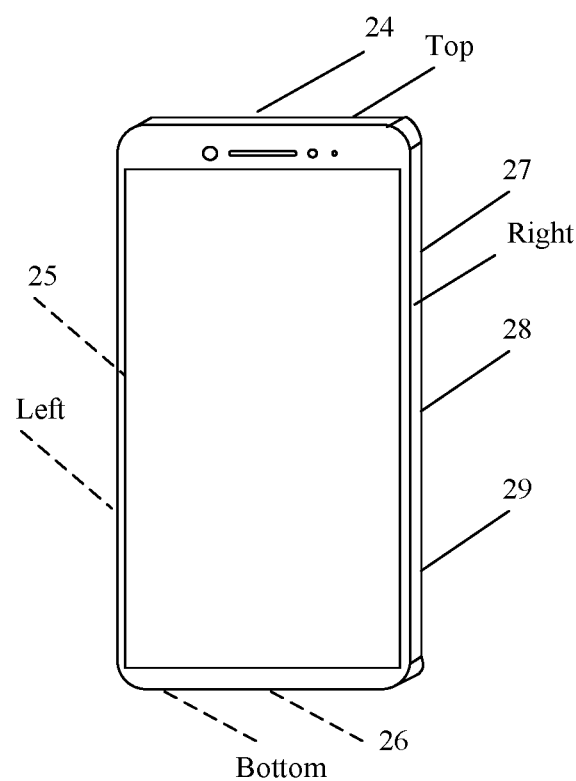
Figure 2B:
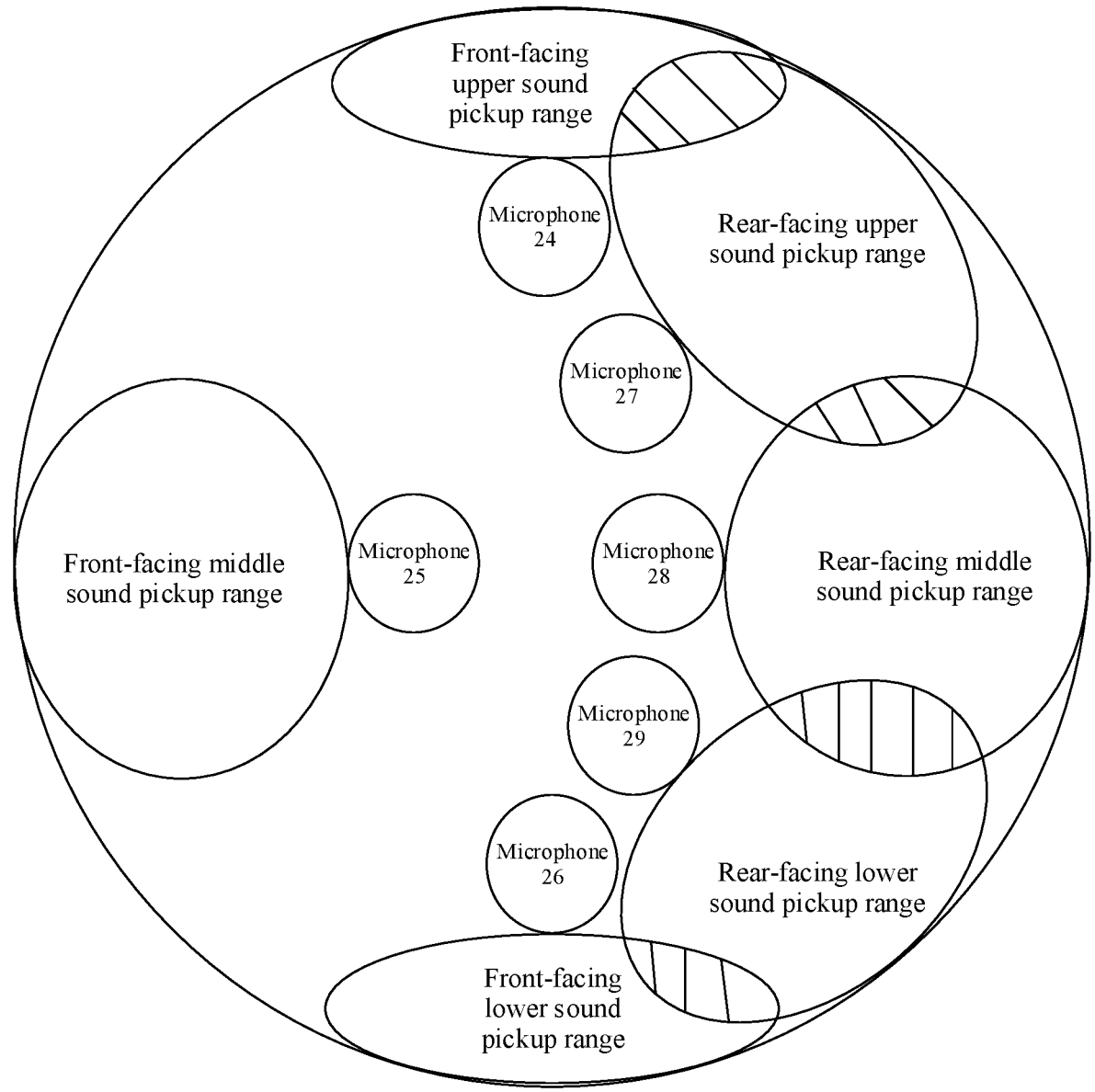

For example, as shown in FIG. 2B(a) to FIG. 2B(d), two schematic layout diagrams of a plurality of microphones on the electronic device 100 and sound pickup ranges corresponding to the microphones are provided as examples. As shown in FIG. 2B(a), when the electronic device 100 is placed at a position shown in the figure, the front side of the electronic device 100 is the plane on which the display 194 is located, a microphone 21 is located at the top of the electronic device 100 (usually on a side on which the earpiece and the camera are located), a microphone 22 is located on a right side of the electronic device 100, and a microphone 23 is located at the bottom of the electronic device 100 (a part at the bottom of the electronic device 100 shown in FIG. 2B(a) is invisible from a current angle, and a position of the microphone 23 is schematically indicated by using a dashed line).

It should be noted that, for "up", "down", "left", and "right" described in subsequent embodiments, refer to the orientation shown in FIG. 2B(a) to FIG. 2B(d). Details are not described subsequently.

In a schematic diagram of a sound pickup range shown in FIG. 2B(b), a sound pickup range corresponding to the microphone 21 includes a front-facing upper sound pickup range and a rear-facing upper sound pickup range, a sound pickup range corresponding to the microphone 22 includes a front-facing middle sound pickup range and a rear-facing middle sound pickup range, and a sound pickup range corresponding to the microphone 23 includes a front-facing lower sound pickup range and a rear-facing lower sound pickup range. A combination of the microphones 21 to 23 may collect sound signals in various directions around the electronic device 100. The front-facing camera may correspond to a front-facing sound pickup range, and the rear-facing camera may correspond to a rear-facing sound pickup range. Therefore, when the electronic device 100 records a video by using the front-facing camera, it is determined that the sound pickup range is the front-facing sound pickup range. Further, based on the position of the sound-making face or the sound-making mouth in the video picture, it is more accurately determined that the sound pickup range is a range included in the front-facing sound pickup range. An example method is described in detail below.

It may be understood that the electronic device 100 may alternatively include a greater quantity of microphones. As shown in FIG. 2B(c), the electronic device 100 includes six microphones. A microphone 24 is located at the top of the electronic device 100, a microphone 25 is located on a left side of the electronic device 100, a microphone 26 is located at the bottom of the electronic device 100, and microphones 27 to 29 are located on a right side of the electronic device 100. A part on the left side of the electronic device 100 shown in FIG. 2B(c) is invisible from a current angle, and positions of the microphone 25 and the microphone 26 are schematically indicated by using dashed lines. In a schematic diagram of a sound pickup range shown in FIG. 2B(d), a sound pickup range corresponding to the microphone 24 includes a front-facing upper sound pickup range, a sound pickup range corresponding to the microphone 25 includes a front-facing middle sound pickup range, a sound pickup range corresponding to the microphone 26 includes a front-facing lower sound pickup range, a sound pickup range corresponding to the microphone 27 includes a rear-facing upper sound pickup range, a sound pickup range corresponding to the microphone 28 includes a rear-facing middle sound pickup range, and a sound pickup range corresponding to the microphone 29 includes a rear-facing lower sound pickup range. A combination of the microphones 24 to 29 may collect sound signals in various directions around the electronic device 100.

As shown in FIG. 2B(b) and FIG. 2B(d), sound pickup ranges in which the microphones of the electronic device 100 collect audio signals partially overlap, that is, in shadow parts in FIG. 2B(b) and FIG. 2B(d). In an audio recording process, audio signals in an overlapping part need to be fused. For a same direction, a sound signal collected by a microphone may have better sound quality (for example, a higher signal-to-noise ratio and lower spike noise and glitch noise), and a sound signal collected by another microphone may have worse sound quality. In this case, audio data with better sound quality in a corresponding direction is selected for fusion processing, and audio with a better effect is recorded and generated based on the processed audio data. Further, if a sound pickup range corresponding to the sound-making face or the sound-making mouth falls within sound pickup ranges of a plurality of microphones, audio data collected by the plurality of microphones may be fused, to obtain audio corresponding to the sound-making face or the sound-making mouth.

In some embodiments, the microphone 170C may be a directional microphone that may collect a sound signal in a particular direction. The microphone 170C may alternatively be a non-directional microphone, which collects sound signals in various directions or may collect a sound signal in a range based on a position of the microphone 170C on the electronic device 100.

In some other embodiments, the microphone 170C may be rotated, and the electronic device 100 may adjust a sound pickup direction by rotating the microphone. For the sound pickup range corresponding to the sound-making face or the sound-making mouth, the electronic device 100 may configure one microphone 170C, and perform sound pickup in various directions by rotating the microphone. When a plurality of microphones 170C are configured on the electronic device 100, an audio signal in a corresponding sound pickup range may be picked up by using a combination of different microphones 170C. For example, some of the microphones 170C may be used for sound pickup, with no need to use all of the microphones 170C of the electronic device 100. For another example, audio signals collected by some microphones 170C are enhanced, and audio signals collected by some microphones 170C are weakened.

A quantity of microphones 170C is not specifically limited in this embodiment of this application.

The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

The distance sensor 180F is configured to measure a distance. The electronic device 100 may measure a distance in an infrared manner or a laser manner. In some embodiments, in a photographing scenario, the electronic device 100 may measure a distance by using the distance sensor 180F, to implement quick focusing.

The touch sensor 180K is also referred to as a "touch panel". The touch sensor 180K may be disposed on the display 194, and the touch sensor 180K and the display 194 form a touchscreen, also referred to as a "touch screen". The touch sensor 180K is configured to detect a touch operation performed on or near the touch sensor.

For example, in this embodiment of this application, the electronic device 100 may detect, by using the touch sensor 180K, an operation of giving a video recording start indication and/or a video recording stop indication by the user.

It may be understood that the structure shown in this embodiment of this application does not constitute a limitation on the electronic device 100. In some other embodiments of this application, the electronic device 100 may include more or fewer components than those shown in the figure, combine some components, split some components, or have different component arrangements. The components shown in the figure may be implemented by using hardware, software, or a combination of software and hardware.

A software system of the electronic device 100 may use a layered architecture, an event-driven architecture, a microkernel architecture, a micro service architecture, or a cloud architecture. In an embodiment, an Android system of a layered architecture is used as an example to illustrate the software structure of the electronic device 100.

Figure 3:
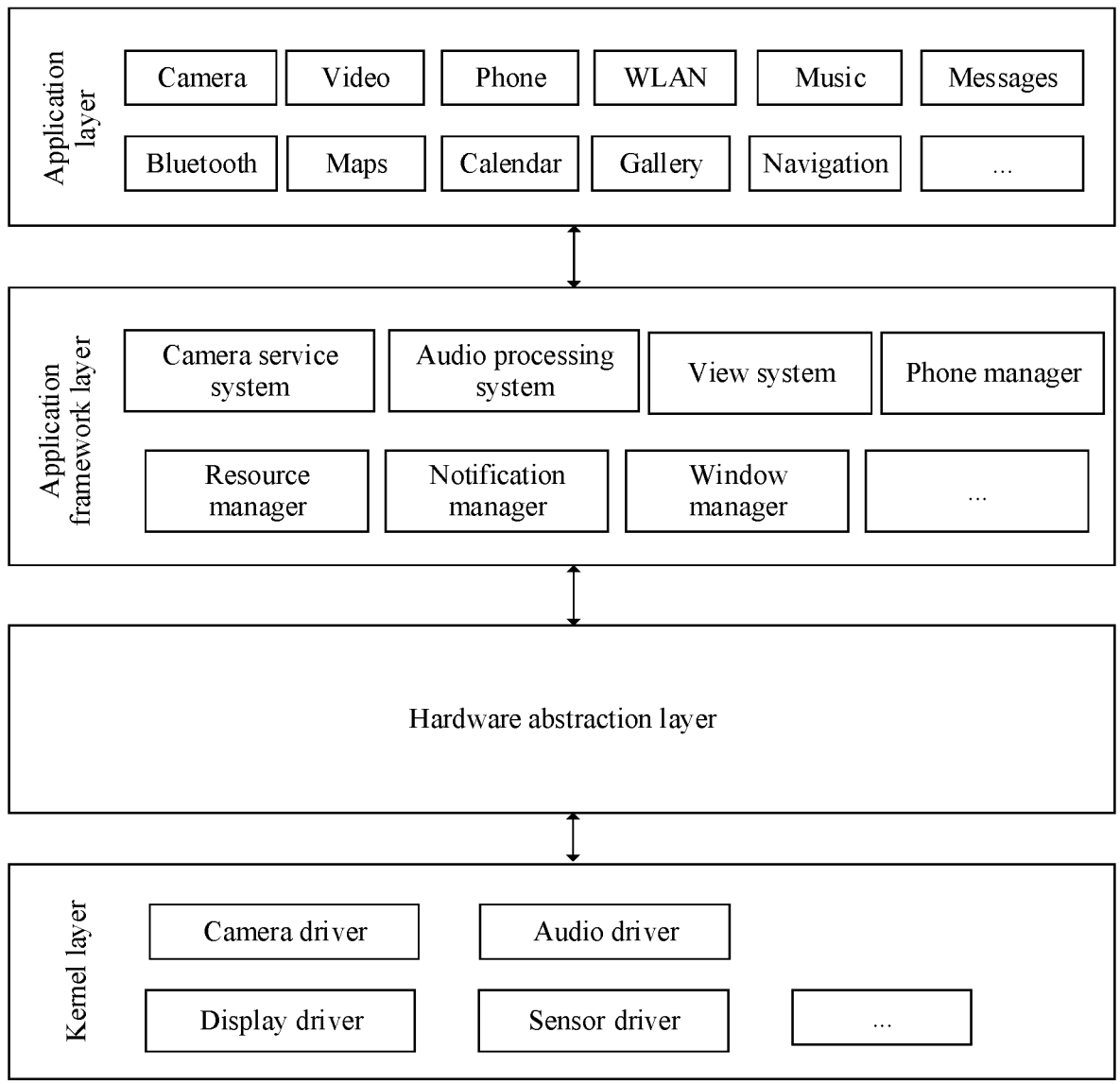
FIG. 3 is a block diagram of a software structure of an electronic device according to an embodiment of this application.

FIG. 3 is a block diagram of a software structure of the electronic device 100 according to an embodiment of the present disclosure.

In a layered architecture, software is divided into several layers, and each layer has a clear role and task. The layers communicate with each other through a software interface. In some embodiments, an operating system (for example, an Android system) of the electronic device is divided into four layers, which are respectively a kernel layer, a hardware abstraction layer (HAL), an application framework layer, and an application layer from bottom to top.

The kernel layer is a layer between hardware and software. The kernel layer includes at least a camera driver, an audio driver, a display driver, and a sensor driver.

In some embodiments, for example, in a video recording application scenario, the touch sensor 180K transmits a received touch operation to an upper-layer camera application by using the sensor driver at the kernel layer. After the camera application recognizes that the touch operation is an operation of starting video recording, the camera application invokes, by using the camera driver, the camera 193 to record a video picture, and invokes, by using the audio driver, the microphone 170C to record audio. In the foregoing process, a corresponding hardware interrupt is sent to the kernel layer, and the kernel layer may process a corresponding operation into an original input event (for example, the touch operation includes information such as touch coordinates and a timestamp of the touch operation). The original input event is stored at the kernel layer.

The HAL is located between the kernel layer and the application framework layer, and is configured to define an interface implemented by application driver hardware, and convert a value implemented by the driver hardware into a software-implemented program language. For example, a value of the camera driver is recognized, the value is converted into a software program language, and the software program language is uploaded to the application framework layer, to invoke a camera service system.

In some embodiments, the HAL may upload, to the application framework layer for further processing, raw data obtained after face image recognition is performed on the video picture collected by the camera 193. The raw data obtained after face image recognition may include, for example, face image data and/or mouth image data. The face image data may include a quantity of sound-making face images, position information of a sound-making face image in the video picture, and the like. The mouth image data may include a quantity of sound-making mouth images, position information of a sound-making mouth image in the video picture, and the like.

For example, priority orders of the face image data and the mouth image data are preset. A vocal organ of a person is a mouth of the person, and a sound pickup range may be more accurately determined by using sound-making mouth data. Therefore, a priority order of the mouth image data is set to be higher than a priority order of the face image data. For example, the HAL may determine sound-making face image data and sound-making mouth image data based on the collected video picture, and upload the sound-making mouth data as raw data based on the priority order. Subsequently, based on the sound-making mouth image data and a correspondence between the video picture and panoramic audio, an audio processing system determines a sound pickup range corresponding to the sound-making mouth image. For another example, the HAL determines only sound-making face image data based on the collected video picture, and uploads the sound-making face image data as raw data, to determine a sound pickup range corresponding to the sound-making face image. For still another example, the HAL determines only sound-making mouth image data based on the video picture, and uploads the sound-making mouth image data as raw data, to determine a sound pickup range corresponding to the sound-making mouth image.

The application framework layer provides an application programming interface (API) and a programming framework for an application at the application layer. The application framework layer obtains the original input event from the kernel layer through the HAL, and identifies a control corresponding to the input event. The application framework layer includes some predefined functions.

As shown in FIG. 3, the application framework layer may include the camera service system, the audio processing system, a view system, a phone manager, a resource manager, a notification manager, a window manager, and the like.

The camera service system serves the camera application, and is used to invoke the camera application to collect an image based on an original event that is input by the kernel layer.

The audio processing system is used to manage audio data and process the audio data by using different audio algorithms. For example, the audio processing system cooperates with the camera service system to process a collected audio signal in a video recording process. For example, based on face image data, the audio processing system determines a sound pickup range, enhances an audio signal in the sound pickup range, and weakens an audio signal outside the sound pickup range.

In some embodiments, the camera application invokes the camera service system at the application framework layer to start the camera application. Then, the camera driver is started by invoking the kernel layer, and a video is captured by using the camera 193. The audio processing system is invoked, the audio driver is started by using the kernel layer, a sound signal is collected by using the microphone 170C, an analog audio electrical signal is generated, digital audio data is generated from the analog audio electrical signal by using the audio module 170, and audio is generated based on the digital audio data.

The view system includes visual controls, such as a control for displaying a text and a control for displaying an image. The view system may be configured to construct an application. A display interface may include one or more views. For example, a display interface including a notification icon of Messages may include a text display view and a picture display view.

The phone manager is configured to provide a communication function of the electronic device 100, for example, management of a call status (including answering, declining, or the like).

The resource manager provides, for an application, various resources such as a localized character string, an icon, a picture, a layout file, and a video file.

The notification manager enables an application to display notification information in the status bar, and may be configured to transmit a notification-type message. The displayed information may automatically disappear after a short pause without user interaction. For example, the notification manager is configured to notify download completion, provide a message notification, and the like. The notification manager may alternatively be a notification that appears in a top status bar of the system in a form of a graph or a scroll bar text, for example, a notification of an application running on the background or a notification that appears on a screen in a form of a dialog window. For example, text information is displayed in the status bar, an announcement is given, the electronic device vibrates, or the indicator light blinks.

The window manager is configured to manage a window program. The window manager may obtain a size of a display, determine whether there is a status bar, perform screen locking, take a screenshot, and the like.

The application layer may include a series of application packages.

As shown in FIG. 3, the application packages may include applications such as Camera, Video, Phone, WLAN, Music, Messages, Bluetooth, Maps, Calendar, Gallery, and Navigation.

The application layer and the application framework layer run on a virtual machine. The virtual machine executes Java files at the application layer and the application framework layer as binary files. The virtual machine is configured to perform functions such as object lifecycle management, stack management, thread management, security and exception management, and garbage collection.

The audio processing method provided in the embodiments of this application is described below by using an example in which the electronic device is a mobile phone having the structures shown in FIG. 1 and FIG. 3.

In some embodiments, the method in the embodiments of this application may be applied to a scenario in which a user indication is received to directly start a camera application (which may also be referred to as a camera for short below), or may be applied to a scenario in which a user starts another third-party application (for example, a short video application, a live broadcast application, or a video call application) to invoke and start a camera.

The following uses a scenario in which a camera is directly started as an example for description.

In an embodiment, the user may indicate, in a manner such as a touch operation, a keystroke operation, a mid-air gesture operation, or a voice operation, the mobile phone to start the camera and display a shooting preview interface. For example, on a main interface 401 shown in FIG. 4(*a*), the mobile phone starts the camera in response to an operation of tapping a camera icon 41 by the user, and displays a shooting preview interface 402 shown in FIG. 4(*b*). Alternatively, the mobile phone starts the camera in response to a voice indication operation of opening the camera by the user, and displays a shooting preview interface 402 shown in FIG. 4(*b*). A control 421 is used to set a shooting function of the mobile phone, for example, delayed shooting. A control 422 is used to enable or disable a filter function. A control 423 is used to enable or disable a flash function.

On the shooting preview interface, the camera can switch between different functions in response to an operation of tapping different functional controls by the user. For example, as shown in FIG. 4(*b*), controls 431 to 434 are used to switch between functions that can be implemented by the camera. For example, the control 432 is currently selected, and the shooting function is started. For another example, in response to tapping on the control 431 by the user, the camera switches to a portrait shooting function. Alternatively, in response to an operation of tapping the control 433 by the user, the camera switches to a video recording function. Alternatively, in response to an operation of tapping the control 434 by the user, more functions such as panoramic shooting to which the camera can switch are displayed.

The following provides a description by using an example in which the mobile phone starts the video recording function to record a video picture and audio.

Generally, after the mobile phone starts the camera, the shooting function is started by default. After an operation of switching the function is detected, for example, an operation of tapping the video recording control is detected, the video recording function is started, and a video recording preview interface is displayed. For example, after starting the camera, the mobile phone displays the shooting preview interface 402 shown in FIG. 4(*b*) by default. After detecting an operation of tapping the control 433 by the user, the mobile phone starts the video recording function, and displays a video recording preview interface 403 shown in FIG. 4(*c*). Alternatively, in other examples, the mobile phone may alternatively start the video recording function by default after starting the camera. For example, after starting the camera, the mobile phone directly displays the video recording preview interface 403 shown in FIG. 4(*c*). That is, after detecting an operation of opening the camera application by the user, the mobile phone may start the video recording function. In still other examples, the mobile phone starts the video recording function by detecting a mid-air gesture, a voice indication operation, or the like. For example, if the mobile phone receives a voice command "open the camera to perform video recording" from the user, the mobile phone directly starts the video recording function of the camera and displays the video recording preview interface. In still other examples, in another possible implementation, after starting the camera, the mobile phone enters, by default, a function that is last applied before the camera is closed last time, for example, the portrait shooting function. Then, the mobile phone starts the video recording function of the camera by detecting an operation of starting the video recording function, and displays the video recording preview interface.

In some embodiments, after switching to the video recording function is detected by the mobile phone, the user is first asked whether to enable a voice enhancement mode. After the user determines to enable the voice enhancement mode, the voice enhancement mode is enabled. Alternatively, the voice enhancement mode is automatically enabled after switching to the video recording function is detected by the mobile phone. In some other embodiments, after switching to the video recording function is detected by the mobile phone, the video recording preview interface is first displayed; then, after an operation of giving a shooting indication by the user is detected, the voice enhancement mode is enabled based on a user indication, or the voice enhancement mode is automatically enabled.

Figure 4A:
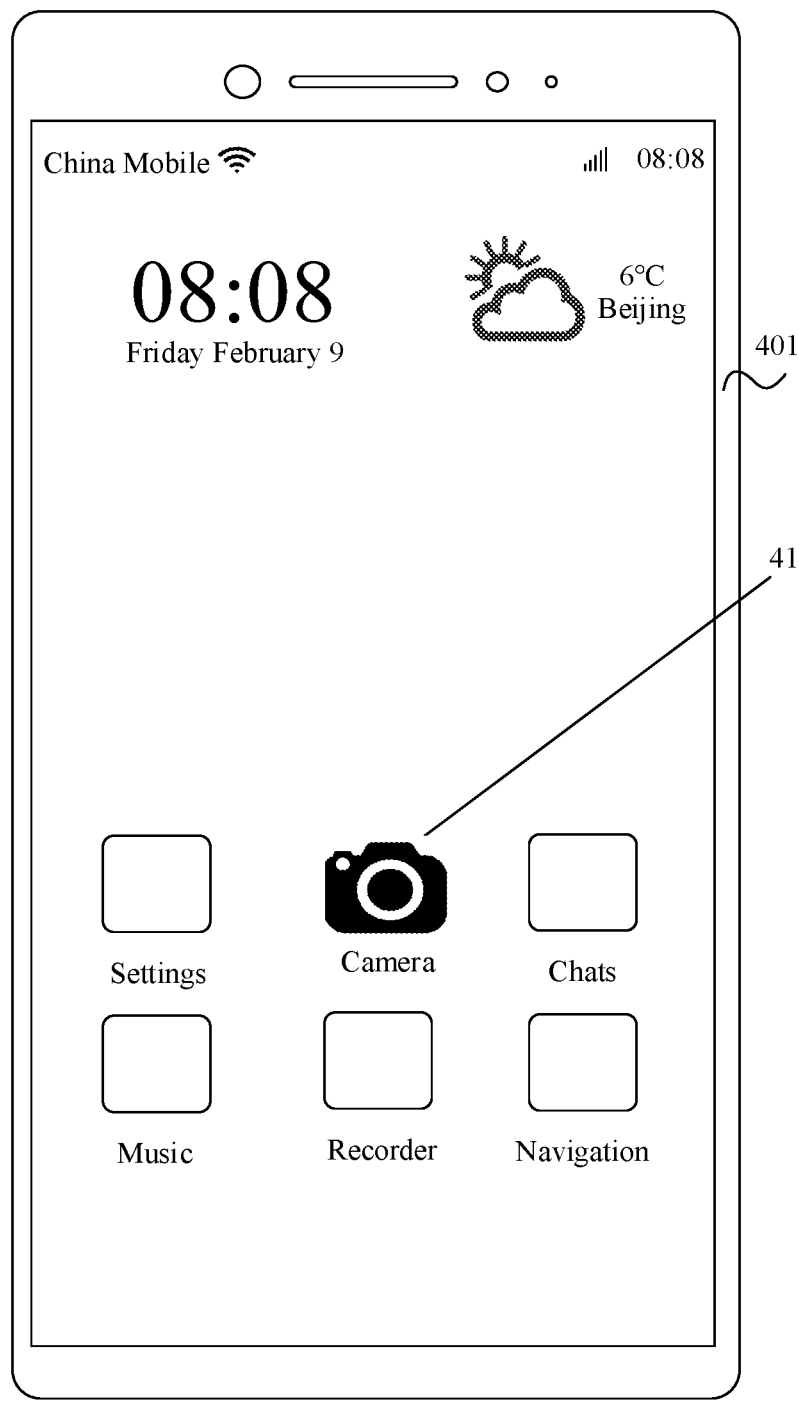
FIG. 4(a) to FIG. 4(d) are diagrams of a group of interfaces according to an embodiment of this application.
Figure 4B:
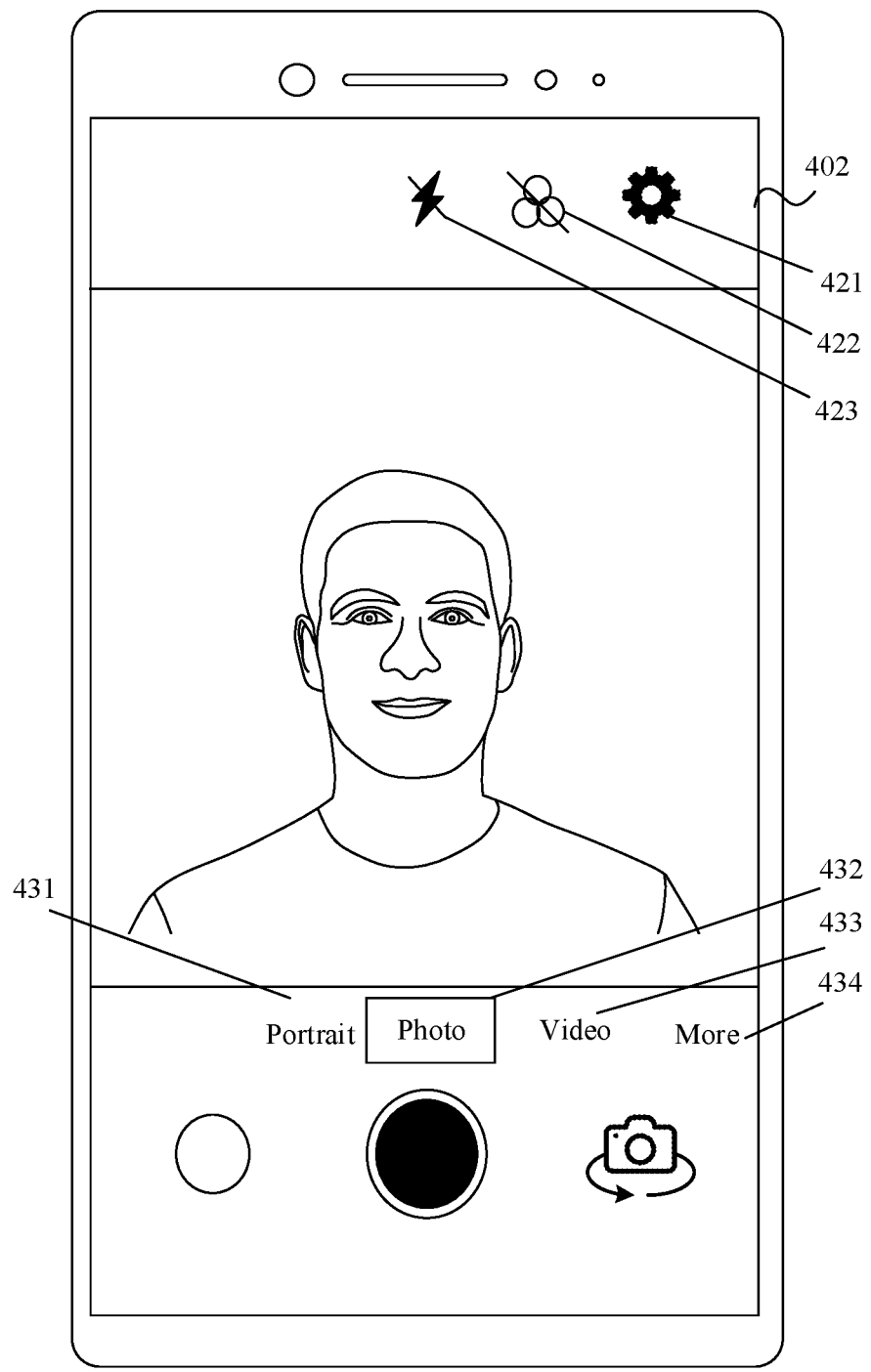
Figure 4C:
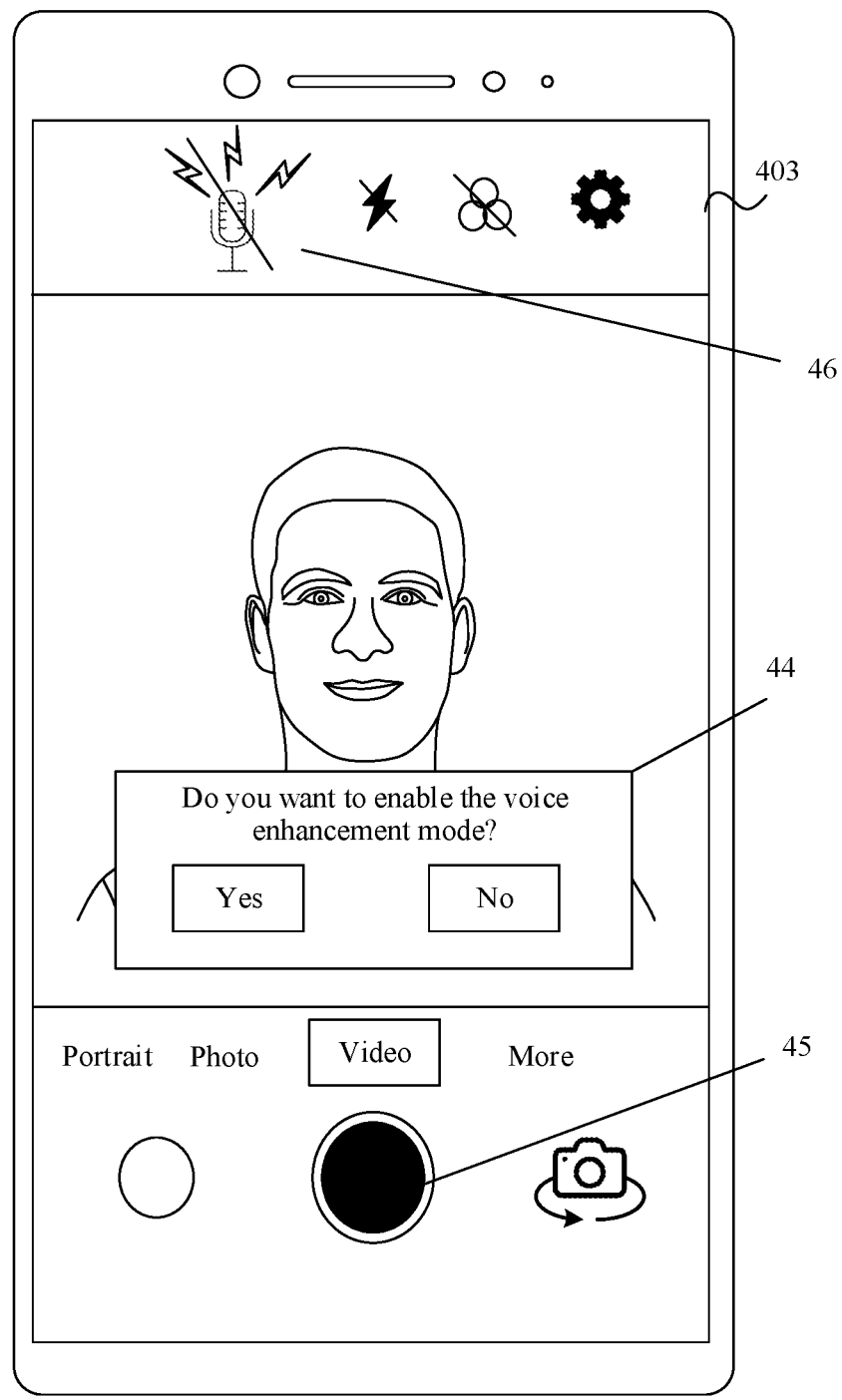

For example, as shown in FIG. 4(b), in response to an operation of tapping the video recording control 433, the mobile phone displays the video recording preview interface 403 shown in FIG. 4(c), and displays a prompt box 44 on the video recording preview interface 403, to prompt the user whether to enable the voice enhancement mode. If the mobile phone detects an operation of tapping Yes by the user, the mobile phone enables the voice enhancement mode and displays a shooting interface 404 shown in FIG. 4(d). Alternatively, after switching from the shooting preview interface 402 to the video recording function, the mobile phone directly enables the voice enhancement mode and displays the shooting interface 404 shown in FIG. 4(d).

For another example, after switching to the video recording function, the mobile phone displays only the video recording preview interface 403 shown in FIG. 4(c). Then, in response to an operation of tapping a shooting control 45 by the user, the mobile phone further displays the prompt box 44, and determines whether to enable the voice enhancement mode based on a selection of the user. Alternatively, after detecting, on the video recording preview interface 403, an operation of tapping the shooting control 45 by the user, the mobile phone directly enables the voice enhancement mode and displays the shooting interface 404 shown in FIG. 4(d).

In some other embodiments, after detecting, on the video recording preview interface or in a process of recording a video picture, an operation of enabling or disabling the voice enhancement mode by the user, the mobile phone enables or disables the voice enhancement mode. The operation of enabling the voice enhancement mode may include, for example, an operation of tapping a preset control or a voice operation.

For example, on the video recording preview interface 403 shown in FIG. 4(c), the mobile phone may enable or disable the voice enhancement mode by detecting an operation performed by the user on a control 46. For example, a current display status of the control 46 indicates that the mobile phone currently does not enable the voice enhancement mode, and the mobile phone enables the voice enhancement mode after detecting an operation of tapping the control 46 by the user. Before shooting starts or in a shooting process, the mobile phone may enable or disable the voice enhancement mode by detecting an operation of tapping the control 46 by the user.

After the voice enhancement mode is enabled, the mobile phone starts to record a video picture after detecting an operation of giving a shooting indication by the user, and may perform processing such as video encoding on the collected video picture, to generate and store a video file.

Figure 4D:
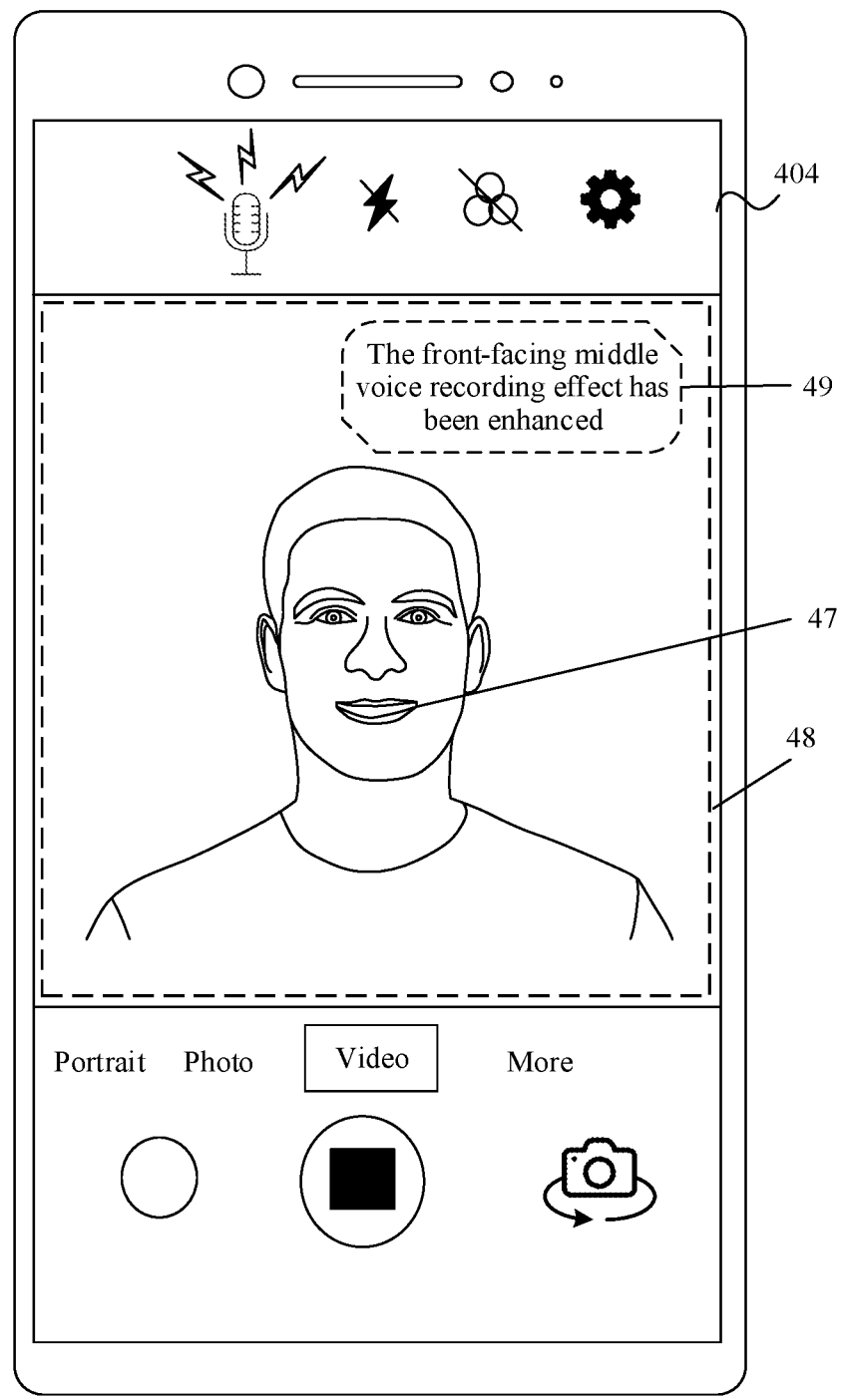

For example, on the video recording preview interface 403 shown in FIG. 4(c), in response to an operation of tapping the shooting control 45 by the user, the mobile phone displays the shooting interface 404 shown in FIG. 4(d), and starts to record a video picture.

The voice enhancement mode is used to enhance audio collection of some objects in a video picture of a shot video, thereby improving an audio recording effect. For example, if the user performs video recording by using a camera in an interview process, the user needs to focus on collecting a voice of an interviewed person. The operation of giving a shooting indication by the user may include, for example, a plurality of operation manners such as an operation of tapping the shooting control and a voice indication operation.

Figure 5:
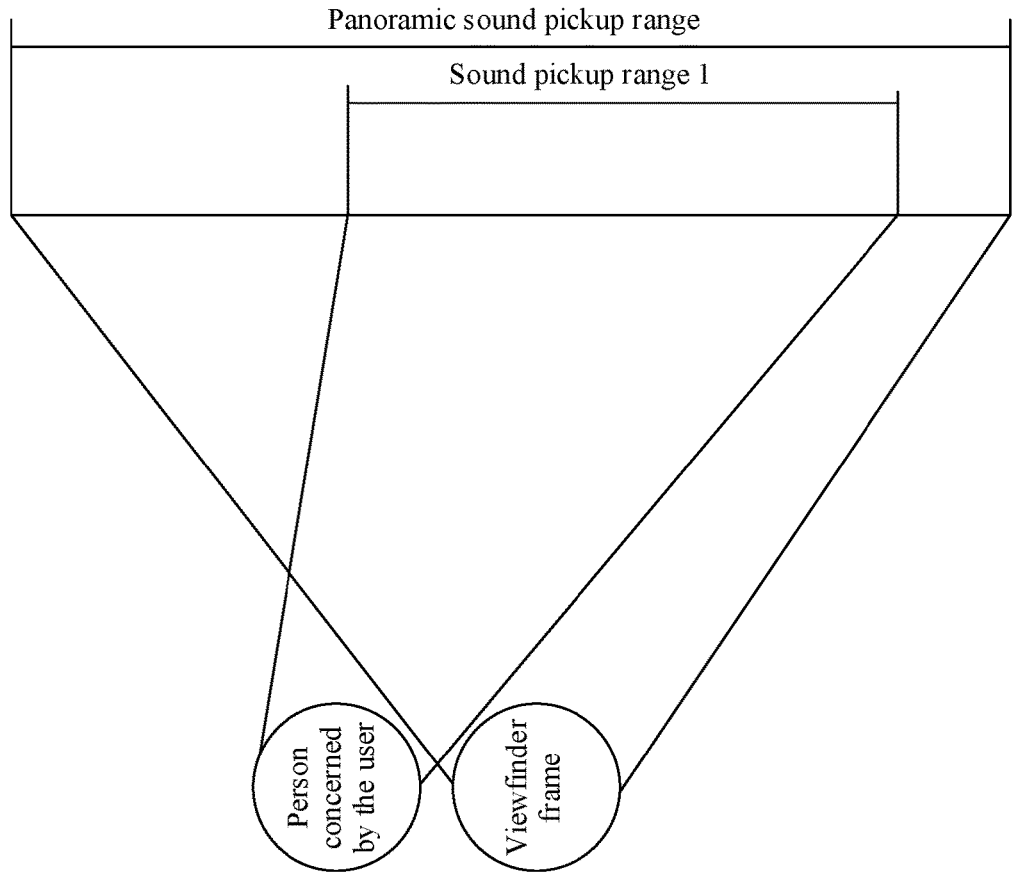
FIG. 5 is a diagram of a sound pickup range according to an embodiment of this application.
Figure 5:
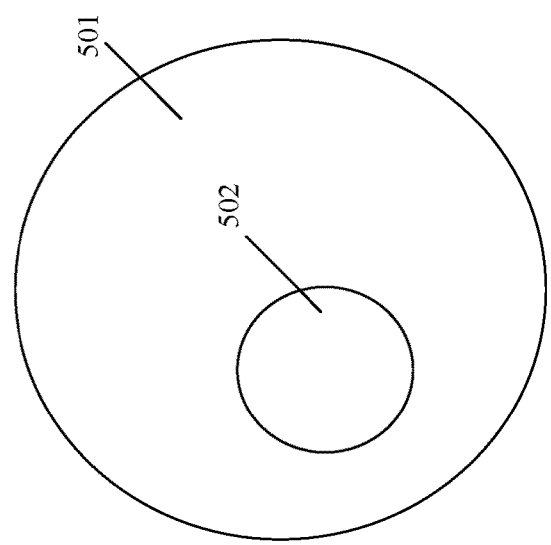

For example, as shown in (a) in FIG. 5, a large circle 501 is used to represent a maximum range (which may also be described as a panoramic sound pickup range) in which all current microphones of the mobile phone can perform sound pickup, and a small circle 502 is used to represent a sound pickup range corresponding to a person (usually a person who is making a sound) concerned by the user. For another example, as shown in (b) in FIG. 5, the sound pickup range (that is, a sound pickup range 1) of the person concerned by the user is in the panoramic sound pickup range. In this embodiment of this application, a sound pickup range in which voice recording needs to be enhanced may be determined based on position information of an image of the person concerned by the user in a recorded video picture. That is, an audio recording effect in the sound pickup range 1 shown in (b) in FIG. 5 is enhanced. Therefore, in recorded audio, impact of other noise in panoramic audio on a sound made by the person concerned by the user is reduced.

In some embodiments, a face image that is recognized by the mobile phone and that is making a sound may be described as a first face image, and a mouth image that is making a sound may be described as a first mouth image; or may be described as a sound-making face image or a sound-making mouth image. There may be one or more persons who are making sounds in the video picture. Therefore, there are one or more first face images, and there are one or more first mouth images. It may be understood that, if some persons are making sounds in the currently shot video picture, but the mobile phone fails to recognize that the persons are making sounds, face images or mouth images of the unrecognized persons who are making sounds are not classified as the first face image or the first mouth image.

Therefore, after the mobile phone enables the voice enhancement mode and starts to record a video picture, the mobile phone needs to recognize a first face image or a first mouth image, and determines, based on the first face image or the first mouth image, a first sound pickup range in which a voice recording effect needs to be enhanced, to obtain a better voice recording effect.

For example, after determining the first sound pickup range, the mobile phone invokes a microphone corresponding to the first sound pickup range, to enhance an audio signal in the first sound pickup range. In some scenarios, the mobile phone includes one or more microphones, and the one or more microphones are configured to collect first audio (that is, an initial audio signal). When a sound pickup range of a first microphone in the one or more microphones includes a part or all of the first sound pickup range, an audio signal that is in the first sound pickup range and that is in the sound pickup range of the first microphone is enhanced, an audio signal that is outside the first sound pickup range and that is in the sound pickup range of the first microphone is weakened, and/or an audio signal of a microphone other than the first microphone in the one or more microphones is weakened, to obtain second audio (that is, audio corresponding to the first face image or the first mouth image). In some other scenarios, the mobile phone includes at least two microphones, and the at least two microphones are configured to collect the first audio. When a sound pickup range of a second microphone in the at least two microphones does not include the first sound pickup range, the second microphone is disabled, where audio collected by a microphone other than the second microphone in the at least two microphones is the second audio. Alternatively, when the second microphone is disabled, an audio signal that is in the first sound pickup range and that is in a sound pickup range of a microphone other than the second microphone in the at least two microphones is enhanced, and/or an audio signal that is outside the first sound pickup range and that is in the sound pickup range of the microphone other than the second microphone in the at least two microphones is weakened.

For example, a microphone 1 and a microphone 2 are configured on the mobile phone. If the first sound pickup range is in a sound pickup range of the microphone 1, after obtaining an initial audio signal by using the microphone 1 and the microphone 2, the mobile phone may enhance an audio signal that is in the initial audio signal, that is in the first sound pickup range, and that is collected by the microphone 1; weaken an audio signal that is in the initial audio signal, that is outside the first sound pickup range, and that is collected by the microphone 1; and weaken an audio signal collected by the microphone 2, to obtain audio corresponding to the first face image or the first mouth image. Alternatively, the mobile phone disables the microphone 2, enhances an audio signal that is in the first sound pickup range and that is in an audio signal collected by the microphone 1, and weakens an audio signal that is outside the first sound pickup range and that is in the audio signal collected by the microphone 1, to obtain audio corresponding to the first face image or the first mouth image. For another example, a microphone 1 and a microphone 2 are configured on the mobile phone. The first sound pickup range includes a sound pickup range 1 in a sound pickup range of the microphone 1 and a sound pickup range 2 in a sound pickup range of the microphone 2. That is, the first sound pickup range is a union set of the sound pickup range 1 and the sound pickup range 2. In this case, after obtaining an initial audio signal by using the microphone 1 and the microphone 2, the mobile phone may enhance an audio signal that is in the sound pickup range 1 of the microphone 1 and that is in the initial audio signal and an audio signal that is in the sound pickup range 2 of the microphone 2 and that is in the initial audio signal, and weaken a remaining audio signal in the initial audio signal, to obtain audio corresponding to the first face image or the first mouth image. It may be understood that the sound pickup range 1 and the sound pickup range 2 may completely or partially overlap.

For example, the shooting interface 404 is shown in FIG. 4(*d*), and the shooting interface 404 includes a viewfinder frame 48 used to display a video picture. A sound pickup range corresponding to the viewfinder frame 48 is a maximum sound pickup range of a currently recorded video picture. In the video picture currently being recorded, the mobile phone recognizes a first face image 47, and it is assumed that the first face image is located at a central position of the viewfinder frame 48. In this case, the mobile phone determines that the first sound pickup range is a central position of the maximum sound pickup range. The mobile phone enhances an audio signal in the first sound pickup range. In an embodiment, a prompt box 49 is displayed on the shooting interface 404, and is used to prompt the user that a voice recording effect of a middle position is currently enhanced. The prompt box 49 may be continuously displayed in a shooting process, and displayed content varies with a change of the first sound pickup range. The prompt box 49 is automatically hidden after shooting is stopped. Alternatively, the prompt box 49 is displayed only in a preset time period, and automatically disappears after the preset time period, to avoid blocking the video picture displayed in the viewfinder frame 48.

It may be learned that, in a process of recording audio, the mobile phone may obtain, by enhancing an audio signal in the first sound pickup range, audio corresponding to a sound-making face or a sound-making mouth, to enhance a sound receiving effect for the sound-making face or the sound-making mouth, thereby reducing interference of external noise. Further, on the basis of enhancing the audio signal in the first sound pickup range, an audio signal outside the first sound pickup range may be further weakened, to obtain a better voice recording effect. Alternatively, only the audio signal outside the first sound pickup range is weakened, to reduce interference of external noise.

Figure 6:
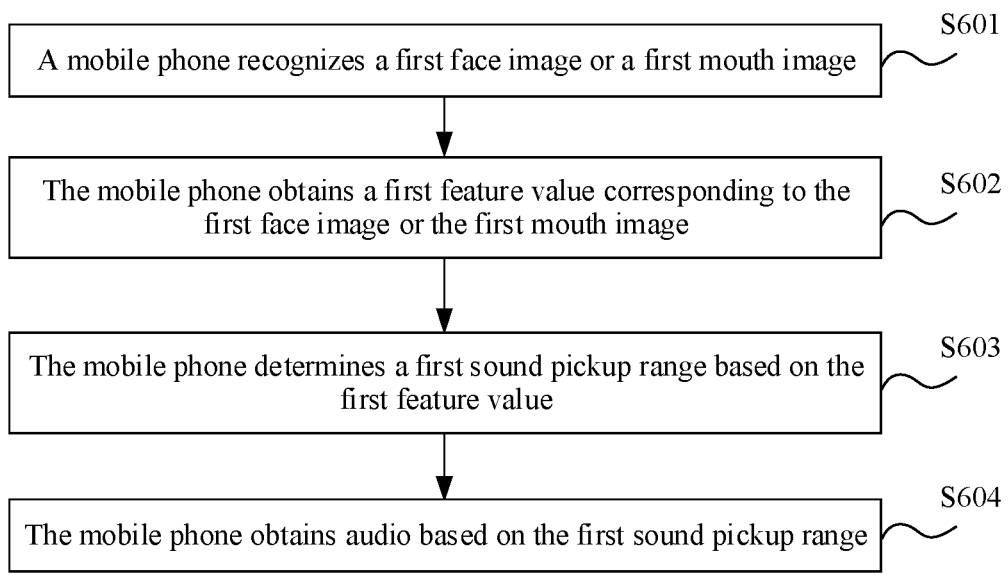
FIG. 6 is a flowchart of an audio processing method according to an embodiment of this application.

FIG. 6 is a schematic flowchart of an audio processing method according to an embodiment of this application. The following uses operations S601 to S604 shown in FIG. 6 to describe in detail the process, described in FIG. 4(*a*) to FIG. 4(*d*), in which the mobile phone recognizes a first face image or a first mouth image, determines a first sound pickup range in which voice enhancement is required, and obtains audio corresponding to the first sound pickup range.

S601: The mobile phone recognizes a first face image or a first mouth image.

In an embodiment, the mobile phone may recognize the first face image or the first mouth image by using a face image recognition algorithm. For example, in a process of recording a video picture by the mobile phone, whether a face image is included in the collected video picture is determined by using the face image recognition algorithm. If a face image is included, the face image included in the collected video picture is recognized, and whether the face image is making a sound is determined based on a change status of facial feature data such as five sense organs data and facial contour data of the face image in a preset time period. A criterion for determining that the face image is making a sound includes determining, by the mobile phone, that the face image is currently making a sound. Alternatively, if the mobile phone determines that the face image makes a sound again in a preset time period after determining that the face image makes a sound for the first time, the mobile phone determines that the face image is making a sound. It may be understood that a vocal organ of a person is a mouth of the person. When data of a sound-making mouth may be obtained, data of the first mouth image may be preferentially determined, and the first sound pickup range may be subsequently determined based on the data of the first mouth image.

Figure 7:
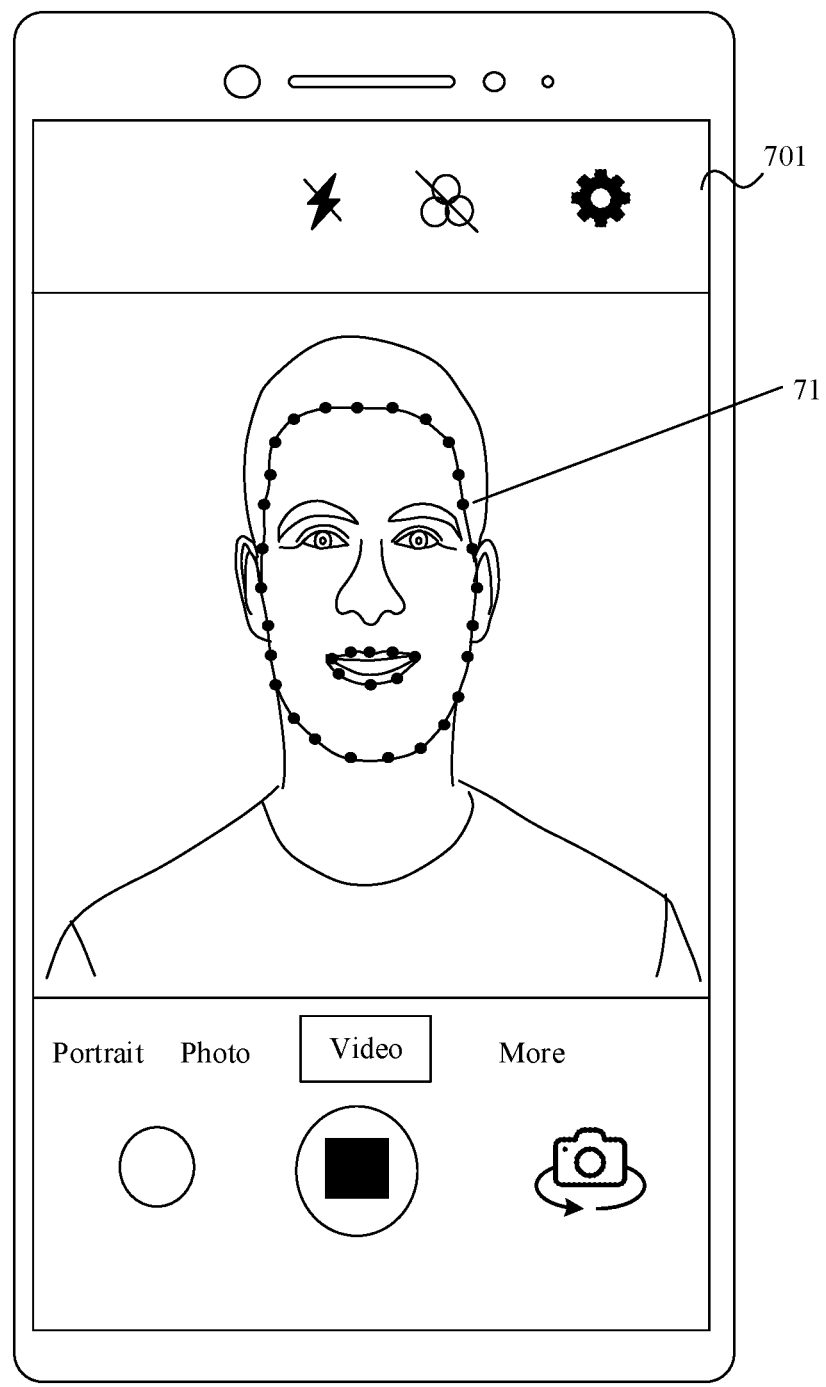
FIG. 7 is a diagram of an interface according to an embodiment of this application.

For example, on an interface 701 shown in FIG. 7, the mobile phone collects a face image 71, and recognizes, by using the face image recognition algorithm, a facial feature key point corresponding to the face image 71 (for example, a circular feature point displayed on the face image 71, to determine whether the face image 71 is making a sound); and may obtain face data and/or mouth data. For example, the facial feature point includes an upper lip feature point and a lower lip feature point, and a distance between upper and lower lips may be obtained in real time based on the upper lip feature point and the lower lip feature point. Therefore, a distance threshold between the upper lip and the lower lip of the face image is preset. If a quantity of times that the mobile phone detects that the distance between the upper lip and the lower lip of the face image exceeds the distance threshold exceeds a preset quantity of times in a preset time period after the mobile phone detects, for the first time, that the distance between the upper lip and the lower lip of the face image exceeds the distance threshold, the mobile phone determines that the current face image is making a sound.

Further, the facial feature point may further include a facial contour feature point. In this case, the mobile phone may obtain data of a chin change, data of a facial muscle change, and the like based on the facial contour feature point, to determine whether the face image is making a sound. For example, in a preset time period, if a quantity of times that change data generated by the chin moving up and down exceeds a preset threshold exceeds a preset quantity of times, it is determined that the current face image is making a sound. Certainly, the mobile phone may alternatively determine a sound-making face or a sound-making mouth based on a change of other data corresponding to the mouth, such as laryngeal prominence change data. In addition, the mobile phone may further implement more accurate recognition of the first face image or the first mouth image with reference to the face data and the mouth data.

It should be noted that, for the face image recognition algorithm, refer to a face image recognition algorithm included in a conventional technology. The face recognition algorithm and a calculation process of the face recognition algorithm are not described in detail in this embodiment of this application.

There are one or more first face images. In a scenario in which there are a plurality of first face images, that is, in a scenario in which a plurality of face images simultaneously make sounds or a plurality of face images successively make sounds in a first preset time period, the mobile phone may exclude a face image with a relatively small face image area or at an edge of a video picture, and does not consider the face image as a first face image. Generally, in a process of recording a video picture, a user points a camera at a person concerned by the user. Therefore, a face image concerned by the user should be a face image with a relatively large area, or a face image displayed in or near the middle of the video picture. That is, a sound pickup range concerned by the user is generally a sound in a picture range concerned by the user, and voice enhancement needs to be performed in the picture range. The first preset time period may be a preconfigured short time range. For example, the mobile phone determines that a user A makes a sound, starts timing at a time point at which the user A stops making a sound, and detects, in the first preset time period, that a user B starts to make a sound. Further, the mobile phone detects, in a first preset time period after the user B stops making a sound, that the user A starts to make a sound again. That is, in a video recording process, if the user B makes a sound immediately after the user A makes a sound, or the user A and the user B alternately make a sound, face images corresponding to the user A and the user B may be determined as first face images. Therefore, frequent determining of a sound pickup range corresponding to a first face image in a short time range may be avoided, thereby reducing a data processing amount and improving efficiency.

In this case, after recognizing a plurality of sound-making face images, the mobile phone determines a face image with a largest area or a face image closest to a center of the video picture, and determines the face image and a sound-making face image whose area difference with the face image is less than a preset threshold as first face images, or determines the face image and a sound-making face image in a preset range near the face image as first face images, to determine a first sound pickup range based on the first face images. Similarly, a scenario in which the mobile phone determines a plurality of first mouth images is the same as the scenario in which the mobile phone determines a plurality of first face images, and details are not described. A central point of the video picture includes, for example, a central point of a viewfinder frame and a central point of a display screen of the mobile phone.

S602: The mobile phone obtains a first feature value corresponding to the first face image or the first mouth image.

S603: The mobile phone determines a first sound pickup range based on the first feature value.

The first feature value is used to describe a relative position relationship between a face of a real person corresponding to the first face image and the mobile phone, or the first feature value is used to describe a relative position relationship between a mouth of a real person corresponding to the first mouth image and the mobile phone. Therefore, the mobile phone may determine the first sound pickup range based on the first feature value. For example, if the real person corresponding to the first face image is located directly in front of the mobile phone, that is, the first face image is located in a central position of the shot video picture, the first sound pickup range is a sound pickup range directly in front of the mobile phone. Subsequently, after obtaining an initial audio signal including audio signals in various directions, the mobile phone may obtain, based on the initial audio signal and the first sound pickup range, audio corresponding to the first face image. The first feature value includes one or more of a front-facing/rear-facing attribute parameter, an area ratio, or position information. The front-facing/rear-facing attribute parameter, the area ratio, and the position information are parameters determined by the mobile phone based on the first face image or the first mouth image. For meanings of the parameters, refer to the following description.

The following describes an example method for determining the first sound pickup range by the mobile phone when the first feature value includes different parameters.

Solution 1: The first feature value includes a front-facing/rear-facing attribute parameter of the first face image, or the first feature value includes a front-facing/rear-facing attribute parameter corresponding to the first mouth image.

The "front-facing/rear-facing attribute parameter" is used to indicate whether the video picture including the first face image or the first mouth image is a video picture shot by a front-facing camera (also referred to as a front-facing video picture in this specification for ease of description) or a video picture shot by a rear-facing camera (also referred to as a rear-facing video picture in this specification for ease of description). The front-facing/rear-facing attribute parameter may be used to determine whether the first sound pickup range is in a 180-degree front-facing range or a 180-degree rear-facing range of the mobile phone. For example, as shown in FIG. 2B(b), a sound pickup range corresponding to a front-facing video picture includes ranges represented by an ellipse 204, an ellipse 205, and an ellipse 206, and a sound pickup range corresponding to a rear-facing video picture may include ranges represented by an ellipse 201, an ellipse 202, and an ellipse 203.

Figure 8:
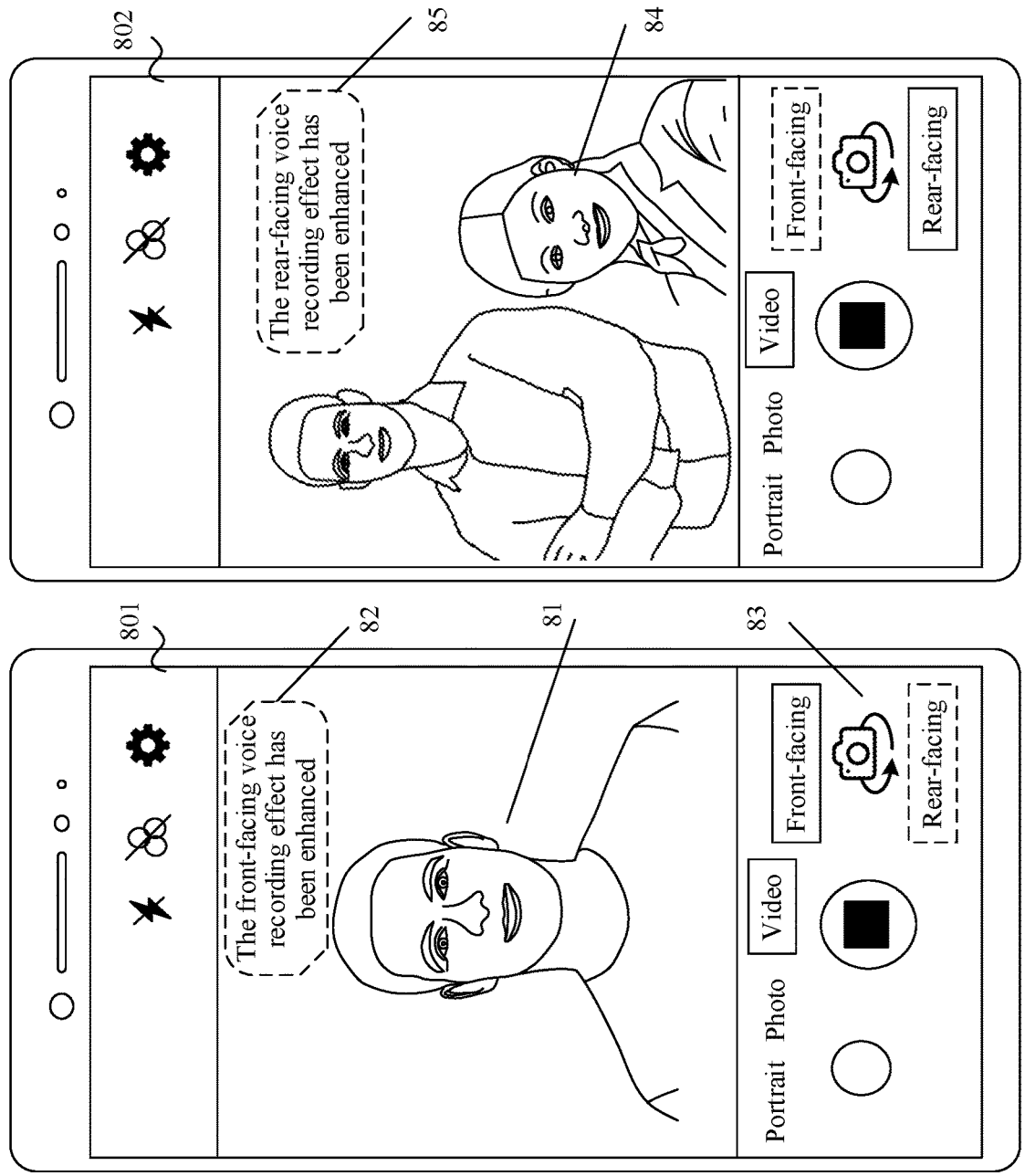
FIG. 8 is a diagram of a group of interfaces according to an embodiment of this application.

For example, a video picture displayed in the viewfinder frame of the mobile phone may be switched between pictures collected by the front-facing and rear-facing cameras. On a shooting interface 801 shown in (a) in FIG. 8, the mobile phone is in a voice enhancement mode, and determines that there is a sound-making face image 81. If the mobile phone determines that a video picture in which the sound-making face image 81 is located is a video picture collected by the front-facing camera, that is, determines that the first feature value is a front-facing attribute parameter, the mobile phone determines that the first sound pickup range is in the 180-degree front-facing range, and displays a prompt box 82 to prompt the user that a front-facing voice recording effect is currently enhanced.

Further, the shooting interface 801 further includes a front-facing/rear-facing switching control 83, used to switch between the front-facing and rear-facing cameras. For example, the mobile phone may switch from the front-facing camera to the rear-facing camera in response to an operation of tapping the front-facing/rear-facing switching control 83 by the user. Accordingly, the video picture displayed by the mobile phone is switched from the video picture that is collected by the front-facing camera and that is displayed on the shooting interface 801 shown in (a) in FIG. 8 to a video picture that is collected by the rear-facing camera and that is displayed on a shooting interface 802 shown in (b) in FIG. 8. If the mobile phone recognizes a sound-making face image 84 in the current video picture, the mobile phone determines that the first feature value is rear-facing attribute parameter information, and determines that the first sound pickup range is in the 180-degree rear-facing range of the mobile phone. The mobile phone displays a prompt box 85 to prompt the user that a rear-facing voice recording effect is currently enhanced.

As shown in FIG. 2B(b), a sound pickup range corresponding to a rear-facing video picture is the ranges represented by the ellipse 201, the ellipse 202, and the ellipse 203, and a sound pickup range corresponding to a front-facing video picture is the ranges represented by the ellipse 204, the ellipse 205, and the ellipse 206. For example, if the mobile phone determines, based on the first feature value, that the first face image corresponds to a rear-facing video picture, the mobile phone determines that the first sound pickup range is the ranges represented by the ellipse 201, the ellipse 202, and the ellipse 203. Alternatively, referring to FIG. 2B(d), if the mobile phone determines, based on the first feature value, that the first face image corresponds to a rear-facing video picture, the mobile phone determines that the first sound pickup range is the sound pickup ranges corresponding to the microphone 27, the microphone 28, and the microphone 29.

Solution 2: The first feature value includes an area ratio corresponding to the first face image, or the first feature value includes an area ratio corresponding to the first mouth image.

The "area ratio" is used to indicate a ratio of an area of the first face image or the first mouth image to an area of the video picture. The area ratio is used to measure a radius range (or diameter range) in which a microphone collects audio.

Figure 9:
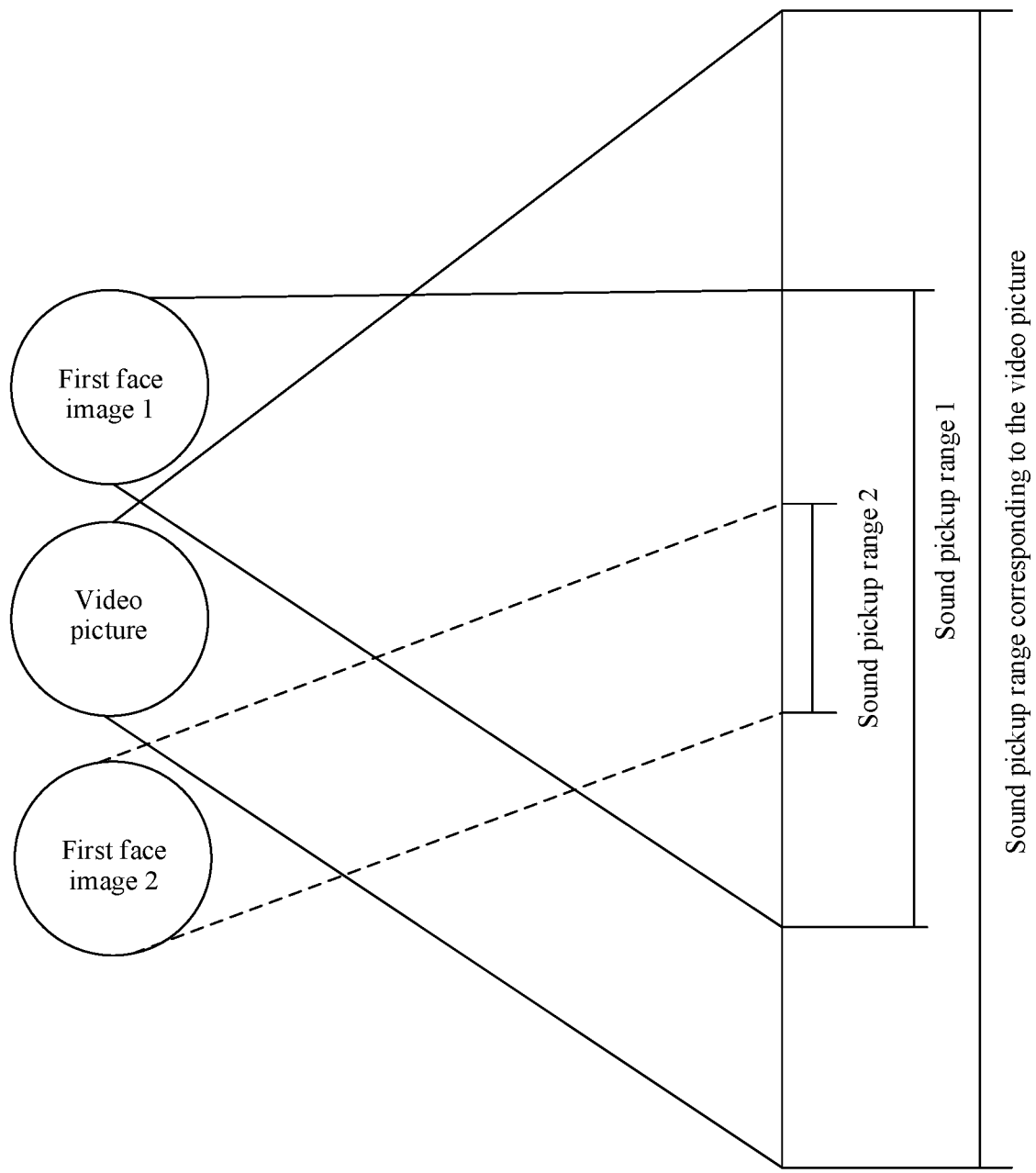
FIG. 9 is a diagram of a sound pickup range according to an embodiment of this application.

Specifically, in a process in which the user shoots the video picture by using the mobile phone, a person concerned by the user is usually placed at a central position of the video picture, that is, the first face image or the first mouth image is located at a central position of the viewfinder frame. Different areas of the first face image or the first mouth image correspond to different sound pickup ranges. For example, as shown in FIG. 9, it is assumed that the mobile phone determines two first face images in different time periods, which are respectively a first face image 1 and a first face image 2. Areas of the two face images are different, and an area of the first face image 1 is greater than an area of the first face image 2. In this case, as shown in FIG. 9, a sound pickup range determined based on the first face image 1 is a sound pickup range 1, and a sound pickup range determined based on the first face image 2 is a sound pickup range 2. The sound pickup range 1 is greater than the sound pickup range 2.

In some embodiments, as shown in Table 1 below, X is used to represent an area of the first face image or an area of the first mouth image; Y is used to represent the area of the video picture displayed in the viewfinder frame; and N represents a sound pickup range corresponding to a framing range.

TABLE 1

| Area ratio | Sound pickup range corresponding to the framing range | Sound pickup range corresponding to the area ratio of the first face image or the first mouth image |
|---|---|---|
| X/Y | N | N*X/Y |

In some embodiments, the area ratio is used to indicate a ratio of the area of the first face image to the area of the video picture displayed in the viewfinder frame. There may be one or more first face images. Therefore, the area of the first face image is an area of one face image or a sum of areas of a plurality of face images. The sum of areas of a plurality of face images may be represented by using an area of a placeholder frame in which the plurality of face images are located, that is, an area of a minimum selection frame that includes the plurality of face images.

Figure 10A:
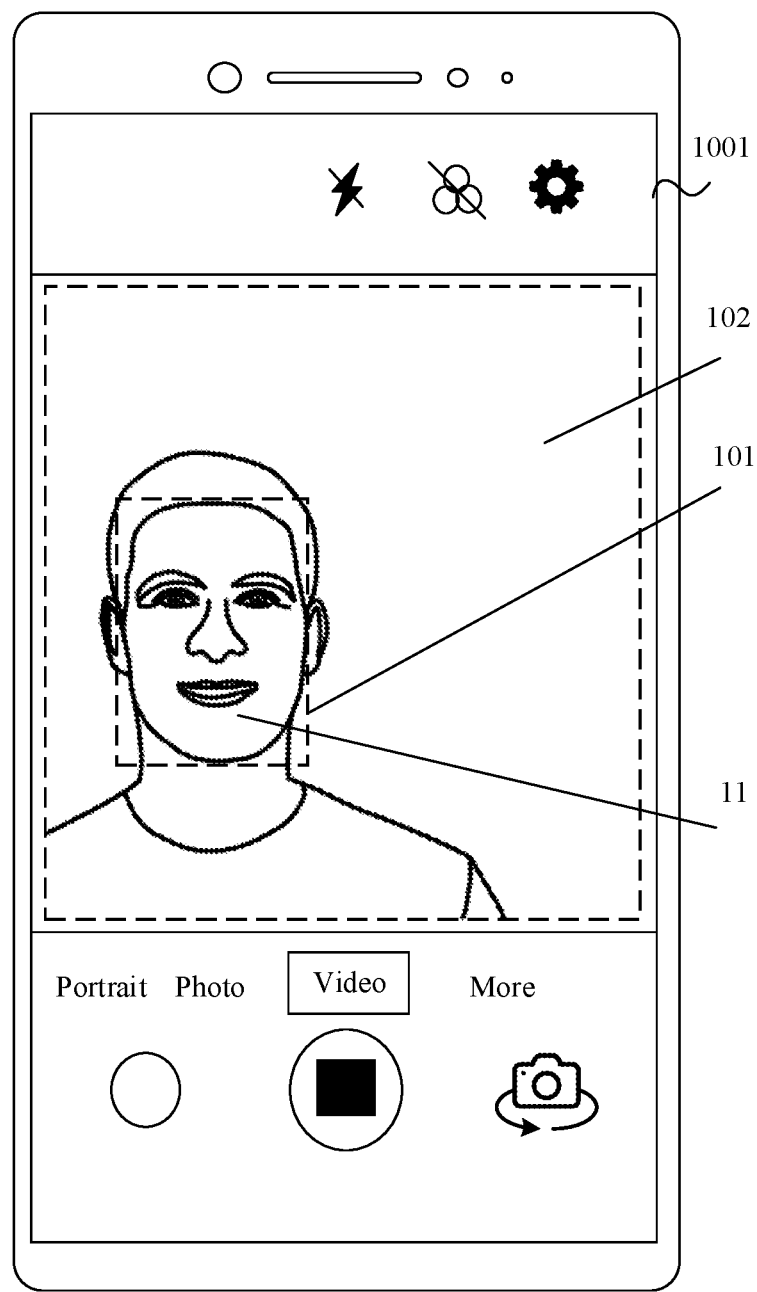
FIG. 10(a) to FIG. 10(c) are diagrams of a group of interfaces according to an embodiment of this application.

For example, on an interface 1001 shown in FIG. 10(a), a quantity of first face images is 1. In a process of performing face image recognition by the mobile phone, a dashed line box 101 for framing a face area of a first face image 11 is determined based on a position of a feature point at the top of a forehead, a position of a feature point at the bottom of a chin, and positions of feature points on extreme edges of left and right faces without ears in facial feature points of the face image 11, and an image area in a framed range is the area of the first face image. That is, in a process of determining the area of the first face image, only the face area is calculated, and influence of ears, a hat, jewelry, a neck, and the like is excluded. The area of the video picture displayed in the viewfinder frame is an image area in a framed range of a dashed line box 102. Therefore, the mobile phone may determine the area ratio based on an area ratio corresponding to the recognized dashed line box 101 and the dashed line box 102. Subsequently, for a method for determining an area of a first face image, refer to the current method for determining the area of the first face image. Details are not described later.

Figure 10B:
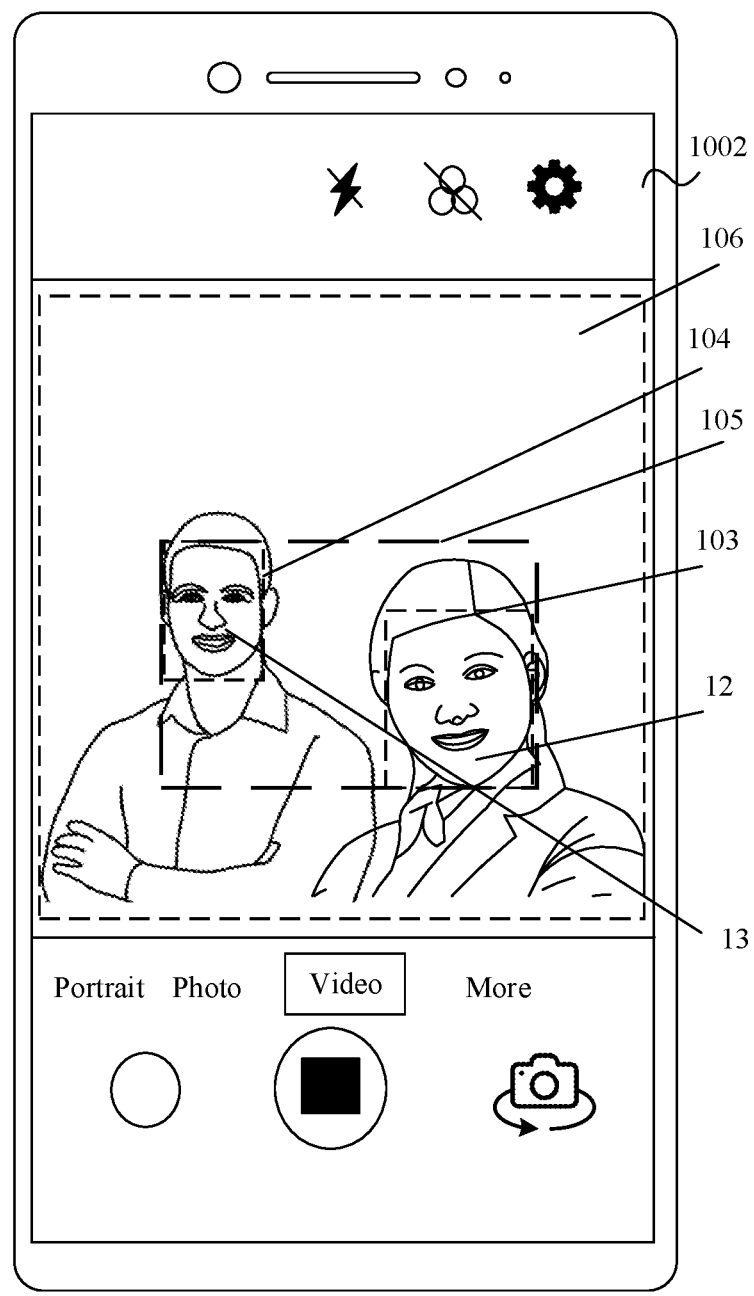
Figure 10C:
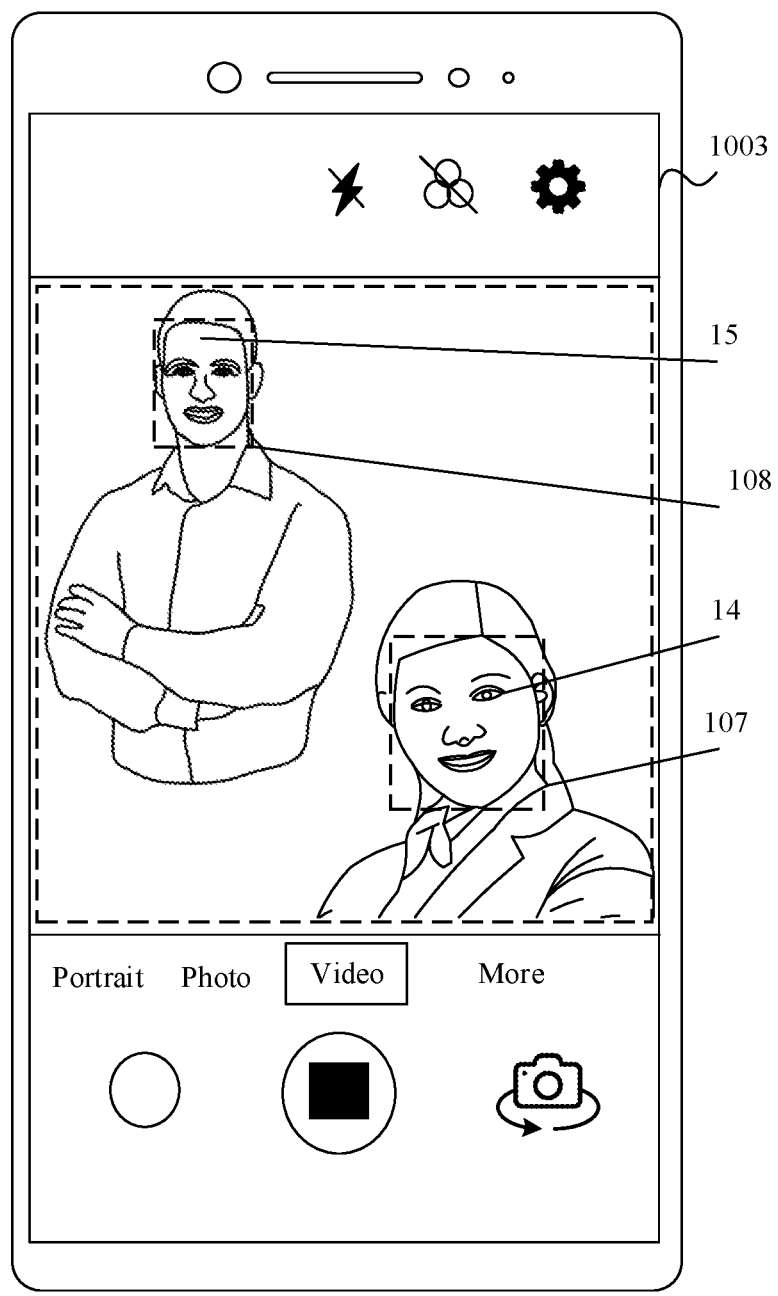

For another example, on an interface 1002 shown in FIG. 10(*b*), two face images are displayed on the interface 1002, and the two face images are both recognized by the mobile phone as sound-making first face images. An area of a face image 12 on a right side is an image area in a framed range of a dashed line box 103, and an area of a face image 13 on a left side is an image area in a framed range of a dashed line box 104. In this case, the area of the first face image is an image area in a framed range of a dashed line box 105, that is, an area of a minimum selection frame that includes all face images (for example, a total framed area determined based on edge limit values of area selection frames of all face images). The dashed line box 105 is used to represent a placeholder frame in which the face image 12 and the face image 13 are located. A finally determined area of the first face image includes image areas corresponding to the two face images. The area of the video picture displayed in the viewfinder frame is an image area in a framed range of a dashed line box 106. Therefore, the mobile phone may determine the area ratio based on an area ratio corresponding to the recognized dashed line box 105 and the dashed line box 106.

In a scenario in which a plurality of faces make sounds, on an interface 1003 shown in FIG. 10(*c*), if two persons in a video picture are both making sounds, the mobile phone determines that a face image 14 on a right side has a largest area. The mobile phone may exclude, by using a preset threshold, some sound-making face images not concerned by the user. For example, the preset threshold is less than 20% of a largest face image area. For example, on the interface 1003, the mobile phone may exclude a face image 15 that is on a left side and whose area is less than 20% of the area of the face image 14 on the right side. In this case, the first face image includes the face image 14 on the right side. For another example, the preset threshold is that a distance from a face image with a largest area exceeds 35% of a length or a width of the video picture displayed in the viewfinder frame. For example, on the interface 1003, the mobile phone may exclude the face image 15 that is on the left side and whose distance from the face image 14 on the right side exceeds 35% of the length of the video picture displayed in the viewfinder frame. In this case, the first face image includes the face image 14 on the right side.

In some other embodiments, the area ratio is used to indicate a ratio of the area of the first mouth image to the area of the video picture displayed in the viewfinder frame. There may be one or more first mouth images. Therefore, the area of the first mouth image is an area of one mouth image or a sum of areas corresponding to a plurality of mouth images. The sum of areas of a plurality of mouth images may be represented by using an area of a placeholder frame in which the plurality of mouth images are located, that is, an area of a minimum selection frame that includes the plurality of mouth images.

Figure 11A:
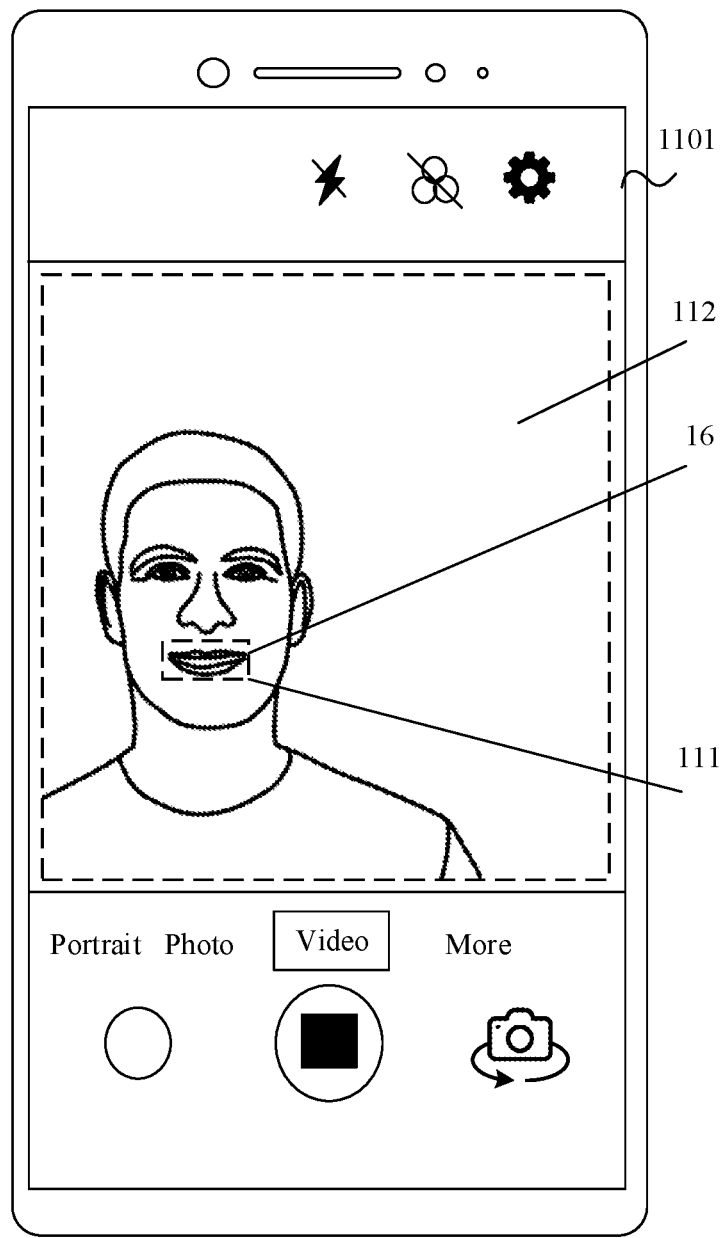
FIG. 11(a) to FIG. 11(c) are diagrams of a group of interfaces according to an embodiment of this application.
Figure 11B:
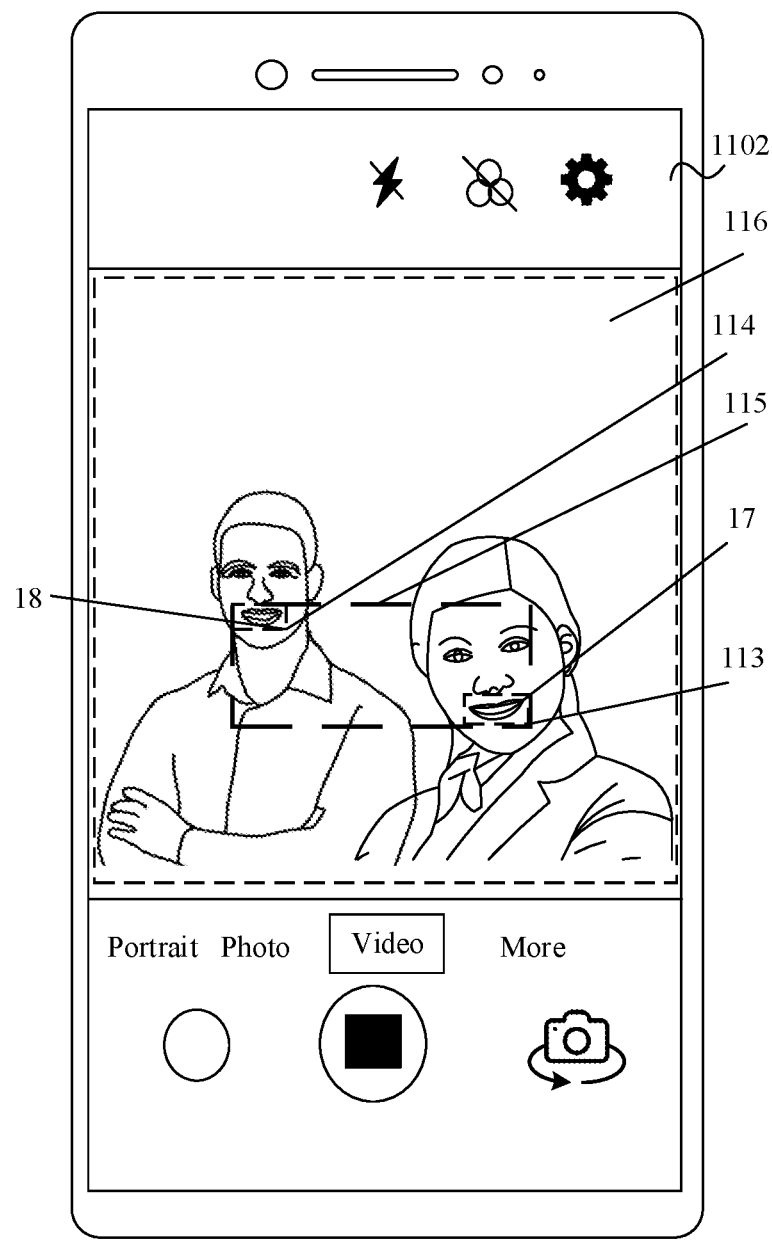
Figure 11C:
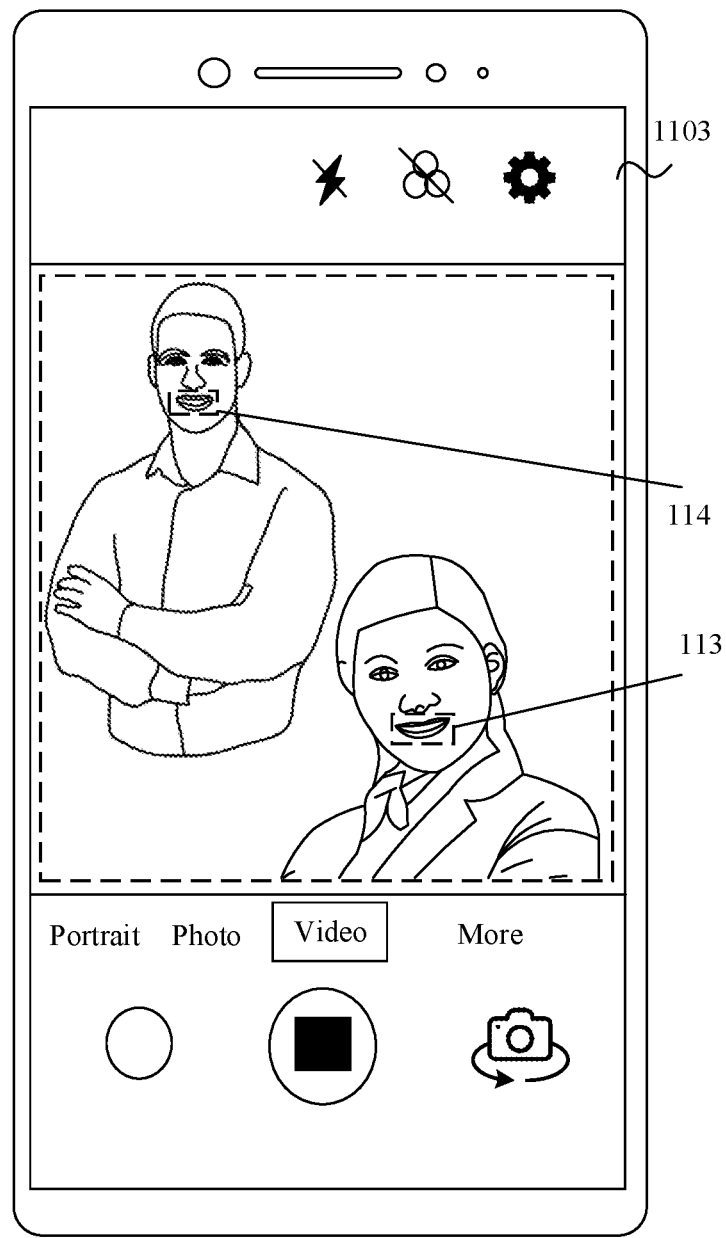

For example, on an interface 1101 shown in FIG. 11(*a*), a quantity of first mouth images is 1. In a process of performing face image recognition by the mobile phone, a dashed line box 111 for framing an area of a first mouth image 16 is determined based on positions of top, bottom, leftmost, and rightmost feature points in feature points of the mouth image in facial feature points, and an image area in a framed range is the area of the first mouth image. The area of the video picture displayed in the viewfinder frame is an image area in a framed range of a dashed line box 112. Therefore, the mobile phone may determine the area ratio based on an area ratio corresponding to the recognized dashed line box 111 and the dashed line box 112. Subsequently, for a method for determining an area of a first mouth image, refer to the current method for determining the area of the first mouth image. Details are not described later.

For another example, on an interface 1102 shown in FIG. 11(*b*), two mouth images are displayed on the interface 1102, and the two mouth images are both recognized by the mobile phone as sound-making first mouth images. An area of a first mouth image 17 on a right side is an image area in a framed range of a dashed line box 113, and an area of a first mouth image 18 on a left side is an image area in a framed range of a dashed line box 114. In this case, the area of the first mouth image is an image area in a framed range of a dashed line box 115, that is, an area of a minimum selection frame that includes all mouth images (for example, a total framed area determined based on edge limit values of area selection frames of all mouth images). The dashed line box 115 is used to represent a placeholder frame in which the first mouth image 17 and the first mouth image 18 are located. A finally determined area of the first mouth image includes image areas corresponding to the two mouth images. The area of the video picture displayed in the viewfinder frame is an image area in a framed range of a dashed line box 116. Therefore, the mobile phone may determine the area ratio based on an area ratio corresponding to the recognized dashed line box 115 and the dashed line box 116.

Similarly, in a scenario in which a plurality of faces make sounds, on an interface 1103 shown in FIG. 11(*c*), if two persons in a current video picture are both making sounds, the mobile phone determines that a mouth image on a right side has a largest area. The mobile phone may exclude, by using a preset threshold, some sound-making mouth images not concerned by the user. For example, the preset threshold is less than 20% of a largest mouth image area. For another example, the preset threshold is that a distance from a mouth image with a largest area exceeds 35% of a length or a width of the video picture displayed in the viewfinder frame. On the interface 1103 shown in FIG. 11(*c*), a sound-making mouth image on a left side is excluded, the first mouth image includes only a sound-making first mouth image on a right side, and a radius of the first sound pickup range is determined based on an area of the first mouth image on the right side.

For example, it is assumed that in the scenario in which the area of the first face image is determined, the mobile phone collects the video picture by using the rear-facing camera. A sound pickup range determined by the mobile phone based on a first feature value of the first face image shown in FIG. 10(*a*) may be the sound pickup range 2 shown in FIG. 9. A sound pickup range determined by the mobile phone based on a first feature value of the first face image shown in FIG. 10(*b*) may be the sound pickup range 1 shown in FIG. 9.

It should be noted that, in the process of determining the area of the first face image and the area of the first mouth image, the first face image and the first mouth image are both converted into a rectangle, and then an area of the rectangle is used as the area of the corresponding first face image or the area of the corresponding first mouth image. It may be understood that an irregular geometric shape may alternatively be used to correspond to the first face image and the first mouth image, to more accurately determine a corresponding area. The rectangle in this embodiment of this application is merely an example for description. This is not specifically limited in this embodiment of this application.

It should be noted that, in the process of determining the area ratio of the first face image and the area ratio of the first mouth image, an area of the viewfinder frame is used as the area of the video picture. It may be understood that, if the mobile phone is a full-screen mobile phone, an area of a display of the mobile phone may be used as the area of the video picture. Alternatively, another area and an area of another shape may alternatively be used as the area of the video picture. The area of the viewfinder frame in this embodiment of this application is merely an example for description. This is not specifically limited in this embodiment of this application.

Solution 3: The first feature value includes position information corresponding to the first face image, or the first feature value includes position information corresponding to the first mouth image.

The "position information" is used to indicate a position of the first face image or the first mouth image in the video picture. The position information includes an offset of a central point of the first face image relative to a first reference point, for example, an offset direction, an offset angle, and/or an offset distance. Alternatively, the position information includes an offset of a central point of the first mouth image relative to a first reference point. The first reference point is a central point of the video picture or a focus of focusing. The offset direction means that relative to the first reference point, a central point of the first face image or the first mouth image has a leftward offset, a rightward offset, an upward offset, a downward offset, an upper leftward offset, an upper rightward offset, a lower leftward offset, a lower rightward offset, or the like. The offset angle is an angle at which there is an upper leftward offset, an upper rightward offset, a lower leftward offset, or a lower rightward offset. The offset distance is a distance of a leftward offset, a rightward offset, an upward offset, or a downward offset, a distance of an offset at an offset angle, or the like.

In some embodiments, coordinates of the central point of the first face image may be determined based on limit positions of feature points in various directions of the first face image. For example, in the process of determining the area of the first face image, the coordinates of the central point of the first face image are determined based on a position of a feature point at the top of a forehead, a position of a feature point at the bottom of a chin, and positions of feature points on extreme edges of left and right faces without ears in facial feature points of the first face image. Similarly, coordinates of the central point of the first mouth image are determined based on positions of top, bottom, leftmost, and rightmost feature points in feature points of the mouth image in facial feature points of the face image.

Then, the first reference point is preset, and may include, for example, a central point of the video picture displayed in the viewfinder frame (or may be described as a central point of framing) or a focus of focusing in the framing range. A coordinate system is built by using the first reference point as an origin, a direction parallel to a bottom edge of the mobile phone (or a bottom edge of a current viewfinder frame) as an x axis, and a direction perpendicular to the x axis as y, and the current coordinate system is parallel to a display of the mobile phone. The offset direction, the offset angle, and the offset distance of the central point of the first face image or the first mouth image relative to the first reference point are defined by using the built coordinate system. For example, as shown in (a) in FIG. 13, a case of the coordinate system is shown when the mobile phone is vertically displayed, where the x axis is parallel to the bottom edge (that is, a short edge) of the mobile phone. As shown in (b) in FIG. 13, a case of the coordinate system is shown when the mobile phone is horizontally displayed, where the x axis is parallel to a side edge (that is, a long edge) of the mobile phone. Coordinates of an intersecting point of the x axis and the y axis, that is, the origin is (0, 0). A positive direction of the x axis is right, and a positive direction of the y axis is up. It may be learned that, after the mobile phone switches between vertical displaying and horizontal displaying, directions of the x axis and they axis of the coordinate system change, and the offset direction, the offset angle, and the offset distance of the central point of the first face image or the first mouth image relative to the first reference point change accordingly.

Figure 12A:
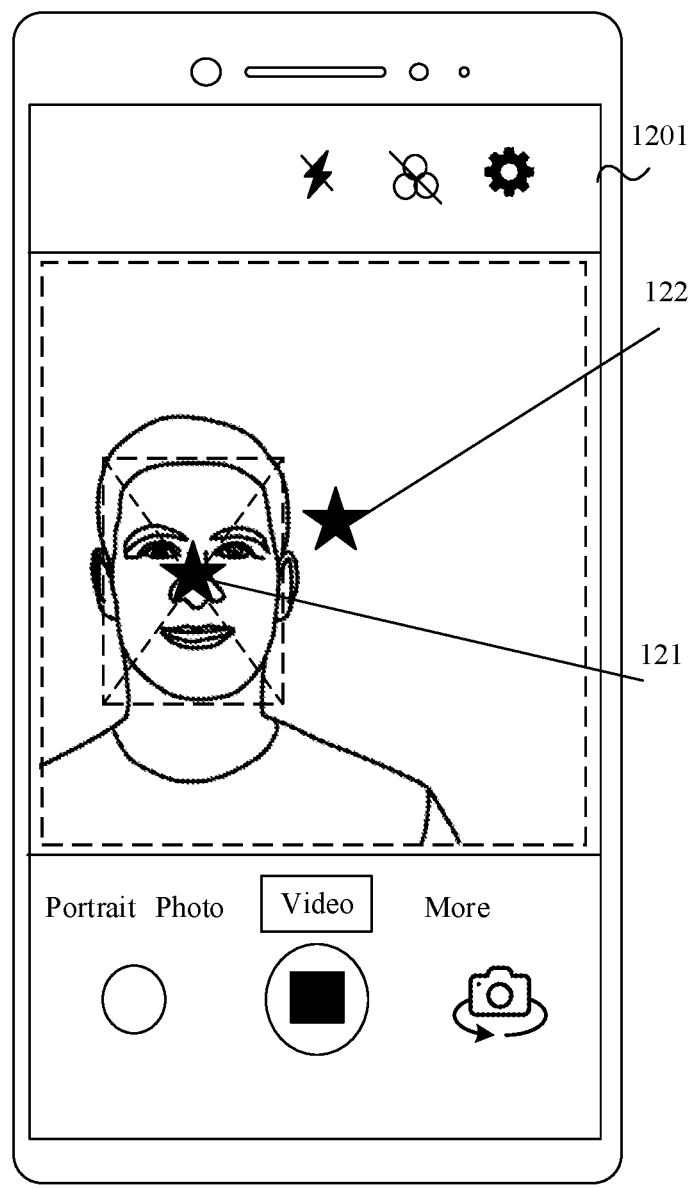
FIG. 12(a) to FIG. 12(c) are diagrams of a group of interfaces according to an embodiment of this application.
Figure 12B:
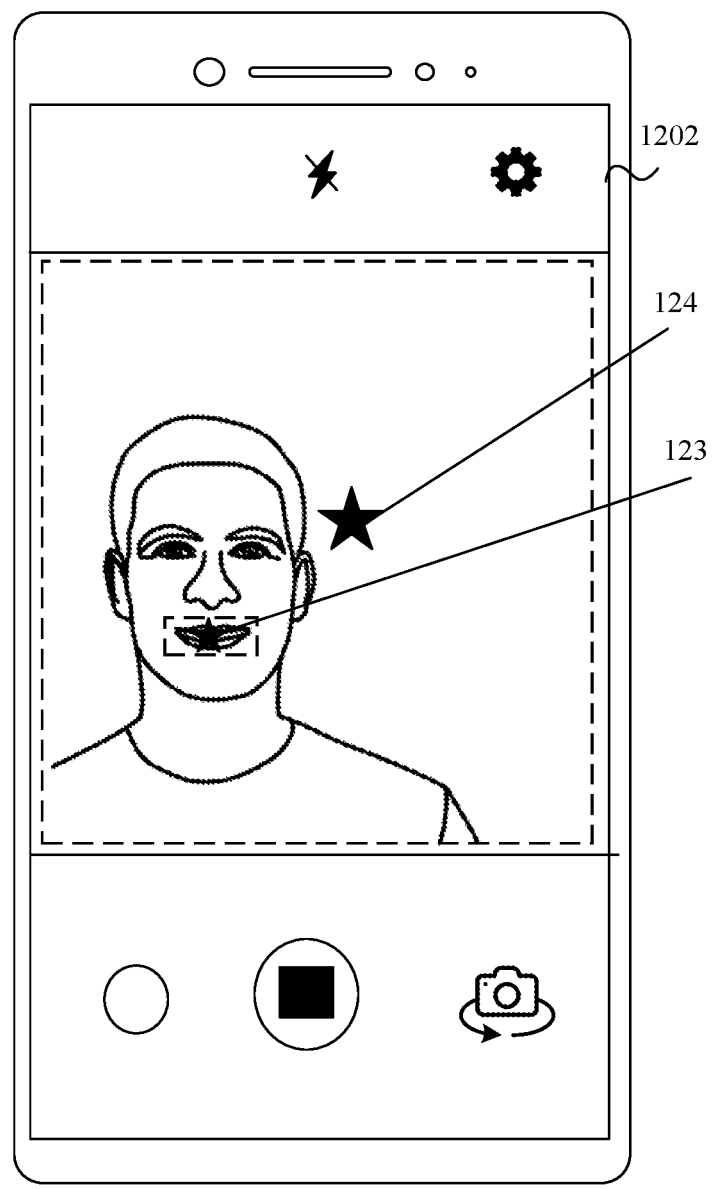

For example, on an interface 1201 shown in FIG. 12(*a*), a quantity of first face images is 1, a central point of the first face image is a position corresponding to a mark 121, and a central point of a video picture displayed in the viewfinder frame is a position corresponding to a mark 122. A position of the central point of the viewfinder frame is determined based on limit coordinates of top, bottom, left, and right edges of the viewfinder frame. The mobile phone determines position information of the first face image based on a position relationship between the mark 121 and the mark 122. For example, in a scenario displayed on the interface 1201, the position information of the first face image is the lower left of the central point of the viewfinder frame. Alternatively, on an interface 1202 shown in FIG. 12(*b*), a quantity of first face images is 1, a central point of a first mouth image is a position corresponding to a mark 123, and a central point of a video picture displayed in the viewfinder frame is a position corresponding to a mark 124. The mobile phone determines position information of the first mouth image based on a position relationship between the mark 123 and the mark 124. For example, in a scenario displayed on the interface 1202, the position information of the first mouth image is the lower left of the central point of the viewfinder frame.

In some embodiments, if there are a plurality of first face images, the central point of the first face image is a central point in an image range including the plurality of face images. For example, in the scenario shown in FIG. 10(*b*), the central point of the first face image is a geometric central point of the framed range of the dashed line box 105. For another example, in the scenario shown in FIG. 11(*b*), the central point of the first mouth image is a geometric central point of the framed range of the dashed line box 115. Similarly, the central point of the video picture displayed in the viewfinder frame is also a geometric central point of the viewfinder frame.

It should be noted that, in the process of determining the central point of the first face image and the central point of the first mouth image, the first face image and the first mouth image are both converted into a rectangle, and then a central point of the rectangle is used as the central point of the corresponding first face image or the central point of the corresponding first mouth image. It may be understood that an irregular geometric shape may alternatively be used to correspond to the first face image and the first mouth image, to more accurately determine a corresponding central point. The rectangle in this embodiment of this application is merely an example for description. This is not specifically limited in this embodiment of this application.

In addition, in the process of determining the position information corresponding to the first face image or the first mouth image, in some scenarios, the central point of the viewfinder frame is used as the first reference point, that is, the central point of the viewfinder frame is used to represent the central point of the video picture. It may be understood that, based on a display form of the video picture, the first reference point may alternatively be represented in another form. For example, a central point of a whole screen of the display of the mobile phone is used to represent the central point of the video picture, that is, as the first reference point. In this embodiment of this application, that the central point of the viewfinder frame is used as the first reference point is merely an example for description. This is not specifically limited in this embodiment of this application.

In some scenarios, in a process of recording a video picture, the user may not place a concerned object at a central position in a framing range, but selects a relatively concerned object in a focusing manner. The mobile phone may obtain a user intention by detecting a focus position of focusing, and determine an object concerned by the user. The focus position of focusing may alternatively be a focus position obtained by the mobile phone through automatic focusing. For example, the mobile phone automatically recognizes an image, and determines a corresponding focus position after automatic focusing.

Figure 12C:
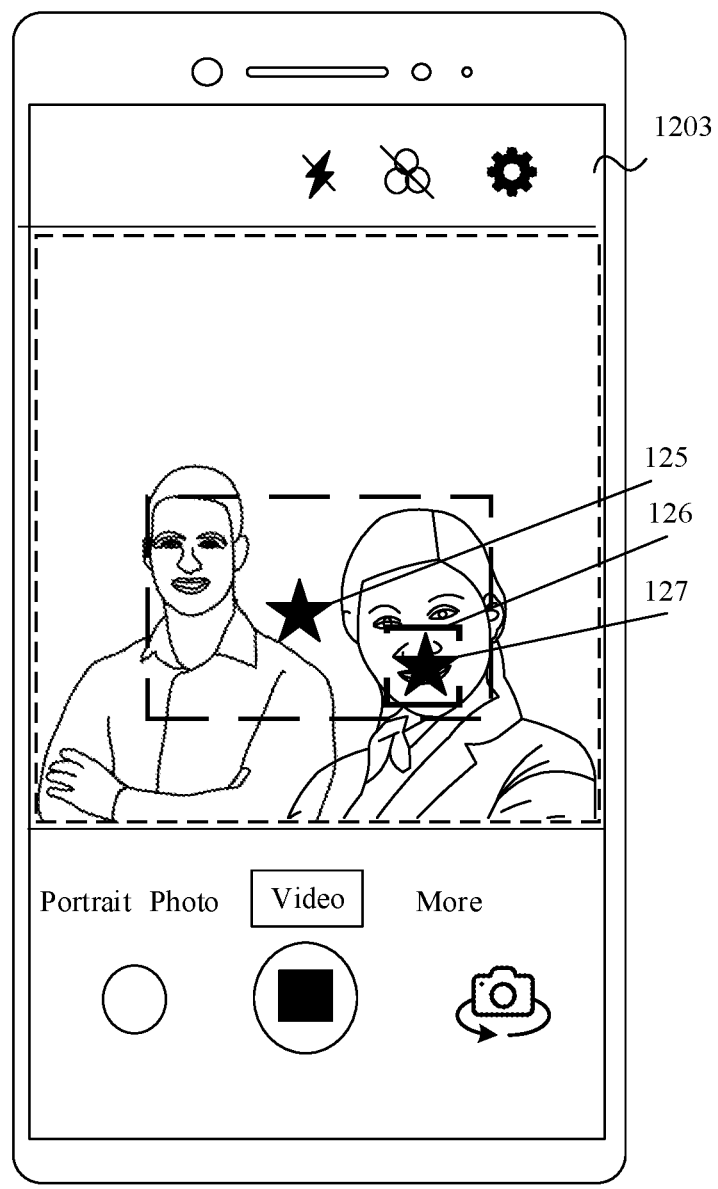

For example, on an interface 1203 shown in FIG. 12(c), in a current scenario, a quantity of first face images is 2, and a central point of the first face images is a position corresponding to a mark 125. The mobile phone detects an operation of tapping the screen by the user, obtains a focus position of focusing, and displays a dashed line box 126. A range framed by the dashed line box 126 is a focusing range determined by the mobile phone based on an intention of the user. In this case, a central focus in the focusing range is a position corresponding to a mark 127. The mobile phone determines position information of the first face images based on a position relationship between the mark 125 and the mark 127. For example, the position information of the first face images is the upper left of the focus center.

In a possible implementation, the mobile phone may determine a relative position relationship between the first face image or the first mouth image and the first reference point based on the coordinates of the central point of the first face image or the coordinates of the central point of the first mouth image and coordinates of the first reference point, and then determine an offset direction of the first face image or the first mouth image in the video picture displayed in the viewfinder frame.

Figure 13:
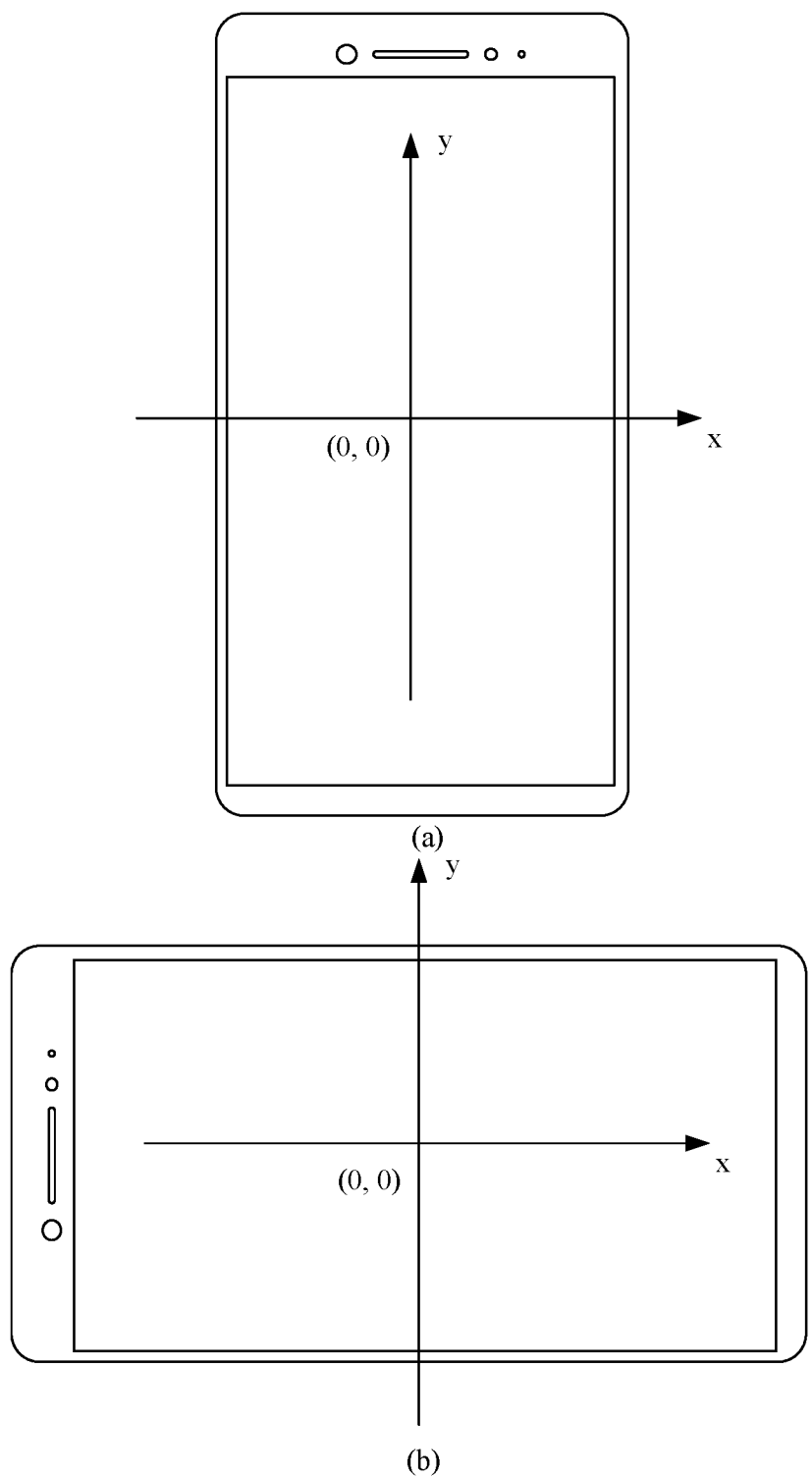
FIG. 13 is a diagram of a coordinate system according to an embodiment of this application.

For example, referring to the coordinate system shown in (a) or (b) in FIG. 13, it is assumed that the coordinates of the central point of the first face image or the coordinates of the central point of the first mouth image are (X1, Y1), the coordinates of the first reference point are (X2, Y2), and the first reference point is set to the origin (0, 0) of the coordinate system. For the relative position relationship between the first face image or the first mouth image and the first reference point, refer to Table 2 below. For example, if X1<X2, it indicates that the first face image or the first mouth image is located on a left side of the first reference point, that is, the offset direction is leftward. For another example, if X1=X2, and Y1=Y2, it indicates that both a left-right offset and an up-down offset of the central point of the first face image or the first mouth image from the first reference point are zero. That is the central point of the first face image or the first mouth image coincides with the first reference point, and the offset direction is no offset.

TABLE 2

| Coordinate relationship | Offset direction |
|---|---|
| X1 < X2 | Leftward |
| X1 > X2 | Rightward |
| X1 = X2 | No left-right offset |
| Y1 < Y2 | Downward |
| Y1 > Y2 | Upward |
| Y1 = Y2 | No up-down offset |

Figure 14:
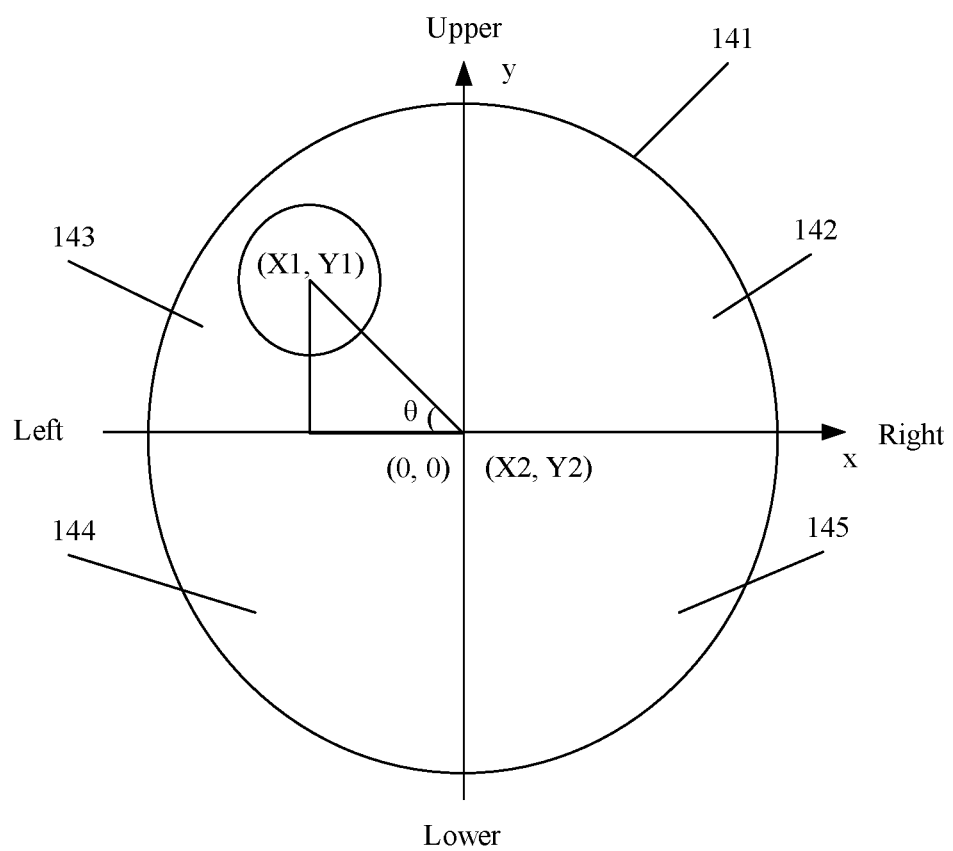
FIG. 14 is a diagram of an offset angle according to an embodiment of this application.

In another possible implementation, the mobile phone may determine, based on the coordinates of the central point of the first face image or the coordinates of the central point of the first mouth image and coordinates of the first reference point, an offset angle of the first face image in the video picture displayed in the viewfinder frame (an included angle $\theta$ between the x axis and a connection line between the coordinates (X1, Y1) of the central point of the first face image or the central point of the first mouth image and the first reference point (X2, Y2), as shown in FIG. 14). For example, as shown in FIG. 14, a large circle 141 is used to represent a maximum sound pickup range corresponding to the viewfinder frame of the mobile phone, and coordinates of the central point of the viewfinder frame are set to (0, 0), that is, the central point of the viewfinder frame is set to the first reference point. The maximum sound pickup range is divided into four quadrants, for example, a first quadrant 142, a second quadrant 143, a third quadrant 144, and a fourth quadrant 145. It is assumed that the offset angle is 0, and the mobile phone may determine the offset angle $\theta$ based on a value of an included angle between the x axis and a connection line between (X1, Y1) and (X2, Y2) in each quadrant; and in this case, $0<\theta<90°$. Alternatively, the mobile phone determines the offset angle $\theta$ based on all quadrants; and in this case, $0<\theta<360°$. For example, in FIG. 14, the first face image is displayed in the second quadrant 143 of the viewfinder frame, and $\tan\theta=|Y2-Y1|/|X2-X1|$, so that the mobile phone may obtain the offset angle $\theta$ of the first face image in the video picture displayed in the viewfinder frame.

In still another possible implementation, the mobile phone may determine, based on the coordinates of the central point of the first face image or the coordinates of the central point of the first mouth image and coordinates of the first reference point, an offset distance of the first face image in the video picture displayed in the viewfinder frame. The mobile phone may determine, based on the offset distance and a radius of the sound pickup range corresponding to the first face image, whether the sound pickup range corresponding to the first face image exceeds the sound pickup range corresponding to the framing range, and then determine the first sound pickup range.

Figure 15:
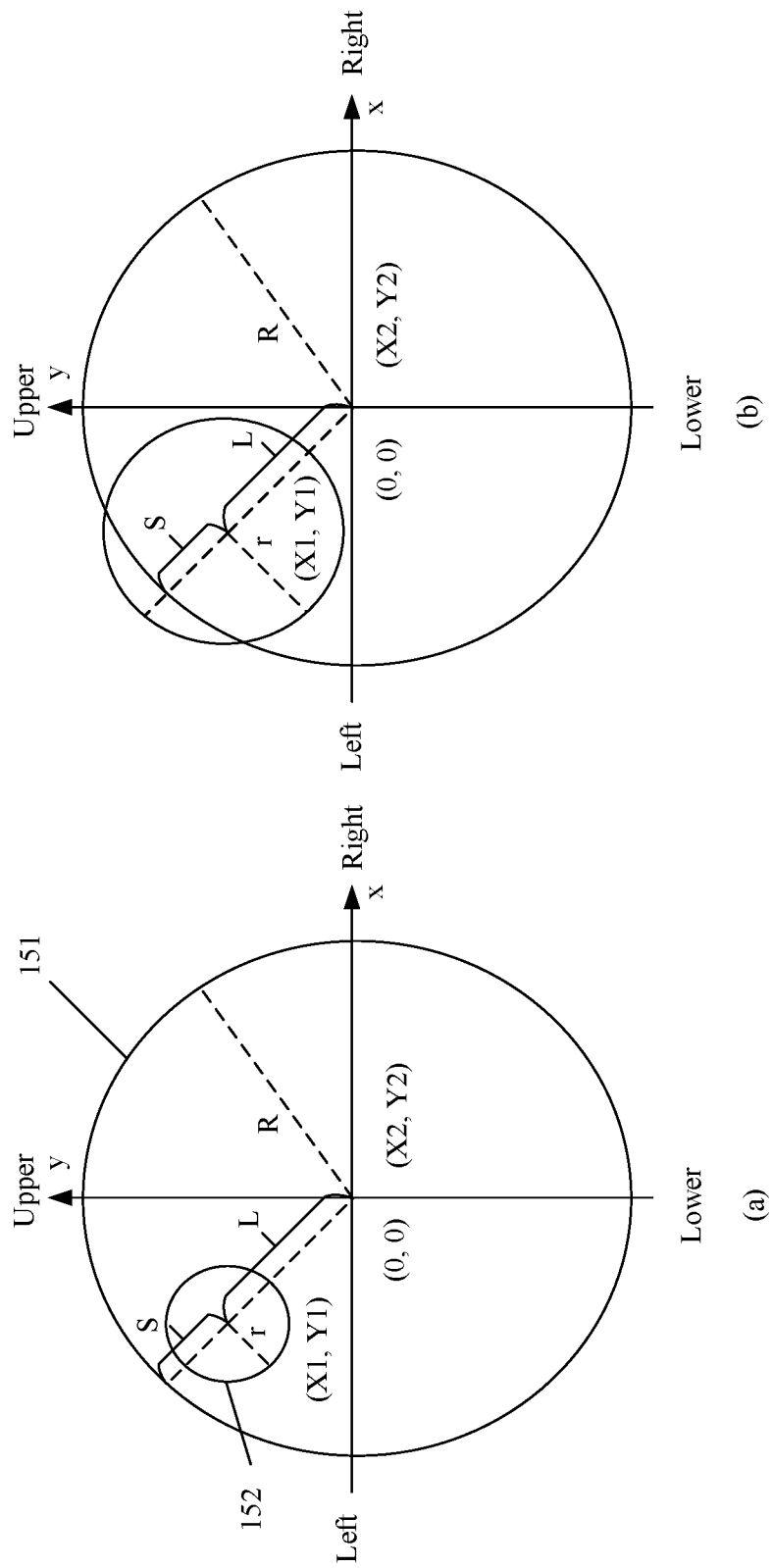
FIG. 15 is a diagram of an offset distance according to an embodiment of this application.

For example, as shown in (a) in FIG. 15, a large circle 151 is a maximum sound pickup range corresponding to the viewfinder frame, and a radius is R. The first reference point is the central point of the video picture displayed in the viewfinder frame, that is, a central point of the maximum sound pickup range, and the coordinates of the first reference point are (X2, Y2). The coordinates of the central point of the first face image are (X1, Y1). A radius that is of a small circle 152 and that is determined by the mobile phone based on area ratio parameter information is r. The mobile phone may obtain the offset distance $L=\sqrt{(X2-X1)^2+(Y2-Y1)^2}$ based on the Pythagorean theorem. Therefore, a distance between the central point of the first face image and an edge of the maximum sound pickup range is S=R−L. If the sound pickup range corresponding to the first face image does not exceed the maximum sound pickup range, that is, r≤S, a radius of the first sound pickup range is r=R*P. P is a ratio of the area of the first face image to the area of the video picture displayed in the viewfinder frame, that is, an area ratio parameter. If the sound pickup range corresponding to the first face image partially exceeds the maximum sound pickup range, that is, r>S, as shown in (b) in FIG. 15, sound pickup cannot be performed in a part beyond the maximum sound pickup range of the mobile phone. In this case, the sound pickup range corresponding to the first face image changes accordingly, to ensure that the mobile phone can obtain a sound. For example, if 1.5S>r>S, the radius of the first sound pickup range is equal to the distance between the central point of the first face image and the edge of the maximum sound pickup range. If r≥1.5 S, the radius of the first sound pickup range is equal to a product of a radius of a panoramic sound pickup range and the area ratio parameter. In this case, the mobile phone does not perform sound pickup in the part beyond the maximum sound pickup range. It may be understood that, when r>S, the method for determining the radius of the first sound pickup range by comparing values of r and 1.5 S is merely an example for description, and the radius of the first sound pickup range may alternatively be determined by using another method, to ensure that the mobile phone can perform sound pickup on audio data corresponding to the first face image. For example, the radius of the first sound pickup range is determined by comparing values of r and 2 S.

It should be noted that, in the process of determining the central point of the first face image or the first mouth image, the first face image and the first mouth image are both converted into a rectangle, and then a geometric central point of the rectangle is used as the central point of the corresponding first face image or the corresponding first mouth image. It may be understood that an irregular geometric shape may alternatively be used to correspond to the first face image and the first mouth image, to more accurately determine a position of a corresponding central point. The rectangle in this embodiment of this application is merely an example for description. This is not specifically limited in this embodiment of this application.

In some embodiments, the mobile phone may determine the first sound pickup range by using any one of the foregoing solution 1 to solution 3. Alternatively, the mobile phone may determine the first sound pickup range by combining a plurality of solutions in the foregoing solution 1 to solution 3. Alternatively, the mobile phone may determine the first sound pickup range by combining one or more parameters in the foregoing solution 1 to solution 3 with another parameter. Alternatively, the mobile phone may determine the first sound pickup range by using another parameter.

For example, the following describes a method for determining the first sound pickup range by the mobile phone by combining the foregoing solution 1 to solution 3.

Figure 16A:
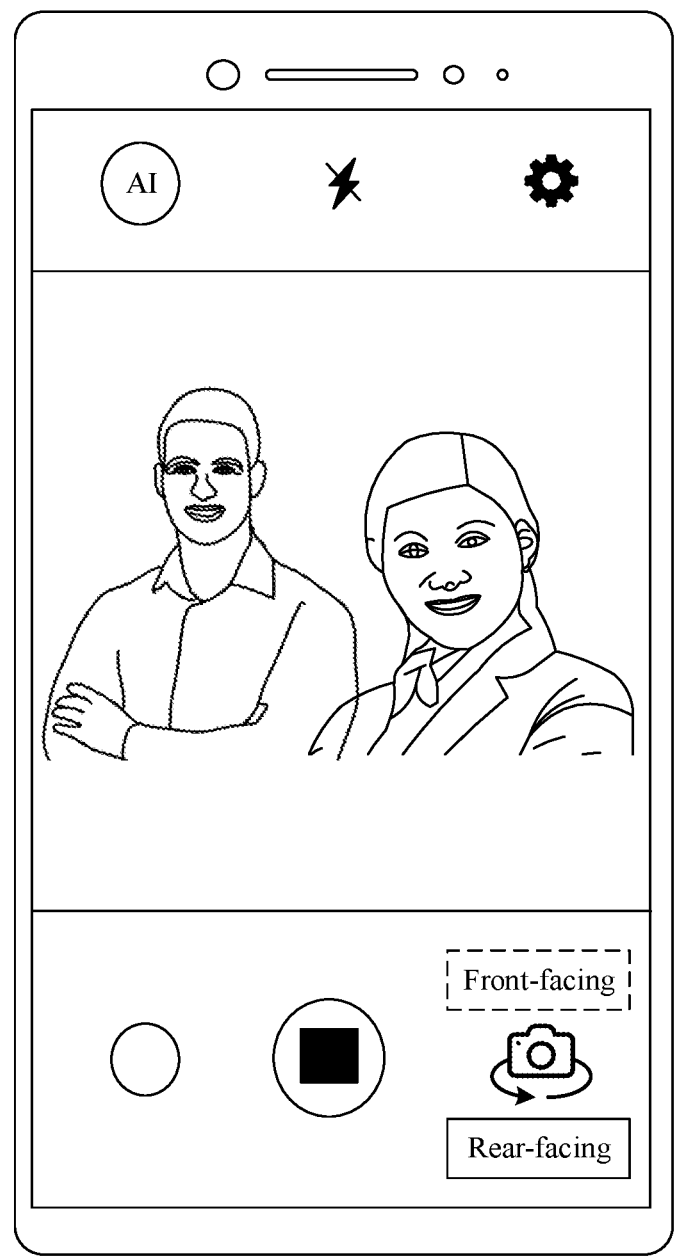
FIG. 16A(a) and FIG. 16A(b) are diagrams of a first sound pickup range according to an embodiment of this application.
Figure 16A:
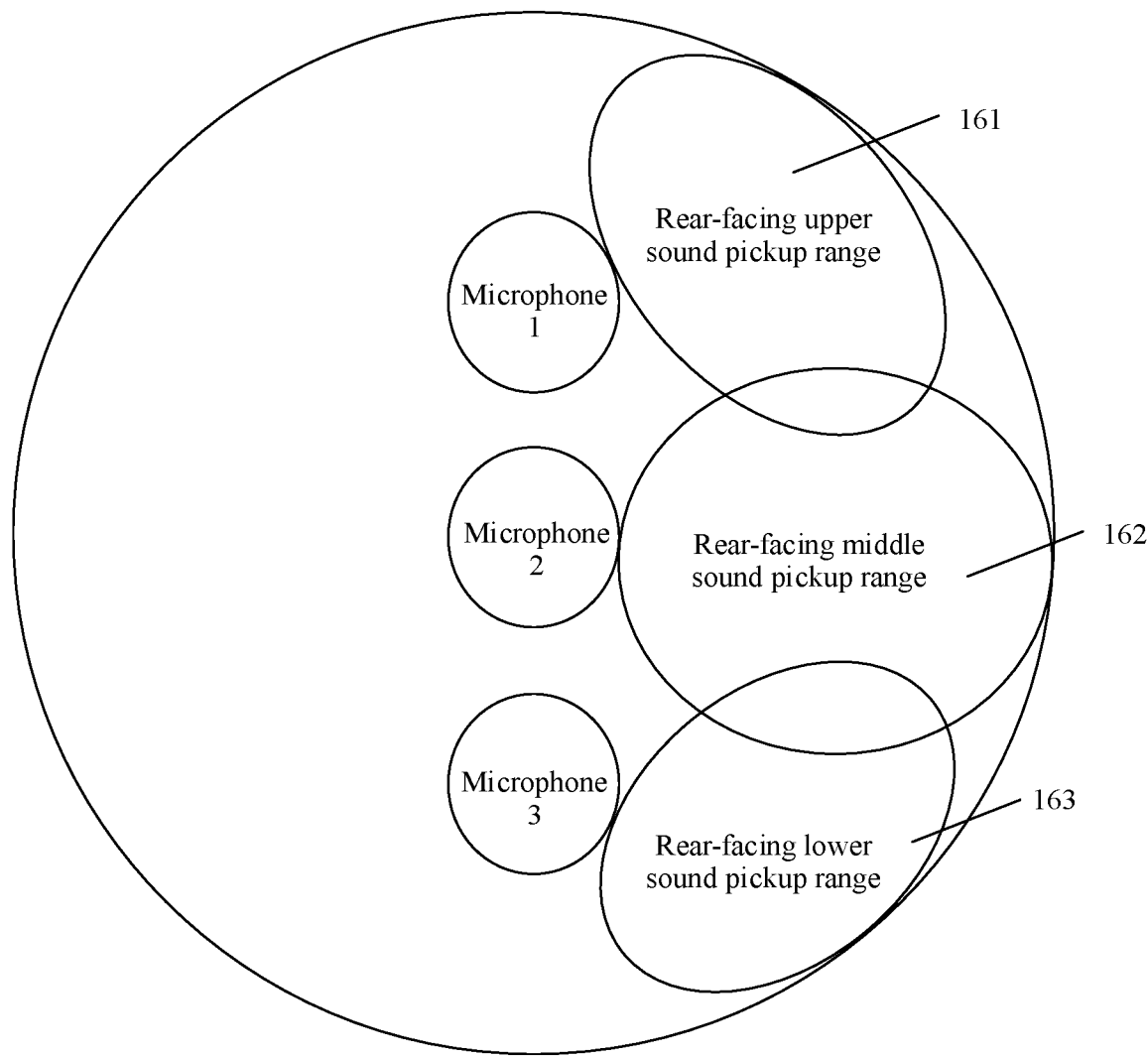

For example, it is assumed that the user currently selects to record a video picture by using the rear-facing camera, as shown in FIG. 16A(a). In this case, the mobile phone determines, based on a front-facing/rear-facing attribute parameter of a video picture corresponding to a first face image, that the video picture corresponding to the first face image is a rear-facing video picture. As shown in FIG. 16A(b), a first sound pickup range is in the 180-degree rear-facing range of the mobile phone, that is, ranges represented by an ellipse 161, an ellipse 162, and an ellipse 163.

Figure 16B:
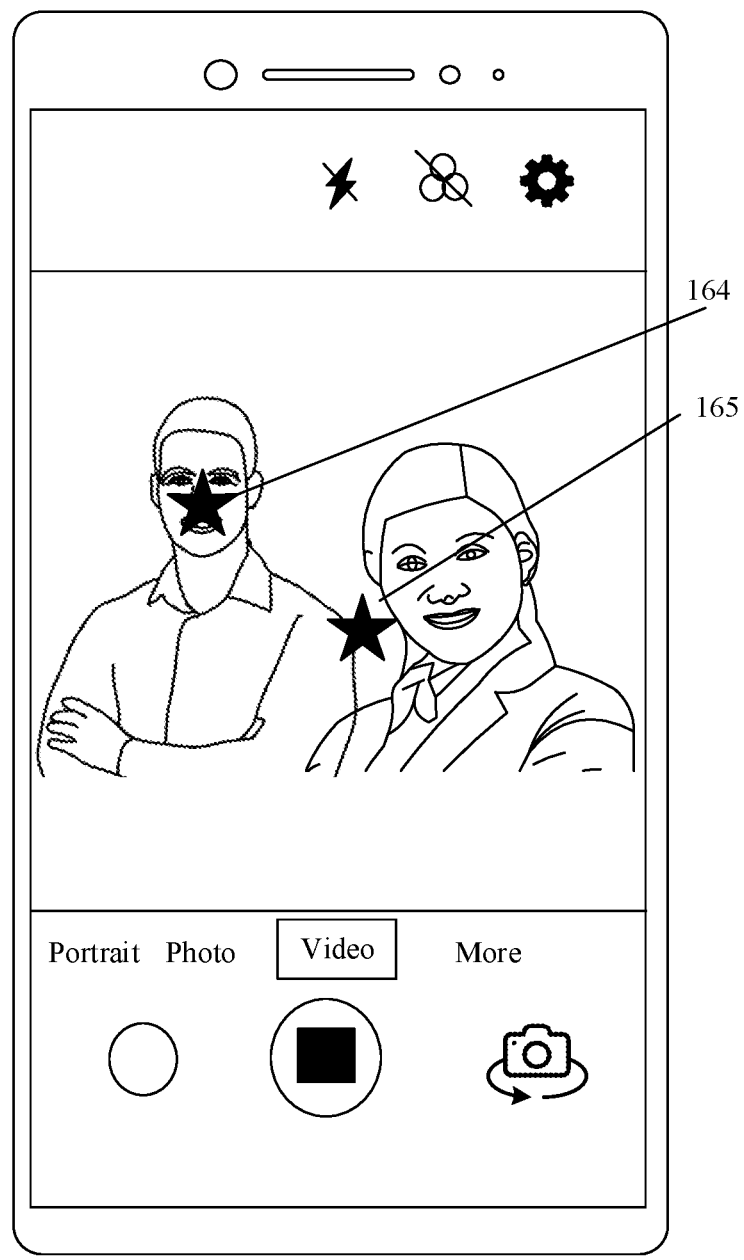
FIG. 16B(a) to FIG. 16B(c) are diagrams of a first sound pickup range according to an embodiment of this application.
Figure 16B:
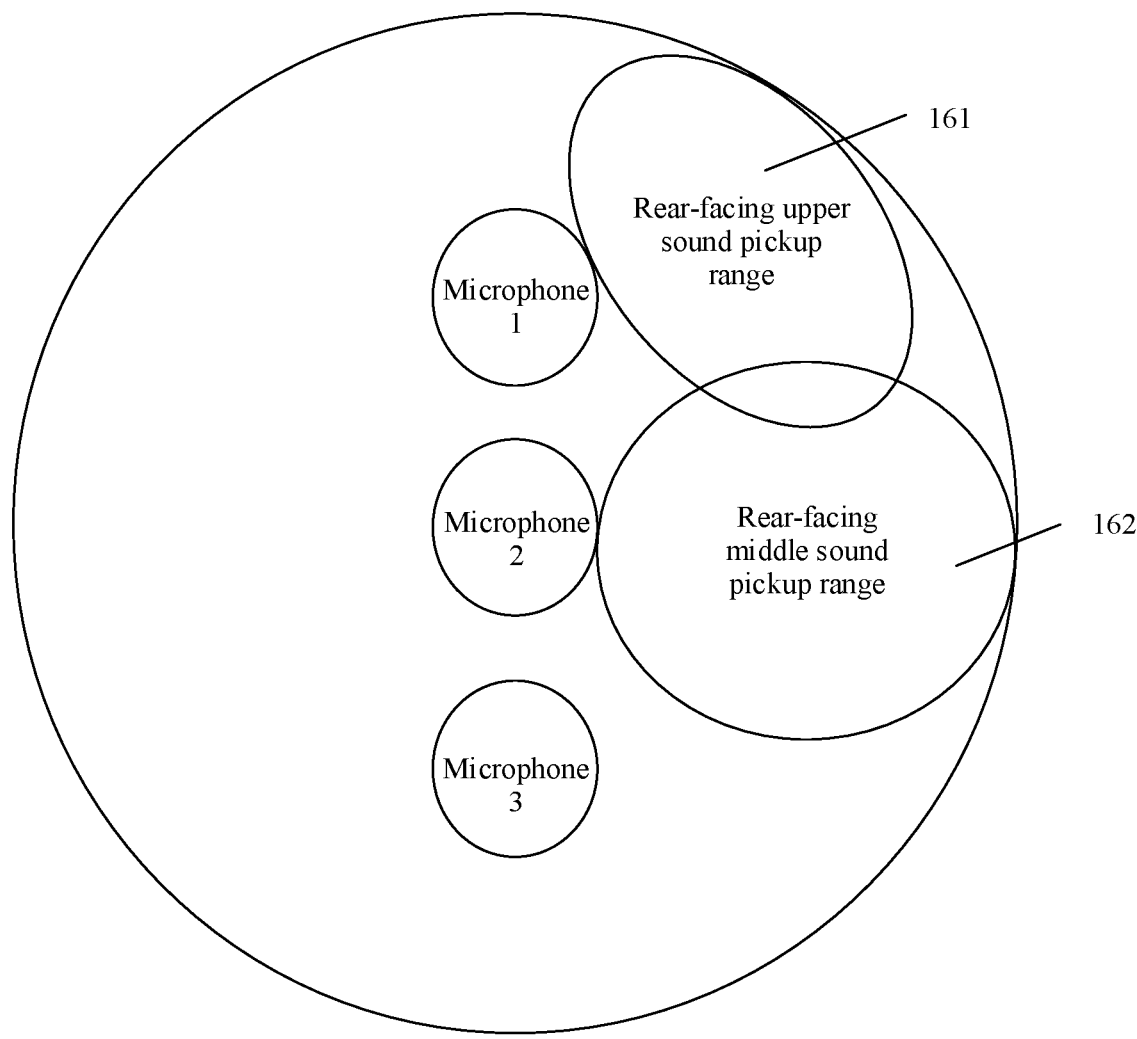
Figure 16B:
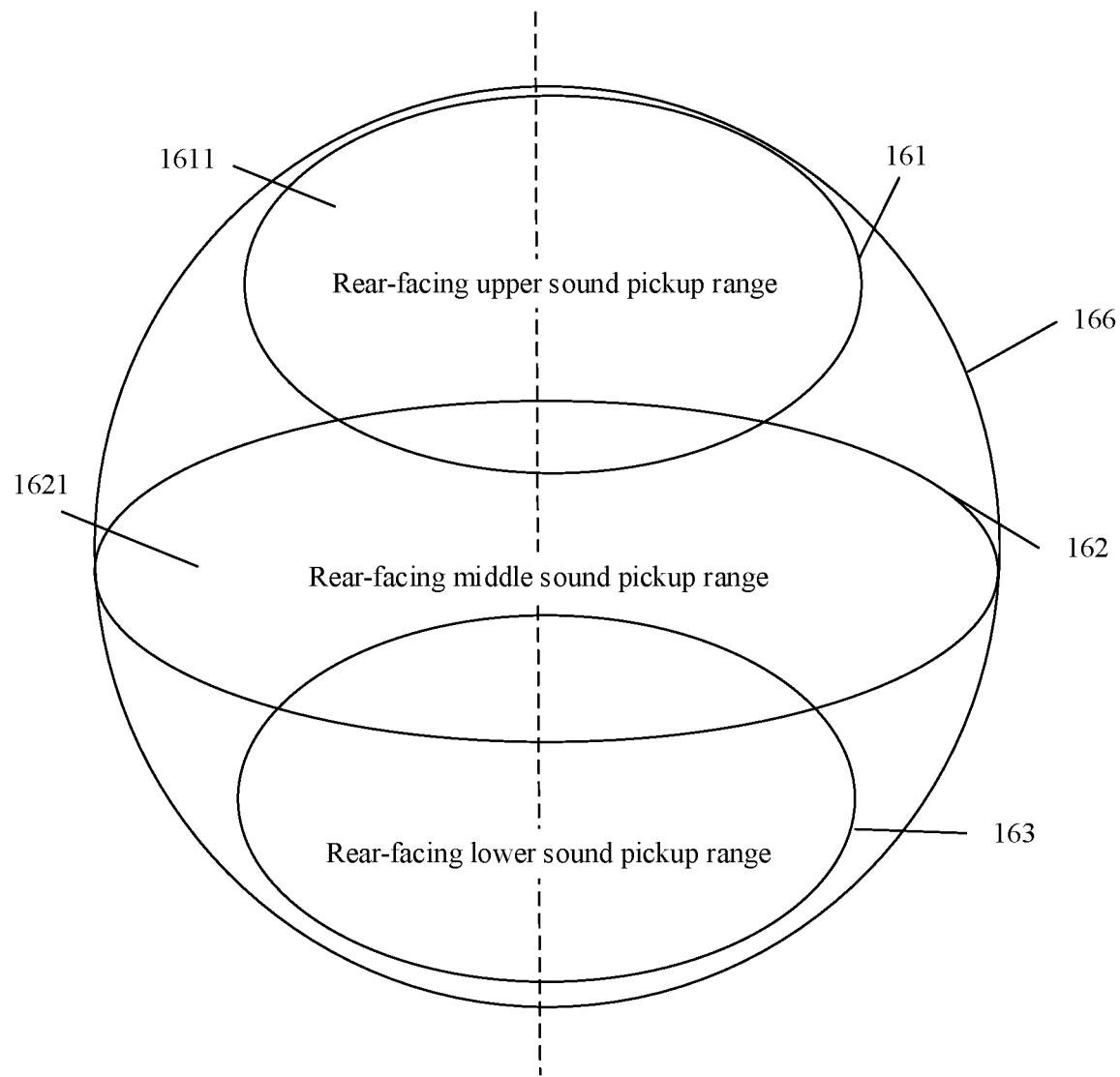

Then, the mobile phone may further determine the first sound pickup range based on position information corresponding to the first face image. For example, as shown in FIG. 16B(a), the first face image is a face image on a left side, and a central point 164 of the first face image is located on the upper left of a central point 165 of the viewfinder frame. The mobile phone determines, based on the position information, that an offset direction is upper left, and that a central point of the first sound pickup range is located on the upper left of a central point of the rear-facing sound pickup range. For example, for the first sound pickup range, refer to a left side of ranges represented by an ellipse 161 and an ellipse 162 shown in FIG. 16B(b). As shown in FIG. 16B(c), a large circle 166 is a maximum sound pickup range corresponding to the rear-facing video picture, and the sound pickup range is divided left and right along a center dashed line, so that corresponding left and right sound pickup ranges may be determined. For example, for the rear-facing and upper-left first sound pickup range, refer to ranges represented by a left half ellipse 1611 and a left half ellipse 1621 shown in FIG. 16B(c).

Figure 16C:
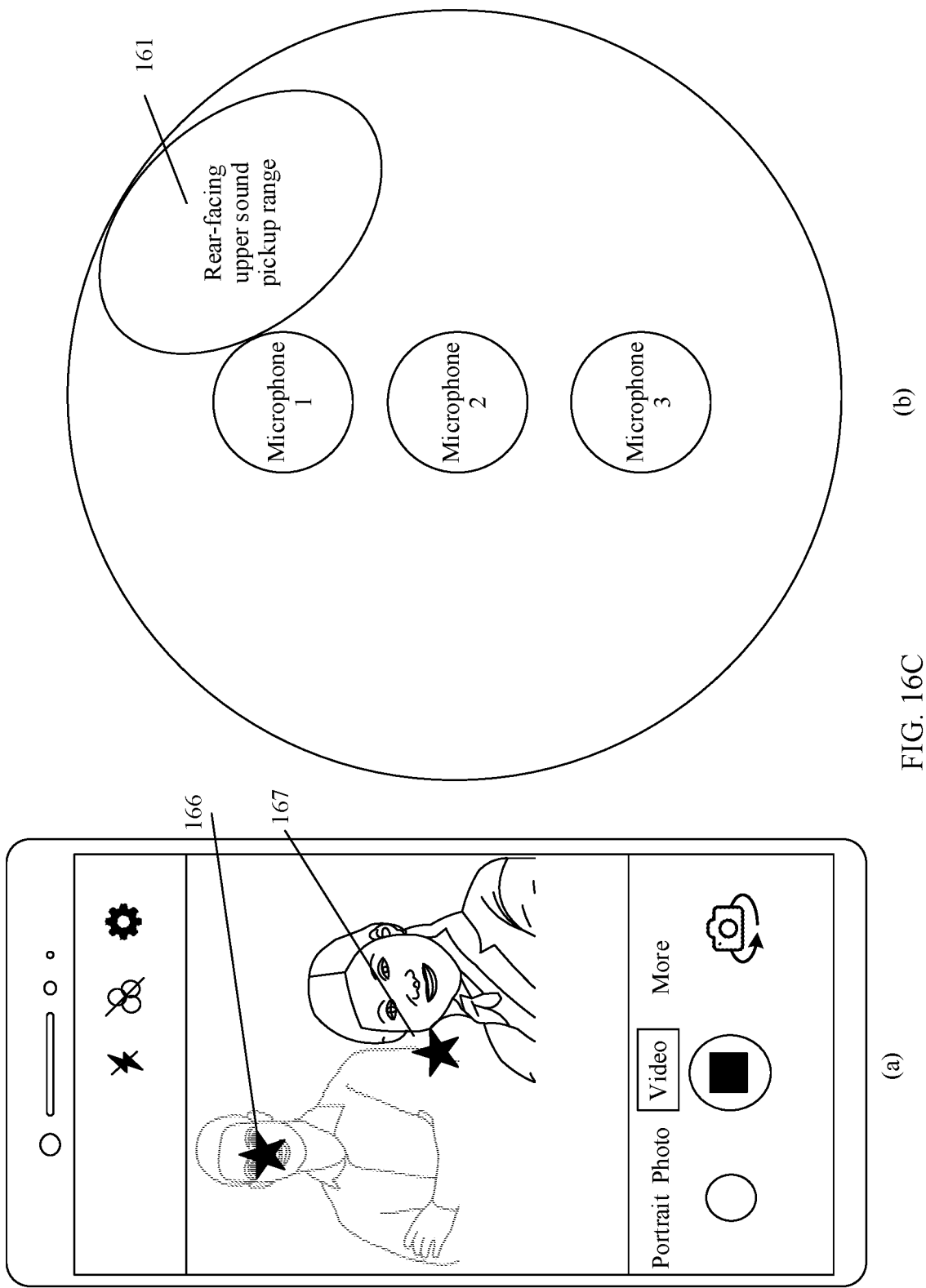
FIG. 16C is a diagram of a first sound pickup range according to an embodiment of this application.

On this basis, it is assumed that the position information further includes an offset angle and an offset distance. For example, the offset angle is greater than 45 degrees, and the offset distance is greater than ½ of a radius of the video picture displayed in the viewfinder frame. That is, the first face image is located above a central position of the video picture displayed in the viewfinder frame, and is relatively far away from the central position. As shown in (a) in FIG. 16C, the first face image is a face image on a left side, and an offset distance of a central point 166 of the first face image from a central point 167 of the viewfinder frame is relatively large. In this case, an auxiliary effect of a middle sound pickup range on audio corresponding to the first face image is relatively small. For the first sound pickup range, refer to a range represented by an ellipse 161 shown in (b) in FIG. 16C. Further, the first sound pickup range may be a range represented by the left half ellipse 1611 shown in FIG. 16B(c).

For example, as shown in Table 3 below, in the multi-microphone scenario shown in FIG. 2B(d), an example of a sound pickup range determined by the mobile phone based on the front-facing/rear-facing attribute parameter of the video picture corresponding to the first face image and the position information corresponding to the first face image is described. Alternatively, an example of a sound pickup range determined by the mobile phone based on the front-facing/rear-facing attribute parameter of the video picture corresponding to the first mouth image and the position information corresponding to the first mouth image is described.

TABLE 3

| Position of the first face image or the first mouth image | Sound pickup range |
|---|---|
| Front-facing upper | Sound pickup range corresponding to the microphone 24 |
| Front-facing middle | Sound pickup range corresponding to the microphone 25 |
| Front-facing lower | Sound pickup range corresponding to the microphone 26 |
| Rear-facing upper | Sound pickup ranges corresponding to the microphone 24 and the microphone 27 |
| Rear-facing middle | Sound pickup range corresponding to the microphone 28 |
| Rear-facing lower | Sound pickup ranges corresponding |

TABLE 3-continued

| Position of the first face image or the first mouth image | Sound pickup range |
|---|---|
| | to the microphone 26 and the microphone 29 |

Finally, the mobile phone may determine a final first sound pickup range based on an area ratio corresponding to the first face image. The mobile phone may determine, by using the area ratio and a sound pickup range corresponding to a framing range, a radius of the first sound pickup range corresponding to the first face image.

For example, in the process of determining the first sound pickup range by using the method in which the foregoing solution 1 to solution 3 are combined, for example, the first sound pickup range is circled by the circle 152 shown in (a) in FIG. 15. A radius of the circle 152 may be used to correspondingly represent a radius range of the first sound pickup range. In this case, the first sound pickup range may be represented by using the range represented by the left half ellipse 1611 shown in FIG. 16B(c). For another example, in the scenario shown in (b) in FIG. 15, it is finally determined that the radius of the first sound pickup range is the distance between the central point of the first face image and the edge of the maximum sound pickup range. In this case, the first sound pickup range may be represented by using the ranges represented by the left half ellipse 1611 and the left half ellipse 1612 shown in FIG. 16B(c).

It should be noted that, in a process in which the mobile phone determines the first sound pickup range with reference to a plurality of solutions in the foregoing solution 1 to solution 3, a sequence of determining the parameters is not limited, and the mobile phone may determine the parameters in another sequence different from the sequence in the foregoing example. For example, the parameters are simultaneously determined.

The first sound pickup range corresponding to the first face image or the first mouth image may be determined by using the foregoing solution, and subsequently, audio may be obtained by using the first sound pickup range, thereby improving audio quality.

S604: The mobile phone obtains audio based on the first sound pickup range.

The mobile phone may use a single microphone or a plurality of microphones to collect surrounding sound signals in various directions, that is, collect panoramic sound signals. After preprocessing the panoramic sound signals collected by the plurality of microphones, the mobile phone may obtain initial audio data, where the initial audio data includes sound information in various directions. Then, the mobile phone may record, based on the initial audio data and the first sound pickup range, audio corresponding to the first face image.

In an embodiment, after determining the first sound pickup range corresponding to the first face image or the first mouth image, the mobile phone may enhance a sound that is in the first sound pickup range and that is in the initial audio data, and suppress (or weaken) a sound that is outside the first sound pickup range and that is in the initial audio data. Then, processed audio data is recorded to obtain the audio corresponding to the first face image or the first mouth image.

In this way, the audio corresponding to the first face image or the first mouth image records the sound in the first sound pickup range, and the first sound pickup range is a sound pickup range determined based on the first feature value corresponding to the first face image or the first mouth image. Therefore, the sound in the first sound pickup range is a sound corresponding to a sound-making face or a sound-making mouth concerned by the user. That is, interference caused by noise in the recorded video picture to the sound made by the sound-making face or the sound-making mouth is reduced.

Further, based on the first sound pickup range, directional voice enhancement is performed, so that in a complex shooting environment, only some audio signals can be enhanced by using an audio algorithm. This can simplify an audio processing algorithm, improve processing efficiency, and reduce a requirement on hardware computing performance of the mobile phone.

In some other scenarios, because there may be an error between the first sound pickup range determined by the mobile phone based on the first feature value and a display range of the first face image or the first mouth image, the mobile phone may determine one or more reference first sound pickup ranges near the first sound pickup range. The mobile phone obtains one piece of audio based on the first sound pickup range, and obtains at least one piece of audio based on the reference first sound pickup range. The mobile phone may further use panoramic audio as one piece of audio. In this case, the mobile phone may obtain, based on the first sound pickup range, a plurality of pieces of audio corresponding to the first face image or the first mouth image. One piece of audio may be understood as one audio file.

In a possible implementation, the mobile phone may determine one or more corresponding reference first sound pickup ranges based on the area ratio corresponding to the first face image or the first mouth image. It is assumed that the first sound pickup range and the reference first sound pickup range are determined based on the area ratio parameter information. For example, based on Table 1 and as shown in Table 4 below, the mobile phone may determine the first sound pickup range and the reference first sound pickup range based on a rule in Table 4 below. In Table 4 below, the first sound pickup range is a recommended value, and the reference first sound pickup range includes an enhancement value 1, an enhancement value 2, and an enhancement value 3.

TABLE 4

| Recommended value | Enhancement value 1 | Enhancement value 2 | Enhancement value 3 |
|---|---|---|---|
| N*X/Y | 1.1*N*X/Y | 0.95*N*X/Y | 1.05*N*X/Y |

In another possible implementation, the mobile phone may determine, based on different audio processing methods, audio corresponding to the first sound pickup range and the reference first sound pickup range. For example, based on the procedure of determining the first sound pickup range, audio corresponding to the first sound pickup range is audio determined by using a Dolby sound effect algorithm, and audio corresponding to the reference first sound pickup range is audio determined based on a Histen sound effect algorithm. As shown in Table 5 below, an algorithm 1 to an algorithm 4 are different audio algorithms, and audio corresponding to the first sound pickup range and the reference first sound pickup range are determined based on the different audio algorithms. The first sound pickup range is a recommended value, and the reference first sound pickup range includes an enhancement value 1, an enhancement value 2, and an enhancement value 3.

TABLE 5

| Recommended value | Enhancement value 1 | Enhancement value 2 | Enhancement value 3 |
|---|---|---|---|
| Algorithm 1 | Algorithm 2 | Algorithm 3 | Algorithm 4 |

In still another possible implementation, the mobile phone may obtain, with reference to the area ratio parameter information corresponding to the first face image or the first mouth image and the audio algorithm, audio corresponding to the first sound pickup range and the reference first sound pickup range. As shown in Table 6 below, the first sound pickup range is a recommended value, and the reference first sound pickup range includes an enhancement value 1, an enhancement value 2, and an enhancement value 3.

TABLE 6

| Recommended value | Enhancement value 1 | Enhancement value 2 | Enhancement value 3 |
|---|---|---|---|
| N*X/Y + algorithm 1 | 1.1*N*X/Y + algorithm 2 | 0.95*N*X/Y + algorithm 3 | 1.05*N*X/Y + algorithm 4 |

It may be understood that the mobile phone may alternatively determine the reference first sound pickup range by using another method. This is not specifically limited in this embodiment of this application.

In addition, the mobile phone may process the initial audio data to enhance a sound in the reference first sound pickup range and suppress a sound outside the reference first sound pickup range, and further record processed audio data to obtain one or more pieces of audio corresponding to the first face image or the first mouth image.

In this way, the mobile phone may record and obtain, based on the first sound pickup range and the reference first sound pickup range, a plurality of pieces of audio that match the first feature value corresponding to the first face image or the first mouth image and the picture of the first face image or the first mouth image, for subsequent selection and playing by the user. Each piece of audio data corresponding to the first face image or the first mouth image may be stored as one audio file, and the first face image may correspond to a plurality of audio files.

When the mobile phone records, based on the first sound pickup range and the reference first sound pickup range, the plurality of pieces of audio corresponding to the first face image or the first mouth image, the plurality of pieces of audio provide a greater quantity of pieces of audio in different sound pickup ranges for the user, a possibility of matching the sound corresponding to the first face image or the first mouth image concerned by the user is greater, and selectivity of audio playing by the user is greater.

Figure 17:
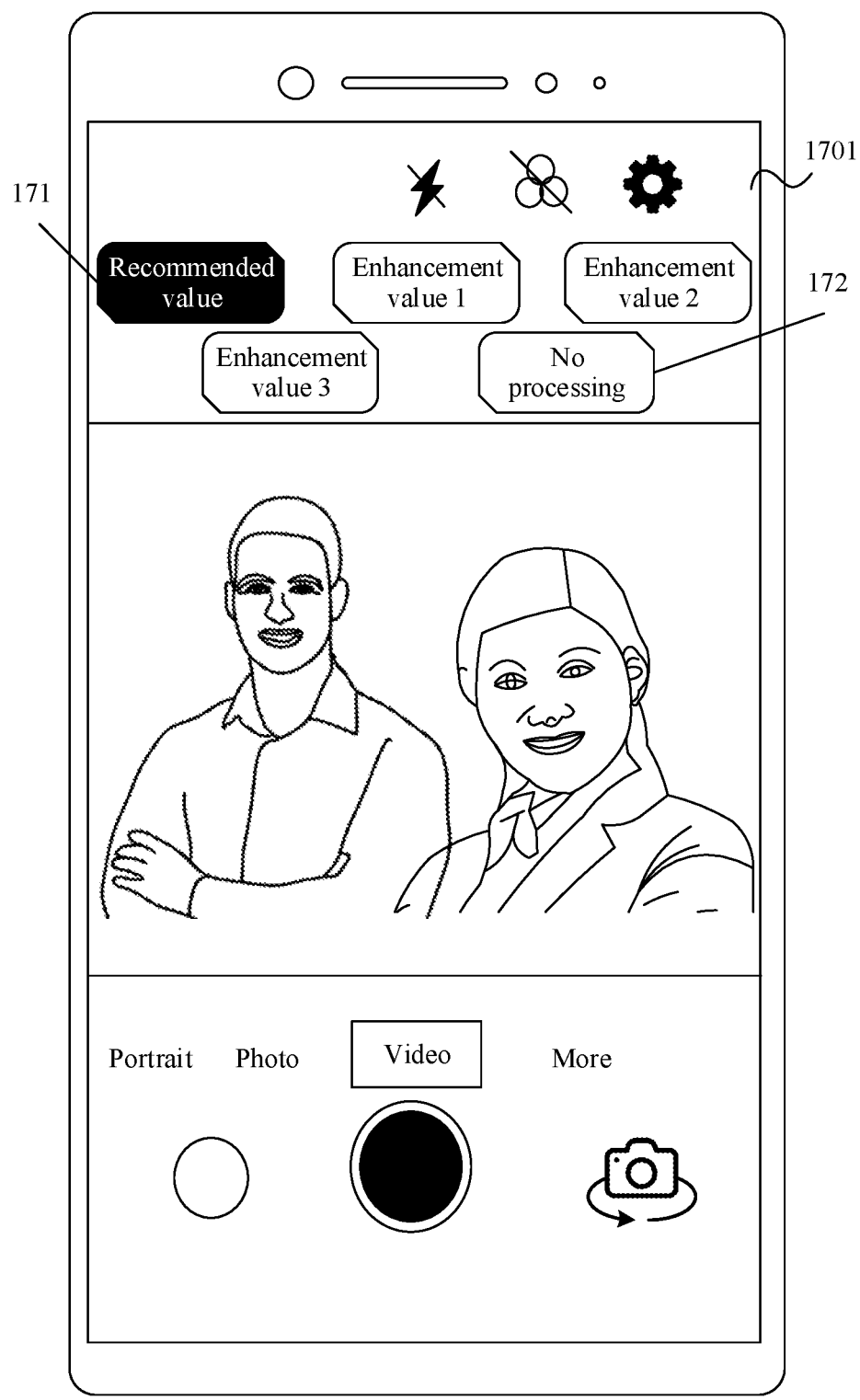
FIG. 17 is a diagram of an interface according to an embodiment of this application.

In some embodiments, the mobile phone may alternatively record, based on the first sound pickup range or the reference first sound pickup range selected by the user, audio corresponding to the first face image or the first mouth image. For example, on an interface 1701 shown in FIG. 17, if the mobile phone detects an operation of tapping a recommended value selection control 171 by the user, in a process of recording the video picture, the audio corresponding to the first face image or the first mouth image is recorded based on the first sound pickup range and the initial audio data. Similarly, if the mobile phone detects an operation of tapping an enhancement value 1 selection control by the user, in the process of recording the video picture, the audio corresponding to the first face image or the first mouth image is recorded based on a reference first sound pickup range corresponding to the enhancement value 1 and the initial audio data. If the mobile phone detects an operation of tapping a no-processing selection control 172 by the user, in the process of recording the video picture, audio signals in various directions are fused based on the initial audio data, to obtain panoramic audio. That is, audio corresponding to the no-processing selection control 172 is panoramic audio, and may also be understood as audio obtained when the mobile phone is in a non-voice enhancement mode. For a method for determining the recommended value, the enhancement value 1, the enhancement value 2, and the enhancement value 3 on the interface 1701, refer to Table 4 to Table 6, and details are not described herein.

In some embodiments, before formally recording the video picture, the user may experience recording effects corresponding to different sound pickup ranges, to determine a sound pickup range to be selected in a process of finally recording the video picture. The mobile phone may store only a corresponding audio file based on a choice of the user, so that storage space of the mobile phone may be saved when it is ensured that a user requirement is met.

In some other scenarios, in the process of recording the video picture by the mobile phone, the first sound pickup range may change to a second sound pickup range. For example, in the process of recording the video picture, the mobile phone detects an operation of giving an indication of switching between the front-facing camera and the rear-facing camera by the user. A sound pickup range before switching is the first sound pickup range, and a sound pickup range after switching is the second sound pickup range. Therefore, for audio in a recorded video, the audio recorded by the mobile phone includes at least audio of first duration and audio of second duration. The audio of first duration is audio corresponding to the first sound pickup range, and the audio of second duration is audio corresponding to the second sound pickup range. That is, the mobile phone may dynamically determine a sound pickup range based on a change of a sound-making face or a sound-making mouth in the video picture, and then record audio based on the sound pickup range. After an operation of giving a recording stop indication by the user is finally detected, audio of the formed video picture may include a plurality of pieces of audio of different duration or same duration recorded based on a time sequence and the changing sound pickup range.

In this way, based on a change of the sound pickup range, the mobile phone may always focus on improving audio recording quality of a part in which voice enhancement needs to be performed, thereby ensuring an audio recording effect. In addition, when the user plays a video file, playing experience matching a dynamic change such as a sound range change of video content may be presented to the user.

Figure 18A:
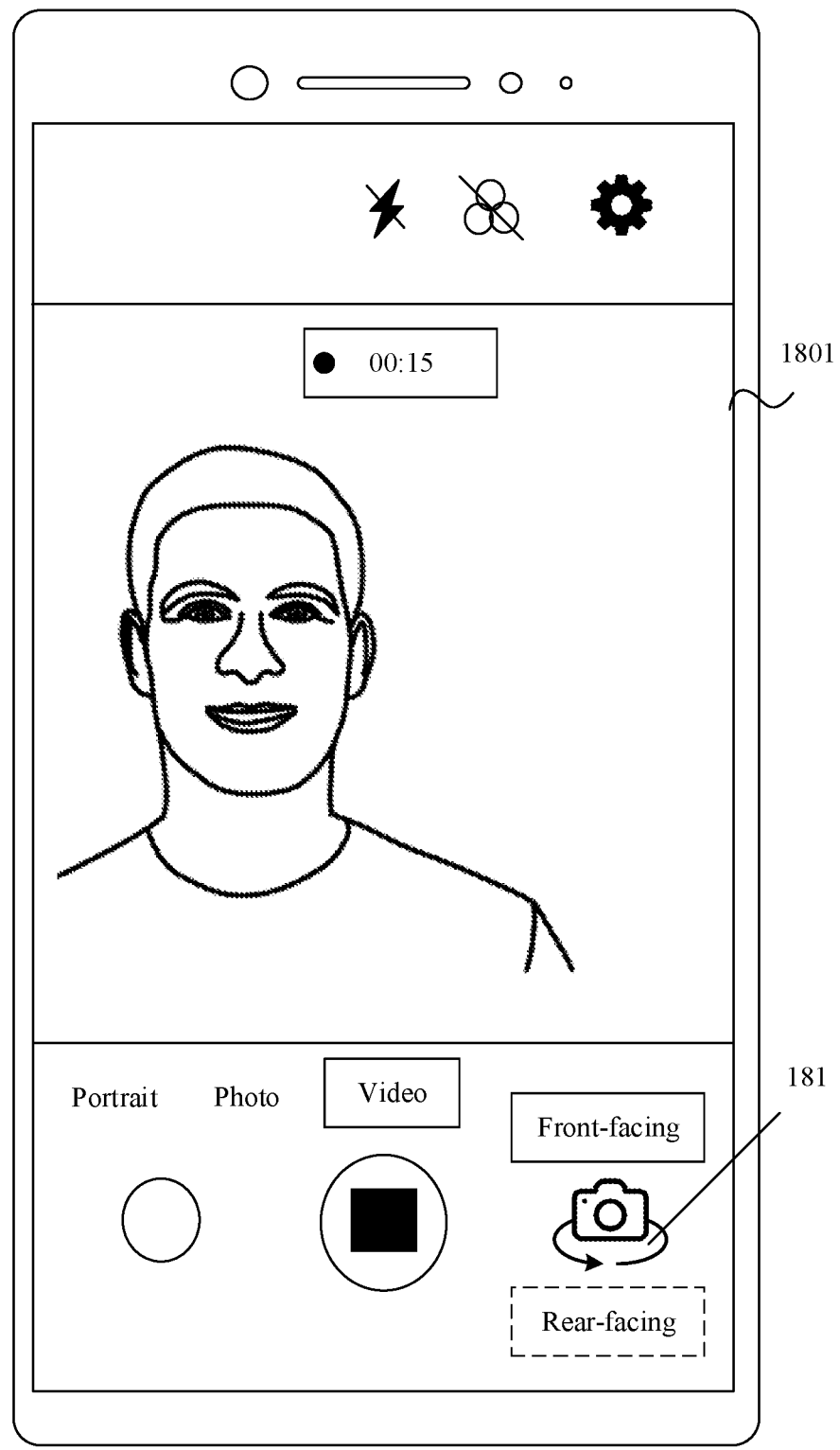
FIG. 18(a) to FIG. 18(d) are diagrams of a group of interfaces according to an embodiment of this application.
Figure 18B:
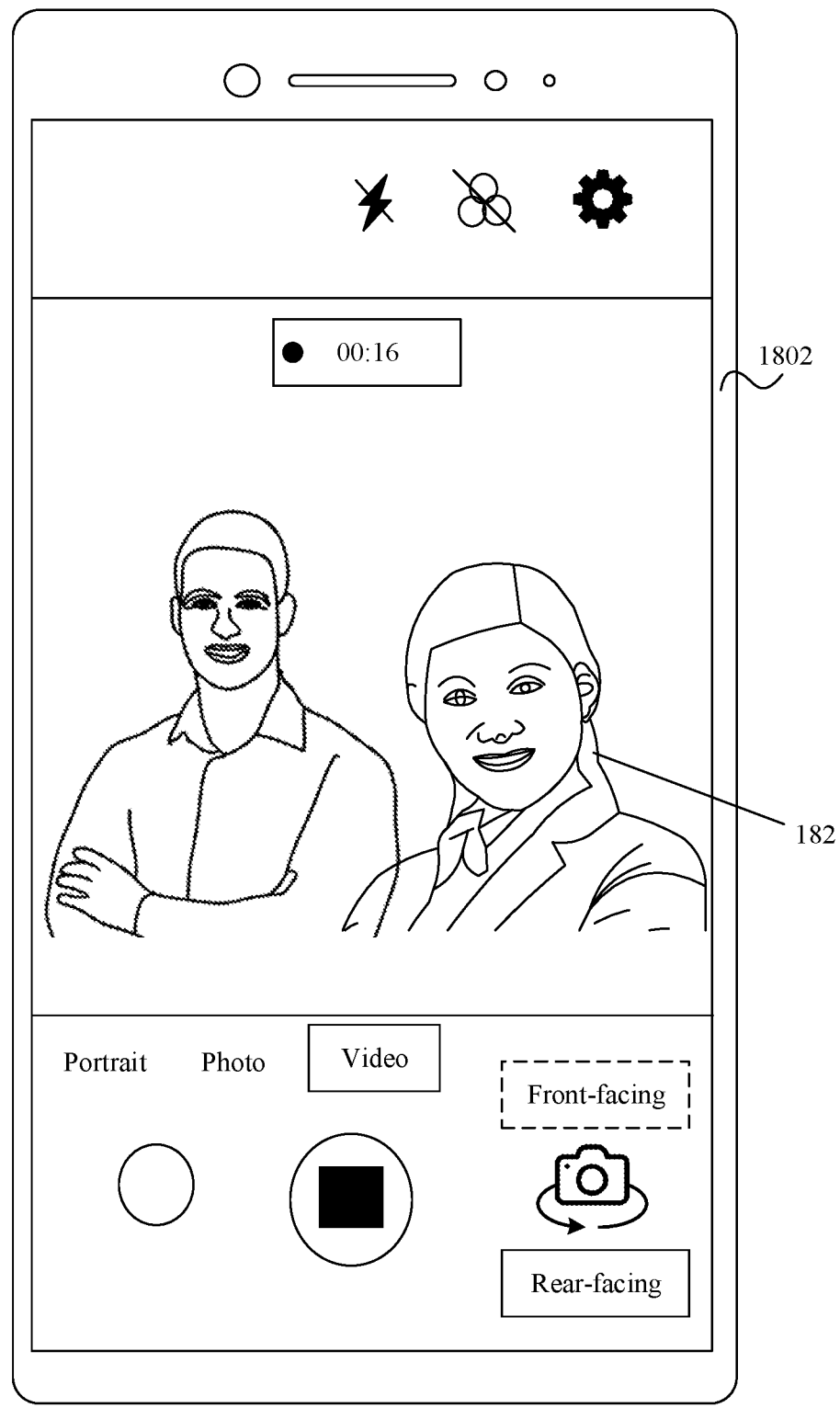

In a possible implementation, in the process of recording the video picture by the mobile phone, the first feature value corresponding to the first face image or the first mouth image changes, resulting in a change of the sound pickup range. For example, it is assumed that the front-facing/rear-facing attribute parameter of the video picture changes, resulting in a change of the first sound pickup range. On an interface 1801 shown in FIG. 18(a), a front-facing video picture is displayed. When duration of recording is 00:15, the mobile phone detects an operation of tapping a front-facing/rear-facing switching control 181 by the user, switches to the rear-facing camera for shooting, and displays an interface 1802 shown in FIG. 18(b). In this case, the first feature value corresponding to the first face image or the first mouth image changes before and after the duration of 00:15, audio in duration of 00:00 to 00:15 in recorded audio is audio corresponding to the first sound pickup range, and audio after the duration of 00:15 is audio corresponding to the second sound pickup range. Alternatively, the mobile phone detects that the focus position of focusing selected by the user changes. In this case, the position information corresponding to the first face image or the first mouth image changes, resulting in a change of the first sound pickup range.

Alternatively, a picture range and a picture size of the video picture in the viewfinder frame may vary with a change of a zoom ratio (that is, a zoom value). The zoom ratio may be a preset zoom ratio, a zoom ratio used last time before the camera is closed, a zoom ratio indicated by the user in advance, or the like. In addition, the zoom ratio corresponding to the viewfinder frame may also be changed based on an indication of the user. In this case, in a scenario, the framing range changes as the zoom ratio changes. Accordingly, the area of the first face image or the area of the first mouth image changes, and further, the area ratio corresponding to the first face image or the first mouth image changes. That is, a change of the zoom ratio results in a change of the sound pickup range. In this way, in a subsequent video playing process, the recorded audio may dynamically vary with a change of a video content display area or the like, thereby improving playing experience of the user.

For example, when other parameters are the same, if the zoom ratio is increased to two times of an original value, the sound pickup range may be reduced to ⅓ of an original value; and if the zoom ratio is increased to three times of the original value, the sound pickup range may be reduced to ⅙ of the original value. Therefore, the mobile phone may determine, based on the zoom ratio, the sound pickup range corresponding to the framing range and the sound pickup range corresponding to the area ratio of the first face image or the area ratio of the first mouth image. As shown in Table 7 below, X is used to represent an area of the first face image or an area of the first mouth image; and Y is used to represent the area of the video picture displayed in the viewfinder frame. When the zoom value changes, values of X and Y also change. The corresponding sound pickup range also changes.

TABLE 7

| Zoom value | Area ratio | Sound pickup range corresponding to the framing range | Sound pickup range corresponding to the area ratio of the first face image |
| --- | --- | --- | --- |
| 1 | X/Y | N | N*X/Y |
| Z | X11/Y11 | N11 | N11*X11/(Y11*Z) |

It should be noted that the sound pickup range may alternatively not be changed when the zoom ratio changes. For example, in a recording process, after the zoom ratio changes, the first face image does not change, indicating that content concerned by the user does not change. For example, a user A interviews a user B, and shoots an interview process of the user B by using the mobile phone. The mobile phone determines that a first face image in a video picture is a face image of the user B. The mobile phone detects that the zoom ratio increases, but in this case, the first face image in the video picture is still the face image of the user B. In this case, the mobile phone may not need to obtain the first sound pickup range again, to reduce a computation amount and power consumption. Alternatively, if the mobile phone detects, in a preset time range, a plurality of operations of changing the zoom ratio, the sound pickup range may not need to be changed. For example, the preset time period is 2 s. After detecting, for the first time, an operation of changing the zoom ratio, the mobile phone does not need to recalculate the sound pickup range first. If the mobile phone does not detect, in 2 s, an operation of changing the zoom ratio, the mobile phone recalculates the sound pickup range. If the mobile phone detects, in 2 s, an operation of changing the zoom ratio again, the mobile phone does not need to recalculate the sound pickup range, and uses a time node at which the operation of changing the zoom ratio is detected this time as a start point to monitor whether an operation of changing the zoom ratio is detected in a next 2 s time period.

In a possible implementation, in the process of recording the video picture by the mobile phone, if the first face image or the first mouth image changes, the first sound pickup range changes. For example, the foregoing scenario of switching between the front-facing camera and the rear-facing camera may also be understood as a change of the first face image or the first mouth image. Alternatively, the sound-making face image or the sound-making mouth image changes, resulting in a change of the first face image or the first mouth image. For example, on the interface 1802 shown in FIG. 18(b), it is assumed that in duration from 00:16 to 00:20, the mobile phone determines that the first face image is two face images included in the video picture. In duration from 00:21 to 00:30, the mobile phone recognizes that the first face image is a face image 182 on a right side of the video picture. Alternatively, if the shot picture moves, and a currently recorded video picture does not include the previously recognized first face image or first mouth image, the first sound pickup range needs to be re-recognized by using the foregoing method.

Figure 18C:
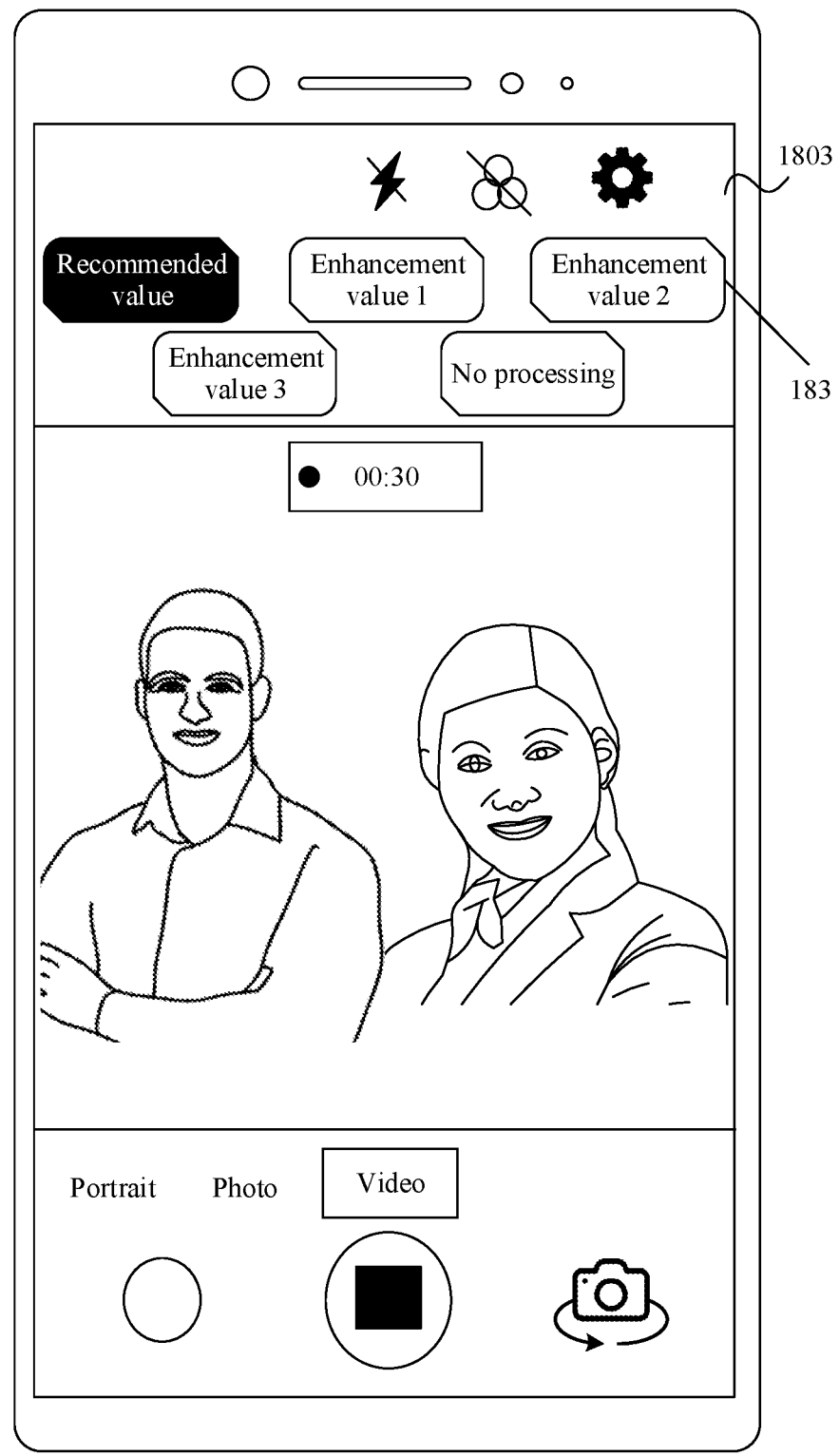
Figure 18D:
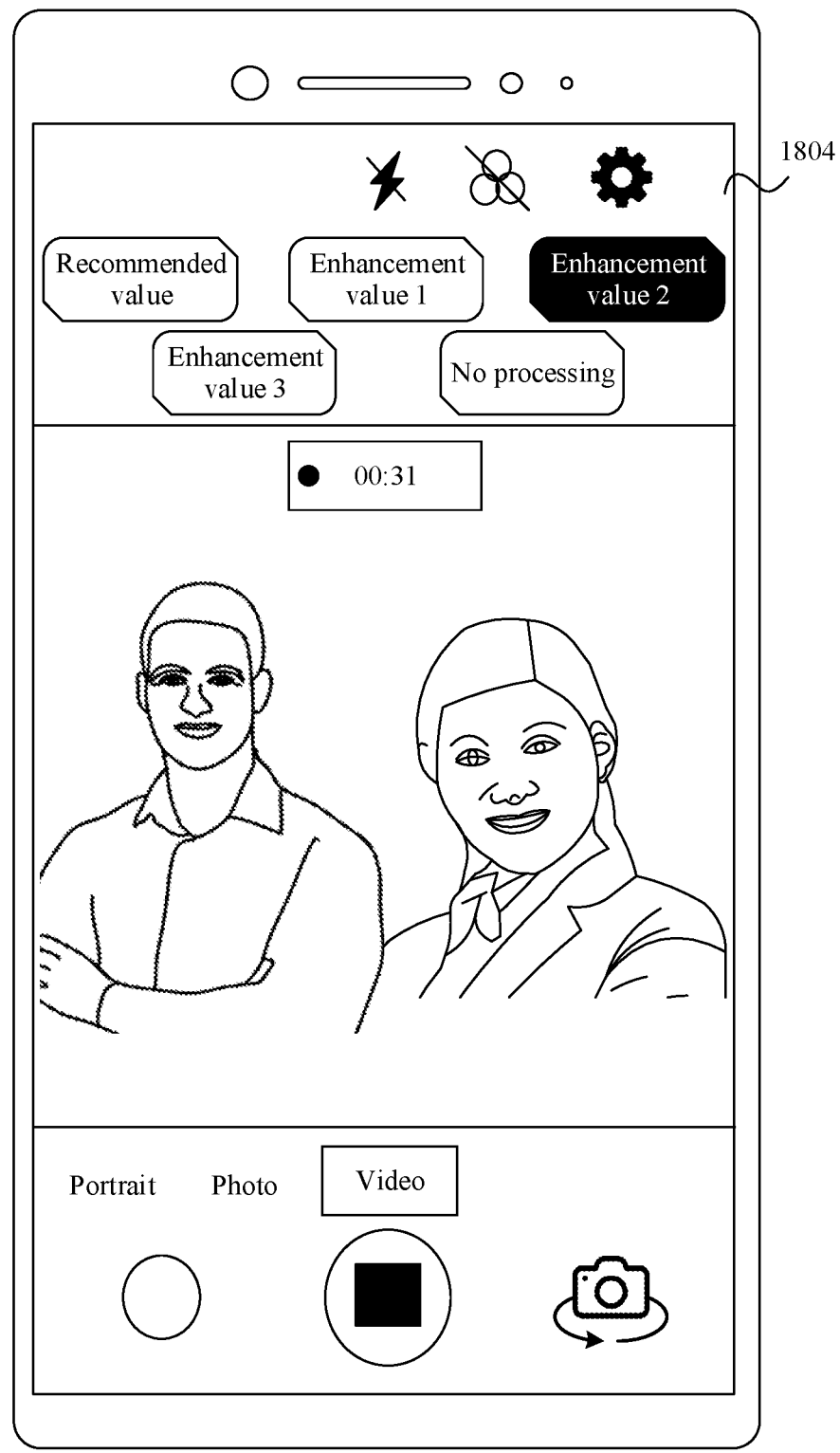

In a possible implementation, the second sound pickup range is determined in response to an operation of changing a selection of the first sound pickup range or the reference first sound pickup range by the user. For example, on an interface 1803 shown in FIG. 18(c), before duration of 00:30, the mobile phone records the video picture by using the first sound pickup range corresponding to the recommended value, and detects, at 00:30, an operation of tapping an enhancement value 2 selection control 183 by the user. In response to the operation, the mobile phone determines the second sound pickup range as a sound pickup range corresponding to the enhancement value 2, and displays an interface 1804 shown in FIG. 18(d). After the duration of 00:30, the mobile phone obtains audio by using the sound pickup range corresponding to the enhancement value 2.

In some embodiments of this application, before generating an audio file of each piece of audio, the mobile phone may perform a plurality of types of sound effect processing on each piece of audio, so that the recorded audio achieves higher audio quality and a better audio processing effect. For example, the sound effect processing may include a Dolby sound effect, a Histen sound effect, a sound retrieval system (SRS) sound effect, a bass enhanced engine (BBE) sound effect, a dynamic bass enhanced engine (DBEE) sound effect, or the like.

It should be noted that, to prevent frequent changes of the first sound pickup range caused by frequent changes of the first feature value due to jitter of the mobile phone, the mobile phone may set a preset time threshold, and the mobile phone does not change the first sound pickup range for a change within the preset time threshold. For example, based on a setting, if the first feature value consecutively changes twice in 1 s, the mobile phone considers that the current changes of the first feature value are caused by jitter of the mobile phone, and does not change the corresponding first sound pickup range.

In an embodiment, in a process of using the foregoing method to collect an audio signal by using the microphone, the mobile phone may collect the audio signal and process the audio signal based on the first sound pickup range, to obtain audio corresponding to the first face image or the first mouth image. Finally, final audio is directly generated after video recording ends. Alternatively, the mobile phone may first collect an audio signal, and after video recording is completed, process the audio signal based on the first sound pickup range, to obtain audio corresponding to the first face image or the first mouth image. Alternatively, the mobile phone invokes, based on the first sound pickup range, a corresponding microphone to collect an audio signal in the first sound pickup range, and processes the audio signal to obtain audio corresponding to the first face image or the first mouth image.

In an embodiment, the video recording function may include a single-channel video recording function and a multi-channel video recording function. The single-channel video recording function means that the mobile phone displays one viewfinder frame in a shooting process, to record one video picture. The multi-channel video recording function means that the mobile phone displays at least two viewfinder frames in a shooting process, and each viewfinder frame is used for one video picture. In a process of using the multi-channel video recording function, for each video picture and a corresponding audio collection manner, refer to the implementation of the single-channel video recording function. In the foregoing method in which the first sound pickup range is determined based on the first face image and the first mouth image, and voice recording is performed based on the first sound pickup range, an example in which the shooting interface includes one viewfinder frame is used for description. In addition, a process corresponding to the multi-channel video recording function including two or more viewfinder frames is similar to this process, and details are not described.

In a process of recording the video picture, the mobile phone determines the first sound pickup range based on a sound-making face image or a sound-making mouth image, and then records audio based on the first sound pickup range. Subsequently, the recorded audio needs to be stored. The user may play a video picture and audio of a stored video. It should be noted that, if a scenario of recording the video picture is a real-time communication scenario such as a live broadcast or a video call, for a method for recording audio in the process of recording the video picture, refer to the foregoing method. However, after an operation of giving a shooting stop indication by the user is detected, that is, after an operation of stopping communication is detected, communication is directly stopped, with no need to generate a recorded video. It may be understood that, in some real-time communication scenarios, the user may alternatively choose to store a recorded video. In response to an operation of the user, the mobile phone determines whether to store the recorded video in the real-time communication scenario.

The following describes a scenario in which the mobile phone stores a recorded video and plays the stored recorded video.

In an embodiment, after detecting an operation of giving a shooting stop indication by the user, the mobile phone stops recording a video picture and audio, and generates a recorded video. The operation of giving a shooting stop indication by the user may be an operation of tapping the control 45 displayed on the video recording preview interface 403 shown in FIG. 4(*c*), an operation of giving a shooting stop indication by the user by using a voice, a mid-air gesture operation, or another operation. This is not specifically limited in this embodiment of this application.

In an embodiment, after detecting the operation of giving a shooting stop indication by the user, the mobile phone generates a recorded video, and returns to the video recording preview interface or a shooting preview interface. The recorded video may include a video picture and audio. For example, for a thumbnail of the recorded video generated by the mobile phone, refer to a thumbnail 191 displayed on an interface 1901 shown in FIG. 19(*a*), or a thumbnail 192 displayed on an interface 1902 shown in FIG. 19(*b*).

In a possible implementation, the mobile phone may prompt the user that the recorded video has a plurality of pieces of audio. For example, the thumbnail of the recorded video or detailed information of the recorded video may include prompt information used to indicate the plurality of pieces of audio. For example, the prompt information may be a mark 193 of a plurality of loudspeakers displayed on the interface 1902 shown in FIG. 19(*b*), a mark in another form, text information, or the like. Each piece of audio may separately correspond to audio collected in the first sound pickup range and the reference first sound pickup range.

Figure 19A:
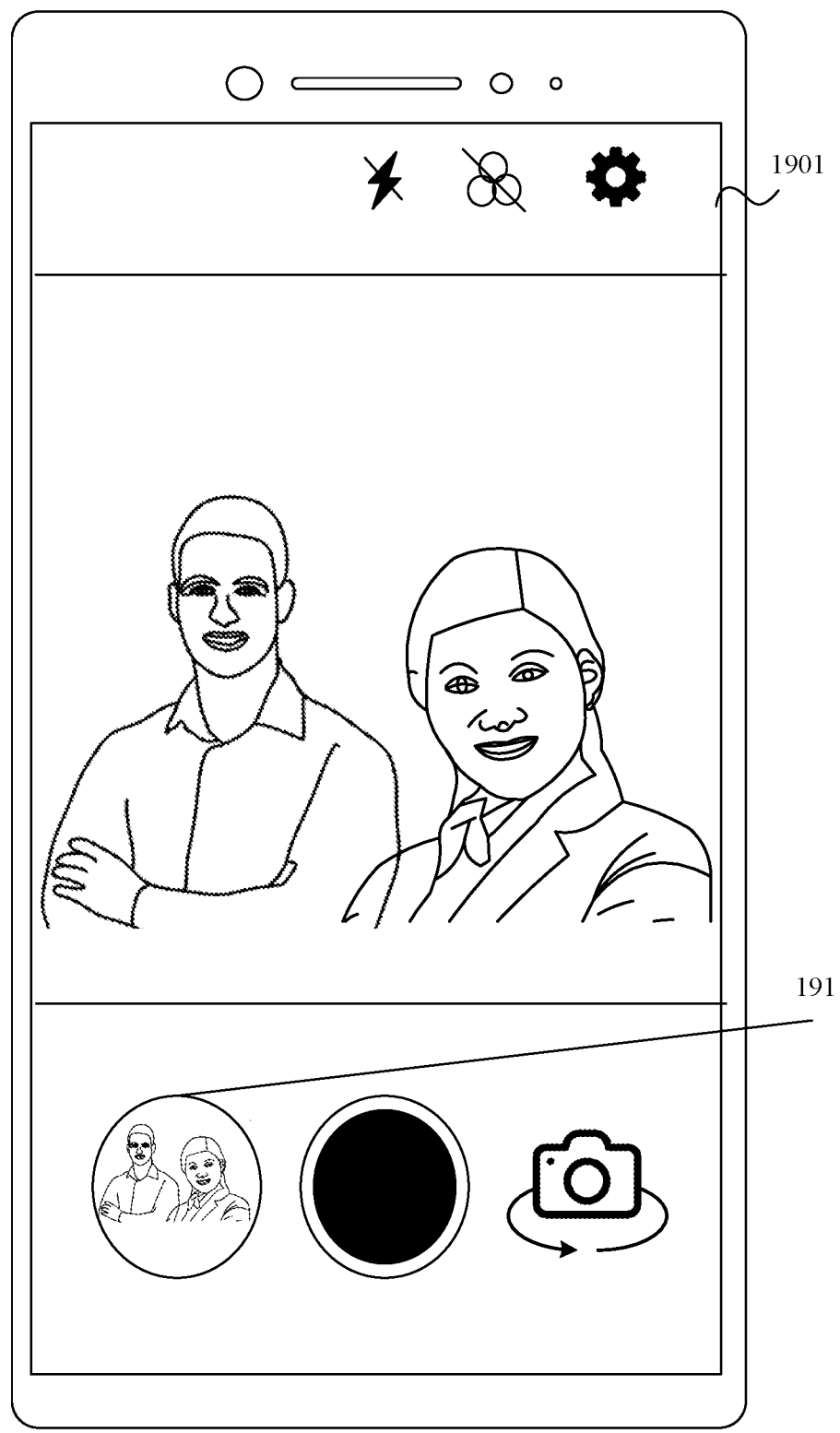
FIG. 19(a) to FIG. 19(c) are diagrams of a group of interfaces according to an embodiment of this application.
Figure 19B:
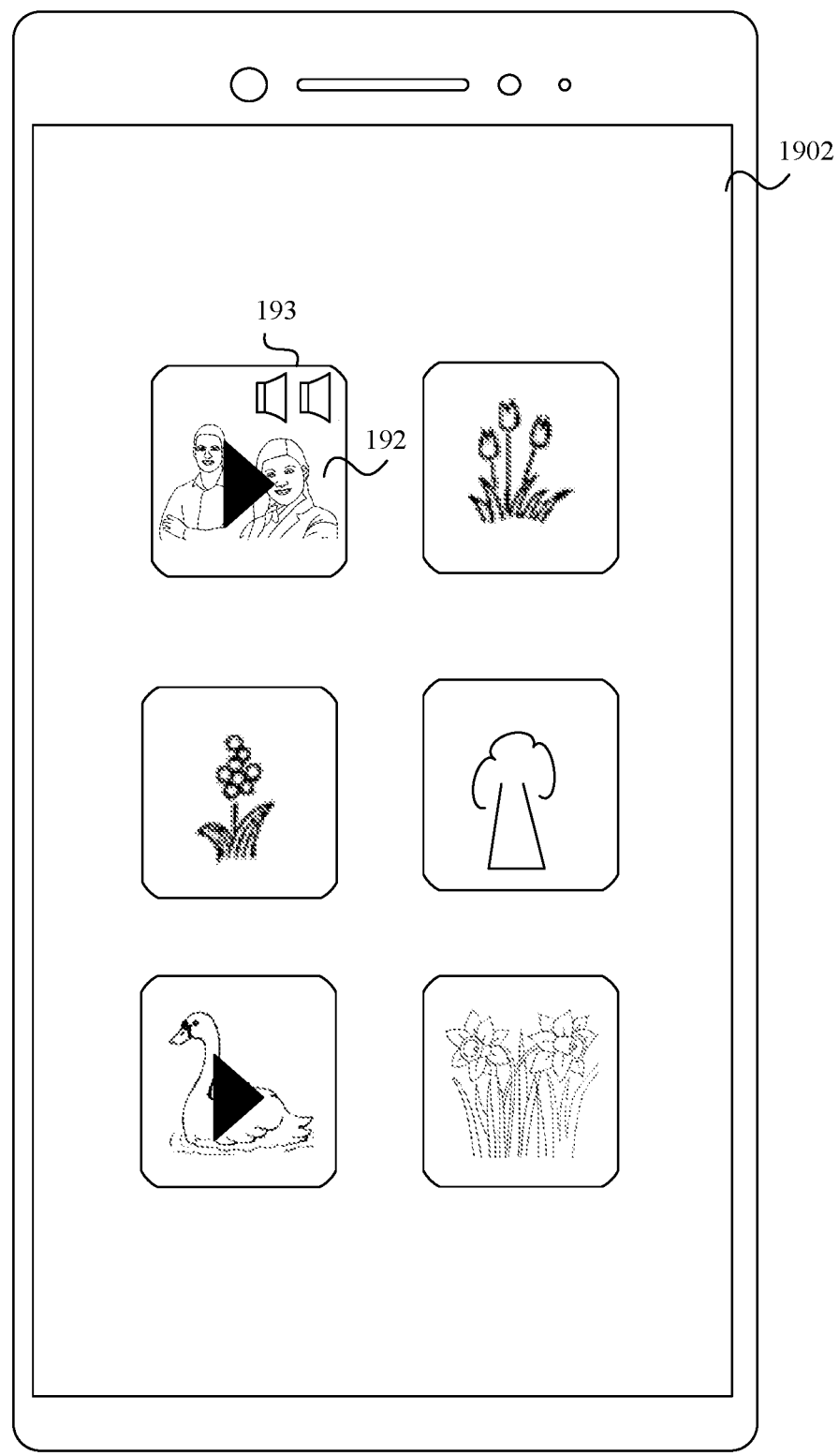
Figure 19C:
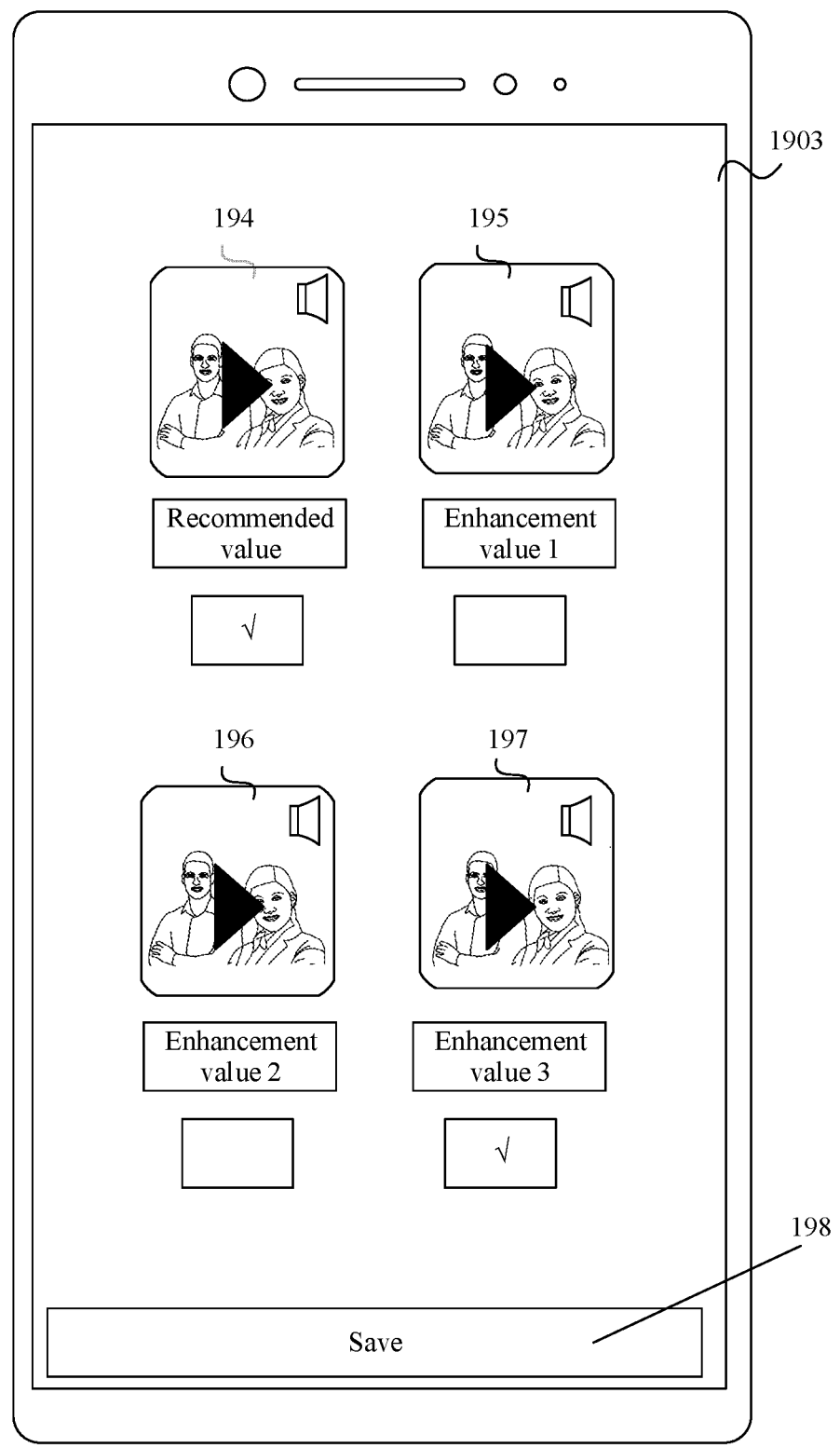

In a possible implementation, in response to the operation of giving a shooting stop indication by the user, the mobile phone displays an interface 1903 shown in FIG. 19(*c*), to prompt the user to store required audio of a video file. The video file currently includes audio 194 to 197, respectively corresponding to audio files recorded in different sound pickup ranges, or audio files that are recorded in a same sound pickup range and that are obtained after processing by using different audio algorithms. For example, corresponding to the method shown in Table 4 to Table 6 above, the audio 194 to 197 is audio respectively corresponding to the recommended value, the enhancement value 1, the enhancement value 2, and the enhancement value 3. In response to an operation of giving a playing indication by the user, the mobile phone may play the video file and corresponding audio. For example, if the mobile phone detects an operation of giving, by the user, an indication of playing the audio 194, the mobile phone plays the video file and the audio 194. After watching the video file, the user may select to store an audio file that the user considers to have a better audio effect. In response to the selection of the user, the audio that the user needs to store is determined, thereby improving use experience of the user, and avoiding a problem that excessive storage space is occupied due to storage of excessive audio. On the interface 1903 shown in FIG. 19(*c*), the user selects to store the audio 194 and the audio 197 of the current video file. In response to an operation of tapping a save control 198 by the user, the mobile phone stores the video file, and displays the interface 1902 shown in FIG. 19(*b*). A quantity of loudspeakers in the loudspeaker mark 193 may correspond to a quantity of pieces of audio included in the current video file.

In an embodiment, after detecting an operation of giving, by the user, an indication of playing the recorded video, the mobile phone plays the video picture and the audio of the recorded video. The operation of giving, by the user, an indication of playing the recorded video may be an operation of tapping, by the user, the thumbnail 191 on the video recording preview interface shown in FIG. 19(*a*). Alternatively, the operation of giving, by the user, an indication of playing the recorded video may be an operation of tapping, by the user, the thumbnail 192 in a gallery shown in FIG. 19(*b*).

In a possible implementation, after detecting the operation of giving, by the user, an indication of playing the recorded video, the mobile phone plays the recorded video based on the video picture and the audio that are recorded in the video recording process. During video playback, the mobile phone may display a video playing interface, and the video playing interface may include the recorded video picture. In addition, by default, the mobile phone may play the audio corresponding to the first sound pickup range, and then may switch to play other audio based on an indication of the user. Alternatively, if the user selects a sound pickup range in the recording process, the mobile phone automatically plays audio corresponding to the sound pickup range selected by the user.

For example, during video playback, the video playing interface may include a plurality of audio switching controls, and each audio switching control corresponds to one piece of audio. After detecting an operation of tapping an audio switching control by the user, the mobile phone plays the audio corresponding to the audio switching control.

Figure 20A:
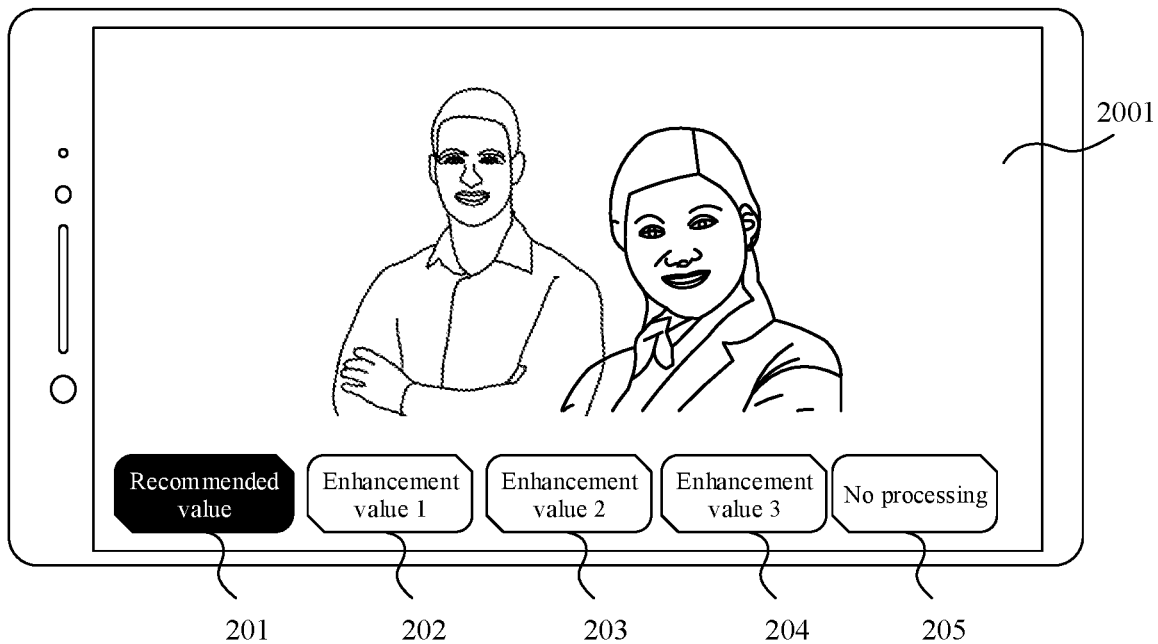
FIG. 20(a) to FIG. 20(c) are diagrams of a group of interfaces according to an embodiment of this application.
Figure 20B:
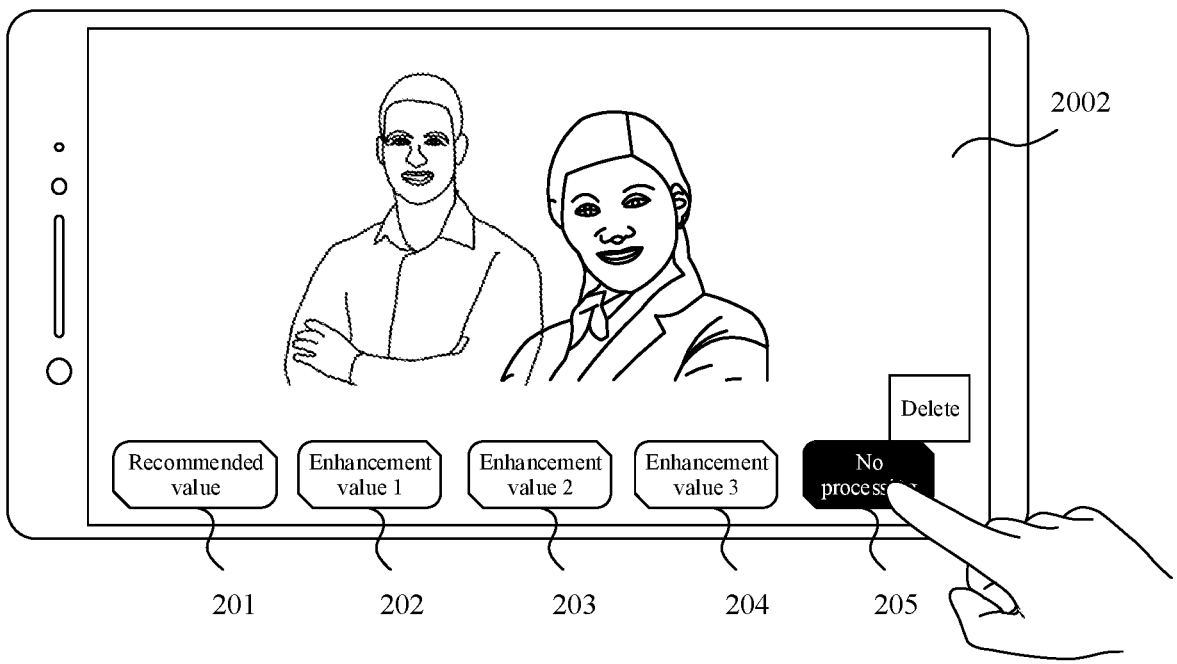
Figure 20C:
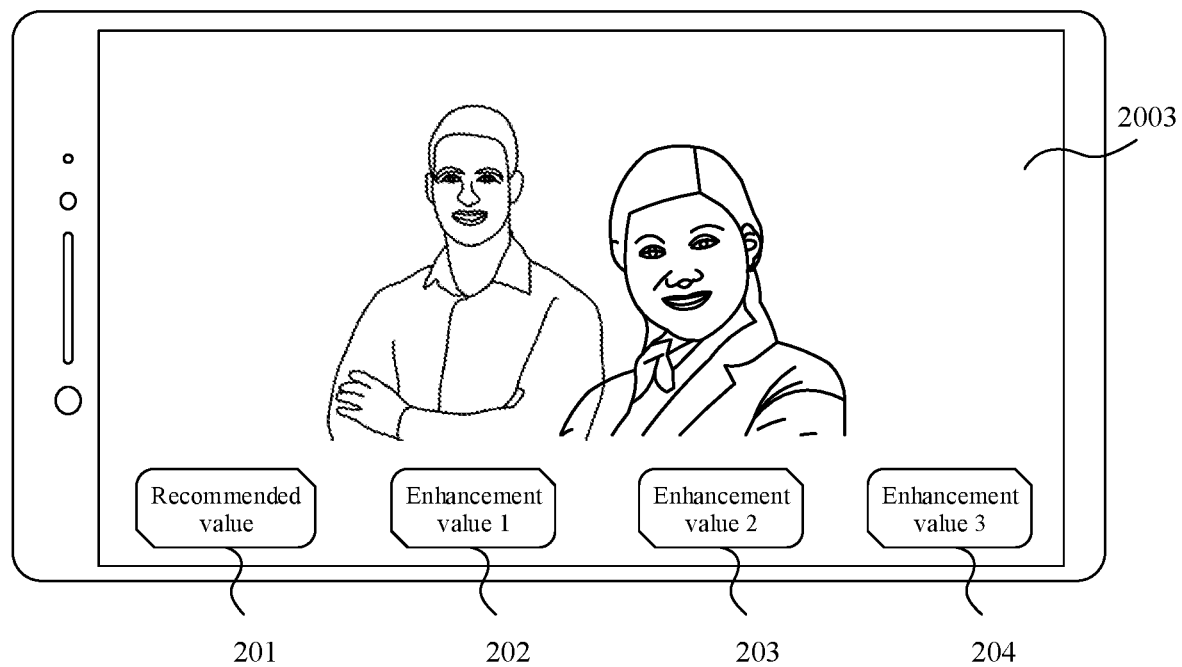

For example, during video playback, the mobile phone may display a video playing interface 2001 shown in FIG. 20(*a*), and the video playing interface 2001 displays a video picture. The video playing interface 2001 further displays audio switching controls 201 to 205. As shown in FIG. 20(*a*), if the mobile phone currently selects the audio switching control 201, or selects the recommended value by default, the mobile phone plays the audio corresponding to the first sound pickup range. If the mobile phone detects an operation of tapping the audio switching control 203 by the user, the mobile phone may play audio corresponding to a reference first sound pickup range corresponding to the audio switching control 203.

For another example, in response to an operation of the user, the mobile phone may delete some audio corresponding to the video file. On an interface 2002 shown in FIG. 20(*b*), the mobile phone detects an operation of touching and holding the audio switching control 205 by the user, and displays a deletion prompt box. If the user confirms deletion, the mobile phone deletes audio corresponding to the audio switching control 205, and displays an interface 2003 shown in FIG. 20(*c*). On the interface 2003, the audio switch control 205 corresponding to the audio whose deletion is confirmed by the user is no longer displayed. In this way, in a video playback process, audio that the user does not want to store can be deleted based on a user requirement, thereby improving use experience of the user.

In another possible implementation, during video playback, the mobile phone may display the video playing interface without playing audio first. After detecting an indication operation of the user, the mobile phone plays audio indicated by the user.

In the solution described in the foregoing embodiment, during video playback, the mobile phone may play the audio corresponding to the first face image or the first mouth image, so that interference caused by noise to the sound made by the sound-making face or the sound-making mouth is reduced in the played audio. In addition, the played audio matches, in real time, the face image concerned by the user, thereby improving audio experience of the user.

In addition, the mobile phone may switch to play audio corresponding to different sound pickup ranges, to provide a plurality of audio playing options for the user, thereby implementing audio adjustability, and improving audio playing experience of the user.

In addition, the mobile phone may play audio corresponding to the first face image or the first mouth image and the first feature value that change in real time, so that the audio matches the changing video picture in real time, thereby improving audio experience of the user.

Figure 21A:
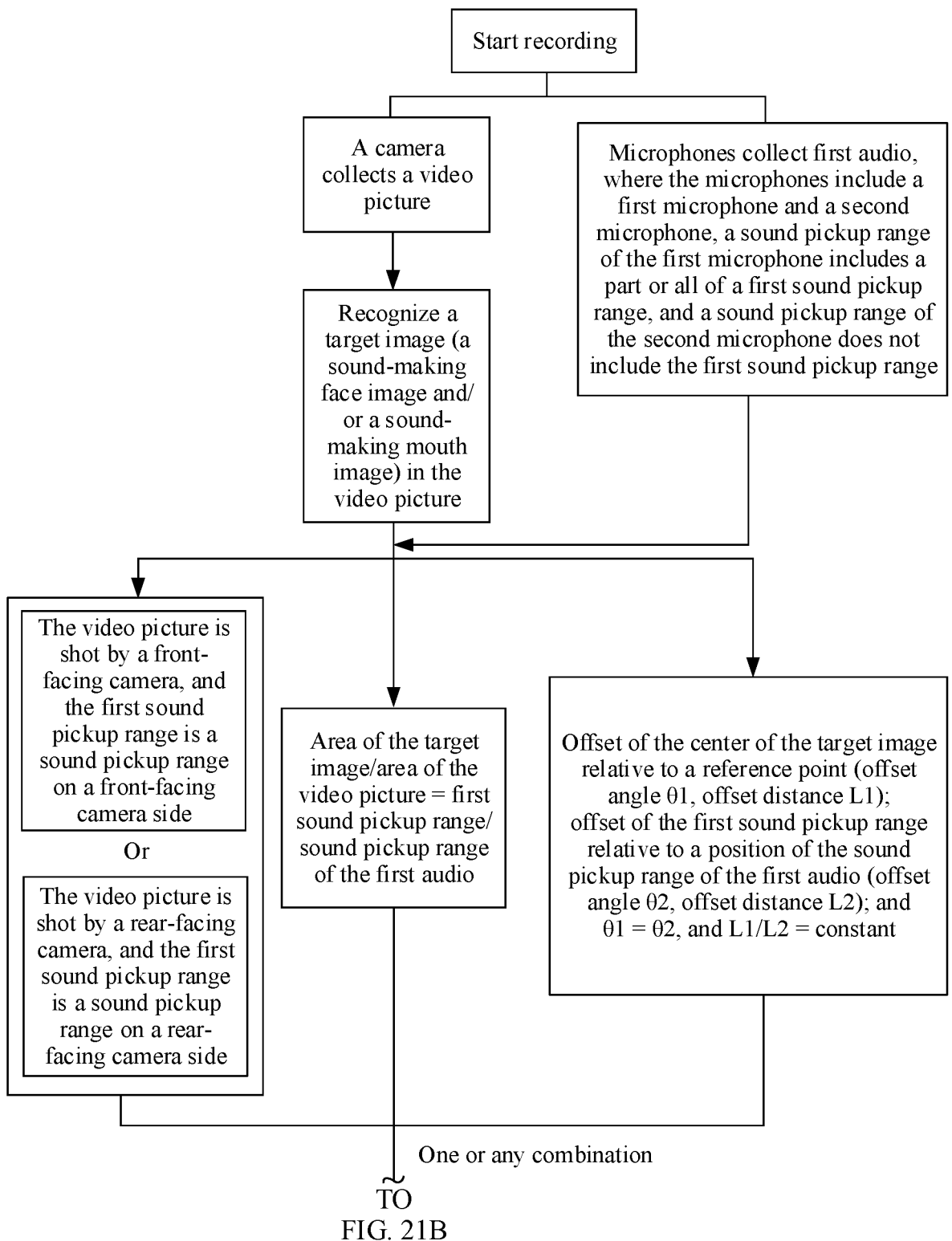
FIG. 21A and FIG. 21B are flowcharts of an audio processing method according to an embodiment of this application.
Figure 21B:
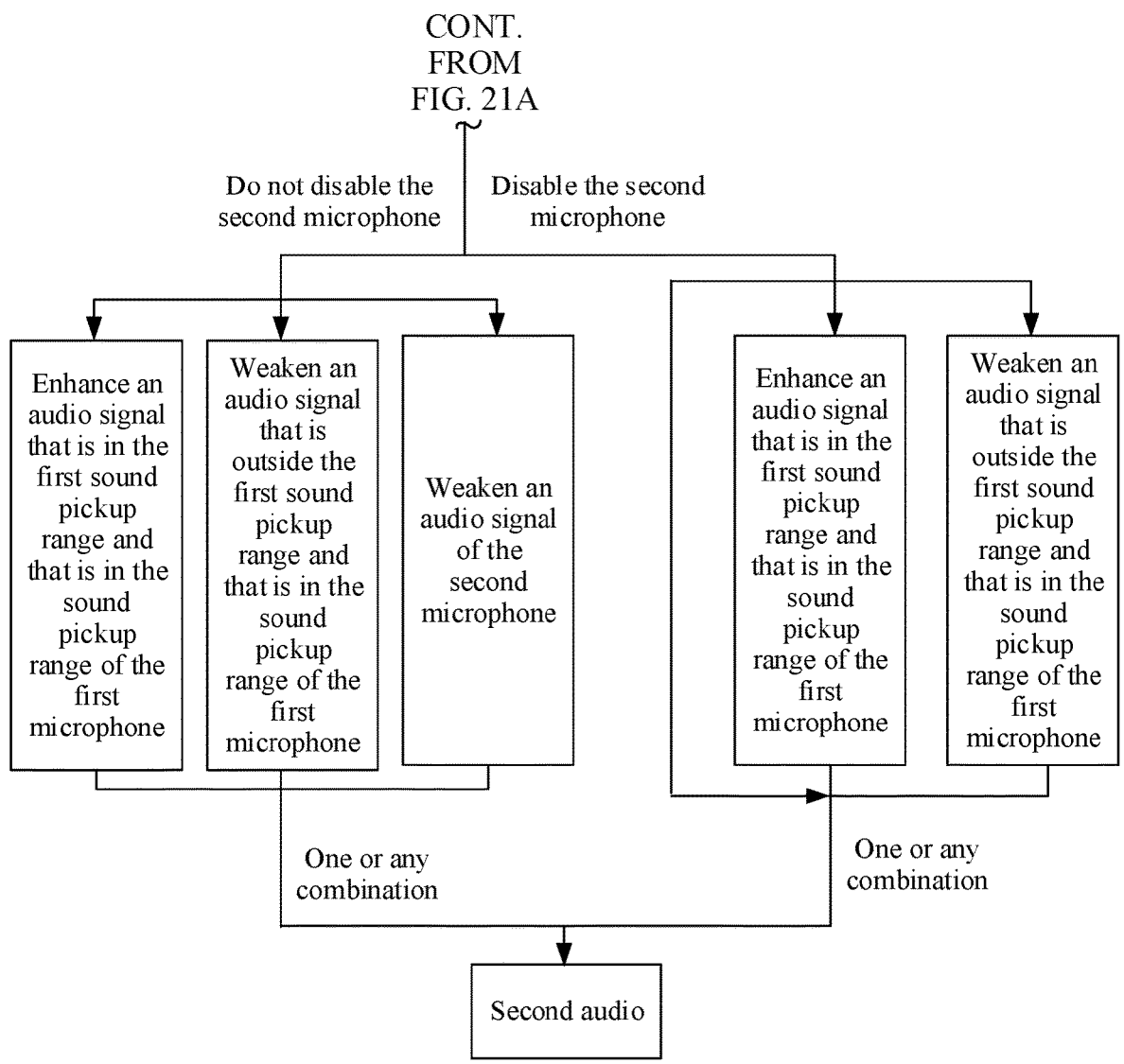

FIG. 21A and FIG. 21B are another schematic flowchart of an audio processing method according to an embodiment of this application. The audio processing method may be applied to the electronic device 100 shown in FIG. 1.

In some embodiments, after detecting an operation of giving, by a user, an indication of opening a camera, the electronic device starts the camera, and displays a shooting preview interface. Then, after detecting an operation of giving a shooting indication by the user, the electronic device starts to collect a video picture and first audio (that is, an initial audio signal).

It should be noted that an image collected by the camera of the electronic device is an initial video image, and after the initial video image is processed, a video picture that can be displayed on a display is obtained. Processing the initial video image is performed by a processor. In FIG. 21A and FIG. 21B, the video picture collected by the camera is merely an example for description.

Before or after detecting the operation of giving a shooting indication by the user, the electronic device enables a voice enhancement mode in response to an operation of the user. Alternatively, the electronic device enables a voice enhancement mode after detecting the operation of giving a shooting indication by the user.

In some embodiments, the first audio is audio signals collected in various directions by one or more microphones of the electronic device. Subsequently, voice-enhanced audio may be obtained based on the first audio.

For example, an example in which the processor includes a GPU, an NPU, and an AP is used for description. It may be understood that operations performed by the GPU, the NPU, and the AP herein may alternatively be performed by another processing unit in the processor. This is not limited in this embodiment of this application.

In some embodiments, the NPU in the processor recognizes, by using an image recognition technology, whether the video picture includes a face image and/or a mouth image. Further, the NPU may further determine, based on data of the face image and/or the mouth image, a sound-making face or a sound-making mouth in the face image and/or the mouth image, to determine a sound pickup range in which directional voice recording needs to be performed.

A first feature value of a target image may be determined by using the target image, and then a first sound pickup range is determined based on the first feature value. The first feature value includes one or more of a front-facing/rear-facing attribute parameter, an area ratio, or position information. The front-facing/rear-facing attribute parameter is used to indicate whether the video picture is a video picture shot by a front-facing camera or a video picture shot by a rear-facing camera. The area ratio is used to indicate a ratio of an area of the target image to an area of the video picture. The position information is used to indicate a position of the target image in the video picture.

In some scenarios, the first feature value includes a front-facing/rear-facing attribute parameter corresponding to the target image. That is, the AP in the processor determines whether the video picture in which the current target image is located is a front-facing video picture or a rear-facing video picture. If the video picture is a front-facing video picture, the first sound pickup range is a sound pickup range on a front-facing camera side. If the video picture is a rear-facing video picture, the first sound pickup range is a sound pickup range on a rear-facing camera side.

In some other scenarios, the first feature value includes an area ratio corresponding to the target image. The "area ratio" is used to indicate a ratio (for example, represented by X/Y) of an area of a first face image or a first mouth image to an area of the video picture. For example, the electronic device determines the first feature value based on a ratio of the area of the first face image to an area of a viewfinder frame.

Specifically, the area ratio is used to measure a size of the first sound pickup range corresponding to the first face image or the first mouth image, for example, a radius range or a diameter range of the first sound pickup range. Therefore, the AP may determine the radius range of the first sound pickup range based on the area ratio of the first face image. Alternatively, the AP may determine the radius range of the first sound pickup range based on the area ratio of the first mouth image. Then, the AP may determine the first sound pickup range (for example, represented by N*X/Y) based on the area ratio and a sound pickup range of the first audio. For example, area of the target image/area of the video picture=first sound pickup range/sound pickup range of the first audio.

In some other embodiments, the first feature value includes position information corresponding to the target image. The AP determines, based on the position information of the target image in the video picture, a position of the first sound pickup range corresponding to the target image in the sound pickup range of the first audio. Specifically, the AP determines a first offset of a central point of the target image relative to a first reference point, and the first reference point is a central point of the video picture or a focus of focusing. Then, the AP determines, based on the first offset, a second offset of a central point of the first sound pickup range relative to a central point of the sound pickup range of the first audio, where the second offset is directly proportional to the first offset, so that the first sound pickup range is obtained.

The first offset or the second offset includes an offset angle and/or an offset distance. For example, a coordinate system is built by using the first reference point as an origin, a direction parallel to a bottom edge of the electronic device (or a bottom edge of a current viewfinder frame) as an x axis, and a direction perpendicular to the x axis as y. The first reference point is used as a coordinate origin of the coordinate system, and the coordinate system is parallel to a display of the electronic device. If the first offset is 45 degrees on the upper left, the second offset is 45 degrees on the upper left. In this case, the first sound pickup range is in the sound pickup range of the first audio, and the central point of the first sound pickup range is at 45 degrees on the upper left of the central point of the sound pickup range of the first audio.

For example, the offset of the center of the target image relative to the reference point includes an offset angle θ1 and an offset distance L1. The offset of the first sound pickup range relative to the sound pickup range of the first audio includes an offset angle θ2 and an offset distance L2. In this case, θ1=θ2, and L1/L2=constant.

It may be understood that the AP may determine the first sound pickup range by using one or any combination of the front-facing/rear-facing attribute parameter, the area ratio, and the position information.

In some embodiments, after determining the first sound pickup range, the AP in the processor enhances an audio signal in the first sound pickup range and/or weakens an audio signal outside the first sound pickup range by using the first audio collected by the one or more microphones, to obtain audio corresponding to the first face image or the first mouth image, that is, obtain second audio.

In some embodiments, the AP may invoke a microphone corresponding to the first sound pickup range, to enhance an audio signal in the first sound pickup range, so that volume in the first sound pickup range is greater than volume outside the first sound pickup range.

For example, the electronic device includes one or more microphones, and the one or more microphones are configured to collect the first audio. When a sound pickup range of a first microphone in the one or more microphones includes a part or all of the first sound pickup range, the second audio is obtained by performing at least one of the following operations: enhancing an audio signal that is in the first sound pickup range and that is in the sound pickup range of the first microphone; weakening an audio signal that is outside the first sound pickup range and that is in the sound pickup range of the first microphone; and weakening an audio signal of a microphone other than the first microphone in the one or more microphones.

For another example, the electronic device includes at least two microphones, and the at least two microphones are configured to collect the first audio. When a sound pickup range of a second microphone in the at least two microphones does not include the first sound pickup range, the second microphone is disabled, where audio collected by a microphone other than the second microphone in the at least two microphones is the audio corresponding to the first face image or the first mouth image. Alternatively, when the second microphone is disabled, an audio signal that is in the first sound pickup range and that is in a sound pickup range of a microphone other than the second microphone in the at least two microphones is enhanced, and/or an audio signal that is outside the first sound pickup range and that is in the sound pickup range of the microphone other than the second microphone in the at least two microphones is weakened.

In some embodiments, after obtaining the second audio, the AP in the processor obtains a recorded video by using the obtained video picture. After an operation of giving a shooting stop indication is detected, the recorded video including the second audio and the video picture is obtained.

In some embodiments, the recorded video may include a plurality of audio files, where each audio file includes one piece of audio. For example, because there may be an error between the first sound pickup range determined by the electronic device based on the first feature value and a display range of the first face image or the first mouth image, the electronic device may determine one or more reference first sound pickup ranges near the first sound pickup range. The electronic device obtains one piece of audio based on the first sound pickup range, and obtains at least one piece of audio based on the reference first sound pickup range. The electronic device may further use the panoramic audio as one piece of audio. In this case, the electronic device may obtain, based on the first sound pickup range, a plurality of pieces of audio corresponding to the first face image or the first mouth image. One piece of audio may be understood as one audio file.

In this way, a plurality of types of audio experience may be provided for the user. In addition, the user may select, based on personal audio-visual experience, to delete some audio and store audio that the user considers optimal, thereby improving use experience of the user, and reducing storage pressure of a memory.

An embodiment of this application further provides an electronic device, including one or more processors and one or more memories. The one or more memories are coupled to the one or more processors, the one or more memories are configured to store computer program code, and the computer program code includes computer instructions. When the one or more processors execute the computer instructions, the electronic device is enabled to perform the foregoing related method operations to implement the audio processing method in the foregoing embodiments.

An embodiment of this application further provides a chip system, including a processor. The processor is coupled to a memory, and the memory is configured to store a program or instructions. When the program or the instructions are executed by the processor, the chip system is enabled to implement the method in any one of the foregoing method embodiments.

In an embodiment, there may be one or more processors in the chip system. The processor may be implemented by using hardware, or may be implemented by using software. When the processor is implemented by the hardware, the processor may be a logic circuit, an integrated circuit, or the like. When the processor is implemented by using the software, the processor may be a general-purpose processor, and is implemented by reading software code stored in the memory.

In an embodiment, there may be one or more memories in the chip system. The memory may be integrated with the processor, or may be disposed separately from the processor. This is not limited in this application. For example, the memory may be a non-transitory processor, for example, a read-only memory ROM. The memory and the processor may be integrated into a same chip, or may be separately disposed on different chips. A type of the memory and a manner of disposing the memory and the processor are not specifically limited in this application.

For example, the chip system may be a field-programmable gate array (FPGA), an application-specific integrated circuit (ASIC), a system on chip (SoC), a central processor unit (CPU), a network processor (NP), a digital signal processor (DSP), a micro controller unit (MCU), a programmable logic device (PLD), or another integrated chip.

It should be understood that the operations in the foregoing method embodiments may be implemented by using an integrated logic circuit of hardware in the processor, or by using instructions in a form of software. The operations of the method disclosed with reference to embodiments of this application may be directly performed by a hardware processor, or may be performed by a combination of hardware and software modules in the processor.

An embodiment of this application further provides a computer-readable storage medium. The computer-readable storage medium stores computer instructions. When the computer instructions are run on a terminal device, the terminal device is enabled to perform the foregoing related method operations to implement the audio processing method in the foregoing embodiments.

An embodiment of this application further provides a computer program product. When the computer program product is run on a computer, the computer is enabled to perform the foregoing related operations to implement the audio processing method in the foregoing embodiments.

In addition, an embodiment of this application further provides an apparatus. The apparatus may be specifically a component or a module, and the apparatus may include a processor and a memory that are connected. The memory is configured to store computer execution instructions. When the apparatus runs, the processor may execute the computer execution instructions stored in the memory, so that the apparatus performs the audio processing method in the foregoing method embodiments.

The terminal device, the computer-readable storage medium, the computer program product, or the chip provided in the embodiments of this application are all used to perform the corresponding method provided above. Therefore, for beneficial effects that can be achieved by the terminal device, the computer-readable storage medium, the computer program product, or the chip, refer to beneficial effects in the corresponding method provided above. Details are not described herein.

It may be understood that, to implement the foregoing functions, the electronic device includes a corresponding hardware and/or software module for performing each function. Algorithm operations of the examples described with reference to the embodiments disclosed in this specification may be implemented in this application in a form of hardware or a combination of hardware and computer software. Whether a function is performed by hardware or hardware driven by computer software depends on a particular application and a design constraint of the technical solutions. A person of ordinary skill in the art may use different methods to implement the described functions for each particular application, but it should not be considered that the implementation goes beyond the scope of this application.

In the embodiments, division of functional modules may be performed on the electronic device based on the foregoing method example. For example, each functional module may be obtained through division corresponding to each function, or two or more functions may be integrated into one processing module. The integrated module may be implemented in a form of hardware. It should be noted that, in embodiments of this application, division into the modules is an example and is merely logical function division, and may be other division in an actual implementation.

Based on the foregoing descriptions of the implementations, a person skilled in the art may clearly understand that for the purpose of convenient and brief descriptions, division into the foregoing functional modules is merely used as an example for descriptions. During actual application, the foregoing functions can be allocated to different functional modules for implementation based on a requirement, in other words, an inner structure of an apparatus is divided into different functional modules to implement all or a part of the functions described above. For a working process of the foregoing system, apparatus, and unit, refer to a corresponding process in the foregoing method embodiments, and details are not described herein again.

In the several embodiments provided in this application, it should be understood that the disclosed apparatuses and methods may be implemented in other manners. For example, the described terminal device embodiment is merely an example. For example, the module and division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the modules or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit. The integrated unit may be implemented in a form of hardware, or may be implemented in a form of a software function unit.

When the integrated unit is implemented in the form of a software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in the form of a software product. The computer software product is stored in a storage medium and includes several instructions for instructing a computer device (which may be a personal computer, a server, or a network device) to perform all or some of the operations of the methods described in embodiments of this application. The foregoing storage medium includes any medium that can store program code, for example, a flash memory, a removable hard disk, a read-only memory, a random access memory, a magnetic disk, or an optical disc.

The foregoing descriptions are only example implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. An audio processing method comprising:
at an electronic device:
detecting a first operation of opening a camera application;
displaying a shooting preview interface in response to detecting the first operation;
detecting a second operation of starting video recording;
collecting a video picture and first audio and displaying a shooting interface in response to detecting the second operation, wherein the shooting interface comprises a preview interface of the video picture;
recognizing a target image in the video picture, wherein the target image is a first face image or a first mouth image, the first face image being a face image of a sound-making object in the video picture, and the first mouth image being a mouth image of the sound-making object in the video picture;
determining, based on the target image, a first sound pickup range corresponding to the sound-making object; and
obtaining, based on the first sound pickup range and the first audio, second audio corresponding to the video picture, wherein in the second audio, audio volume of the second audio in the first sound pickup range is greater than audio volume outside the first sound pickup range.

2. The method according to claim 1, wherein determining the first sound pickup range comprises:
obtaining a first feature value based on the target image, wherein the first feature value comprises one or more of a front-facing or a rear-facing attribute parameter, an area ratio, or position information, the front-facing or the rear-facing attribute parameter being used to indicate whether the video picture is a video picture shot by a front-facing camera or a video picture shot by a rear-facing camera, the area ratio being used to indicate a ratio of an area of the target image to an area of the video picture, and the position information being used to indicate a position of the target image in the video picture; and
determining, based on the first feature value, the first sound pickup range corresponding to the sound-making object.

3. The method according to claim 2, wherein determining the first sound pickup range further comprises:
in response to the video picture being a front-facing video picture, determining that the first sound pickup range is a sound pickup range on a front-facing camera side; and
in response to the video picture being a rear-facing video picture, determining that the first sound pickup range is a sound pickup range on a rear-facing camera side.

4. The method according to claim 2, wherein determining the first sound pickup range further comprises:
determining the first sound pickup range based on the area ratio and a sound pickup range of the first audio.

5. The method according to claim 2, wherein determining the first sound pickup range further comprises:
determining, based on the position information, a position of the first sound pickup range in a sound pickup range of the first audio.

6. The method according to claim 5, wherein the position information comprises a first offset of a central point of the target image relative to a first reference point, and the first reference point is a central point of the video picture or a focus of focusing; and
wherein determining the position of the first sound pickup range in the sound pickup range of the first audio comprises:
determining, based on the first offset, a second offset of a central point of the first sound pickup range relative to a central point of the sound pickup range of the first audio, wherein the second offset is directly proportional to the first offset; and
determining, based on the second offset, the position of the first sound pickup range in the sound pickup range of the first audio.

7. The method according to claim 5, wherein a central point of the video picture is a central point of a viewfinder frame, or the central point of the video picture is a central point of a display.

8. The method according to claim 1, wherein obtaining the second audio comprises:
enhancing an audio signal that is in the first sound pickup range and that is in the first audio, or weakening an audio signal that is outside the first sound pickup range and that is in the first audio, to thereby obtain the second audio.

9. The method according to claim 8, wherein the electronic device comprises one or more microphones, and the one or more microphones are configured to collect the first audio; and
wherein obtaining the second audio comprises:
in response to a sound pickup range of a first microphone in the one or more microphones including a part or all of the first sound pickup range, performing at least one of the following operations to obtain the second audio:

enhancing an audio signal that is in the first sound pickup range and that is in the sound pickup range of the first microphone;

weakening an audio signal that is outside the first sound pickup range and that is in the sound pickup range of the first microphone; and weakening an audio signal of a microphone other than the first microphone in the one or more microphones.

10. The method according to claim 8, wherein the electronic device comprises at least two microphones, and the at least two microphones are configured to collect the first audio; and wherein obtaining the second audio comprises:

in response to a sound pickup range of a second microphone in the at least two microphones not including the first sound pickup range, disabling the second microphone, wherein audio collected by a microphone other than the second microphone in the at least two microphones is the second audio.

11. The method according to claim 10, wherein in response to the second microphone being disabled, the method further comprises:

enhancing an audio signal that is in the first sound pickup range and that is in a sound pickup range of a microphone other than the second microphone in the at least two microphones, or weakening an audio signal that is outside the first sound pickup range and that is in the sound pickup range of the microphone other than the second microphone in the at least two microphones.

12. The method according to claim 2, wherein there are one or more first face images, and there are one or more first mouth images.

13. The method according to claim 1, wherein the method further comprises:

detecting a third operation of stopping shooting;

in response to detecting the third operation, stopping recording, and generating a recorded video, wherein the recorded video comprises the video picture and the second audio;

detecting a fourth operation of playing the recorded video; and in response to detecting the fourth operation, displaying a video playing interface, and playing the video picture and the second audio on the video playing interface.

14. The method according to claim 13, wherein the recorded video further comprises third audio, the third audio is audio determined based on a second sound pickup range, the second sound pickup range is a sound pickup range determined based on the first sound pickup range and different from the first sound pickup range, the video playing interface comprises a first control and a second control, the first control corresponds to the second audio, and the second control corresponds to the third audio.

15. The method according to claim 14, wherein the method further comprises:

playing the video picture and the second audio in response to detecting the fourth operation, wherein the fourth operation comprises an operation of operating a player control or an operation of operating the first control;

detecting a fifth operation of operating the second control; and playing the video picture and the third audio in response to detecting the fifth operation.

16. The method according to claim 14, wherein the method further comprises:

deleting the second audio or the third audio in response to detecting an operation of deleting the second audio or the third audio.

17. The method according to claim 1, wherein the method further comprises:

detecting a sixth operation of enabling a voice enhancement mode; and enabling the voice enhancement mode in response to detecting the sixth operation.

18. An electronic device, comprising:

one or more processors coupled to a memory, a microphone, a camera, and a display;

wherein the memory comprises computer program code with executable instructions stored thereon, which when executed by the one or more processors cause the electronic device to:

detect a first operation of opening a camera application;

display a shooting preview interface in response to detecting the first operation;

detect a second operation of starting video recording;

collect a video picture and first audio and display a shooting interface in response to detecting the second operation, wherein the shooting interface comprises a preview interface of the video picture;

recognize a target image in the video picture, wherein the target image is a first face image or a first mouth image, the first face image being a face image of a sound-making object in the video picture, and the first mouth image being a mouth image of the sound-making object in the video picture;

determine, based on the target image, a first sound pickup range corresponding to the sound-making object; and obtain, based on the first sound pickup range and the first audio, second audio corresponding to the video picture, wherein in the second audio, audio volume of the second audio in the first sound pickup range is greater than audio volume outside the first sound pickup range.

19. A non-transitory computer-readable storage medium having instructions stored thereon that, when executed by a processing device, cause the processing device to perform operations comprising:

detecting a first operation of opening a camera application;

displaying a shooting preview interface in response to detecting the first operation;

detecting a second operation of starting video recording;

collecting a video picture and first audio and displaying a shooting interface in response to detecting the second operation, wherein the shooting interface comprises a preview interface of the video picture;

recognizing a target image in the video picture, wherein the target image is a first face image or a first mouth image, the first face image being a face image of a sound-making object in the video picture, and the first mouth image being a mouth image of the sound-making object in the video picture;

determining, based on the target image, a first sound pickup range corresponding to the sound-making object; and obtaining, based on the first sound pickup range and the first audio, second audio corresponding to the video picture, wherein in the second audio, audio volume of the second audio in the first sound pickup range is greater than audio volume outside the first sound pickup range.

* * * * *